United States Patent
Kure

(10) Patent No.: US 8,527,846 B2
(45) Date of Patent: Sep. 3, 2013

(54) INFORMATION PROCESSING DEVICE, METHOD AND PROGRAM

(75) Inventor: Yoshinobu Kure, Kanagawa (JP)

(73) Assignee: Sony Corporation, Tokyo (JP)

( * ) Notice: Subject to any disclaimer, the term of this patent is extended or adjusted under 35 U.S.C. 154(b) by 246 days.

(21) Appl. No.: 13/079,205

(22) Filed: Apr. 4, 2011

(65) Prior Publication Data

US 2011/0252287 A1 Oct. 13, 2011

(30) Foreign Application Priority Data

Apr. 9, 2010 (JP) ................ P2010-090715

(51) Int. Cl.
*H03M 13/00* (2006.01)
(52) U.S. Cl.
USPC ............ 714/776; 714/752; 714/755; 714/758
(58) Field of Classification Search
USPC .................. 714/752, 755, 758, 776
See application file for complete search history.

(56) References Cited

FOREIGN PATENT DOCUMENTS

JP 2007 311924 11/2007

OTHER PUBLICATIONS

Alexander E. Mohr et al., "Unequal loss protection: graceful degradation of image quality over Packet Erasure Channels through forward error correction". IEEE Journal of selected areas in communications, vol. 18, No. 6, pp. 819-828. Jun. 2000.

*Primary Examiner* — Sam Rizk
(74) *Attorney, Agent, or Firm* — Frommer Lawrence & Haug LLP; William S. Frommer

(57) ABSTRACT

An information processing device includes: an obtaining means for obtaining encoded data obtained by encoding image data formed by blocks with predetermined data unit, for each block, and redundant data for the encoded data obtained by encoding the encoded data using a forward error correction method; a decoding means for decoding each block using the encoded data and intermediate data generated during a decoding process if the encoded data is all collected or using dummy data, the encoded data, and intermediate data generated during a decoding process if the encoded data is not all collected; a forward error correction method decoding means for decoding the encoded data and the redundant data and recovers lost encoded data; and a setting means for decoding the encoded data and setting intermediate data obtained during the decoding to be used to decode a subsequent block as intermediate data during a decoding process for a block which has been decoded.

26 Claims, 36 Drawing Sheets

FIG.3
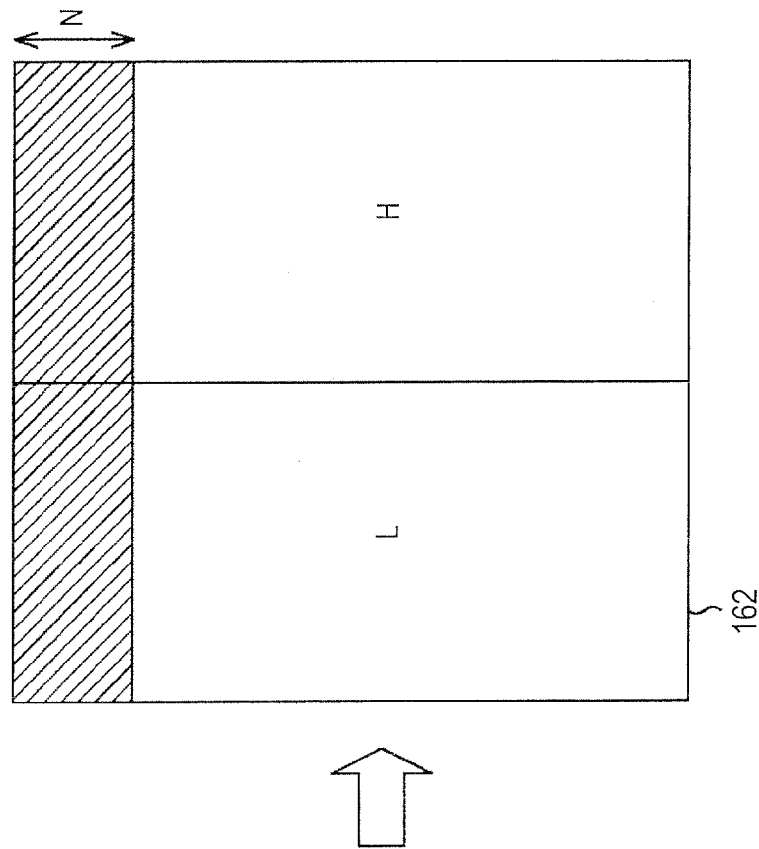
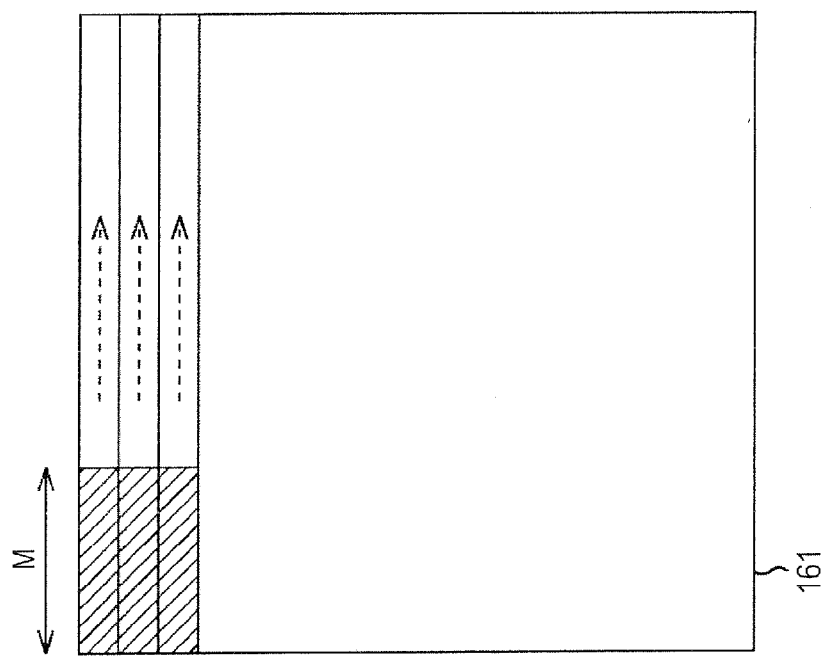

FIG.4
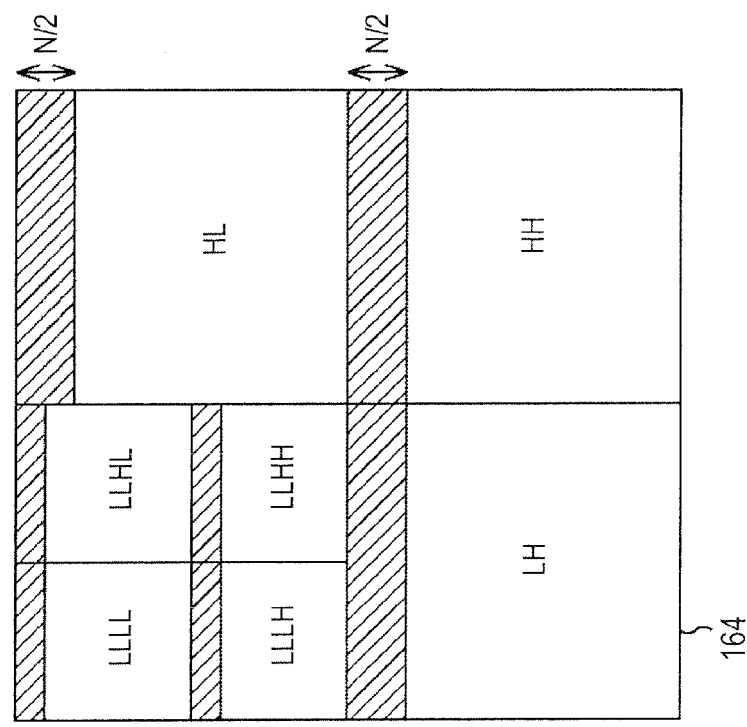
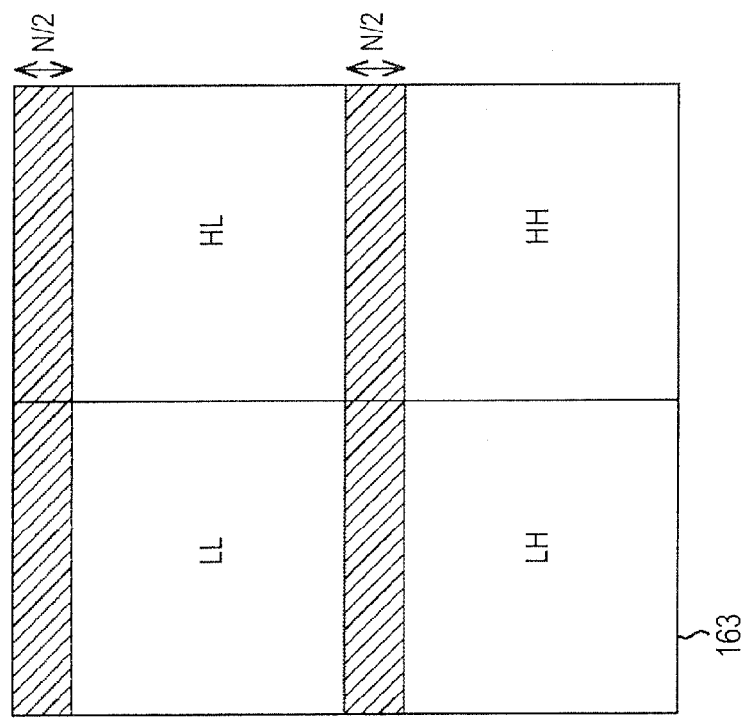

INFORMATION PROCESSING DEVICE, METHOD AND PROGRAM

BACKGROUND OF THE INVENTION

1. Field of the Invention

The present invention relates to an information processing device, an information processing method, and an information processing program, and more particularly to an information processing device, an information processing method, and an information processing program, capable of suppressing an increase in unnecessary delay and of suppressing errors from being propagated to subsequent data.

2. Description of the Related Art

In recent years, there has been increasing demand for the transmission of multimedia data with a short delay via the Internet or other transmission paths. For example, there is a so-called remote surgery application in which medical bases of two remote locations are connected to each other via the Internet or the like, the surgical situation is transmitted as moving images from one remote surgery room, and, in the other base, surgical instruments are operated while the images are viewed. In such an application, it is necessary to transmit moving images with delay equal to or less than several frame intervals.

In order to handle this demand, there has been proposed a method in which compression encoding is performed for several lines of each picture of the moving images by a wavelet transform as one compression encoding block (for example, refer to JP-A-2007-311924 (Patent Document 1)). In the case of the method, an encoding device can start the compression encoding before all of the data in a picture is input. In addition, when the compressed data is transmitted via a network and is decoded by a reception side, a decoding device can start a decoding process before all of the data in the picture is received. Therefore, if network propagation delay is sufficiently low, it is possible to transmit moving images in real-time with delay equal to or less than several frame intervals.

As an Internet technique suitable for real-time transmission, there is an RTP (Real-time Transport Protocol) defined in RFC (Request for Comments) 3550 of IETF (Internet Engineering Task Force). In the data transmission by the RTP, a time stamp is added to a packet as time information, and using this, a temporal relationship between the transmission side and the reception side is ascertained. In this way, synchronized reproduction can be performed without being influenced by delay variation (jitter) in the packet transmission or the like.

However, the RTP does not guarantee real-time data transmission. Priority of packet delivery, setting, management and the like are not included within the categories of transport service provided by the RTP. Therefore, there is a possibility that delivery delay or packet loss occurs in the RTP packets in the same manner as other protocol packets.

However, even if more or less data loss occurs, merely quality is lowered, and thus the reception side can reproduce data using only arriving packets within an expected time. In addition, packets delivered with a delay or packets in which errors occur are discarded as they are in the reception side.

In the case of the transmission via the network in this way, although high quality data is delivered, there is a problem in that the reception side does not sufficiently reproduce the data due to packet loss or errors. Generally, it is said that the probability of error occurrence is $10^{-5}$ in a wired section and $10^{-3}$ or more in a wireless section. Thus, the use of the RTP in such a state does not enable sufficient quality of the delivered media to be maintained.

As methods of using other protocols, for example, there may be a method of using a TCP (Transmission Control Protocol) having high reliability in the transmission of data. However, the TCP is reasonably resilient to errors, but is not suitable for a short delay data transmission since it has low throughput and long delays. For example, even if the reception side makes a request for retransmission of packets when errors occur, there is a problem in that arrival of the retransmitted packets is performed out of line with the reproduction time.

Therefore, as a method of improving reliability in the data transmission using the RTP, there is a forward error correction code method, a so-called FEC (Forward Error Correction) in which the reliability can be improved by redundant encoding is performed for data (for example, refer to Alexander E. Mohr, Student Member, IEEE, Eve A. Riskin, Senior Member, IEEE, and Richard E. Ladner, Member, IEEE, "Unequal Loss Protection: Graceful Degradation of Image Quality over Packet Erasure Channels Through Forward Error Correction" IEEE JOURNAL ON SELECTED AREAS IN COMMUNICATIONS, VOL. 18, No. 6, pp 819-828, June 2000 (Non-Patent Document 1)). In the FEC method, a plurality of packets are designated as one FEC block, and the redundant encoding is performed using an error correction code such as the Reed-Solomon (RS) code or the like. For example, if (n, k) RS code is used and the number of original packets is k, it is possible to generate (n−k) redundant packets (where n>k). In this case, a transmission device transmits a total of n packets, thereby a reception device receives k packets of the n packets, and thus it is possible to recover k original packets through the RS decoding process. For example, in Non-Patent Document 1, the redundant encoding method according to priority is disclosed.

When the redundant encoding is performed using the FEC method, the recovery performance for the packet loss depends on the FEC block size and the number of redundant packets (n−k). Particularly, the recovery performance for loss in consecutive packets on a data series, which occurs in the course of the data transmission via a network, that is, a so-called burst packet loss, has a close relation to the FEC block size. Typically, as the FEC block size is increased, the recovery performance for the burst packet loss is improved.

SUMMARY OF THE INVENTION

However, in the case of the FEC method, in order to perform the FEC encoding process or the decoding process, time for data corresponding to an amount of the block size to be accumulated is necessary. Therefore, if a large FEC block size is selected, there is a problem in that the delay time is greatly increased. In other words, there is a problem in that the recovery performance for the burst packet loss is not sufficiently improved in the FEC method, in data transmission in which a short delay is demanded.

However, as described above, even if more or less data loss occurs, merely quality for the lost part is lowered, and thus the reception side can reproduce the data using only packets which arrive in expected time. Particularly, in the case of the encoding method used in the data transmission in which a short delay is demanded, generally, since the encoding process unit becomes small, a range which is directly influenced (image quality is deteriorated) by the data loss is reduced.

However, the encoding method used in the data transmission in which a short delay is demanded is greatly dependent on other data excluding the encoding process unit in the encoding process or the decoding process. For example, there are cases where the encoding process is performed using data encoded in the past, intermediate data, or the like, or image data decoded in the past, intermediate data, or the like.

In the case of the encoding method, if irrecoverable data loss occurs, the error is propagated to subsequent data, and thus there is a problem in that a range influenced by the loss is expanded.

Thus, it is desirable to suppress increase in unnecessary delay and to suppress error propagation to subsequent data.

According to one embodiment of the present invention, there is provided an information processing device including an obtaining means for obtaining encoded data obtained by encoding image data which is formed by blocks with predetermined data unit, for each block, and redundant data for the encoded data, which is obtained by encoding the encoded data using a forward error correction method; a decoding means for decoding each block using the encoded data and intermediate data generated during a decoding process for a block which has been decoded if the encoded data to be included in the block and obtained by the obtaining means is all collected, and decoding each block using dummy data used instead of lost encoded data, the encoded data, and intermediate data generated during a decoding process for a block which has been decoded if the encoded data to be included in the block and obtained by the obtaining means is not all collected; a forward error correction method decoding means for decoding the encoded data and the redundant data obtained by the obtaining means using the forward error correction method and recovering the lost encoded data; and a setting means for decoding the encoded data recovered by the forward error correction method decoding means and setting intermediate data obtained during the decoding to be used to decode a subsequent block as intermediate data during a decoding process for a block which has been decoded.

The information processing device may further include a synchronization means for enabling the decoding means to decode the encoded data at a predetermined timing in accordance with a predetermined synchronization signal; and a synchronization determination means for determining whether or not recovery in the encoded data by the forward error correction method decoding means is earlier than a decoding start timing for a block of the encoded data in the decoding means, which is controlled by the synchronization means. If it is determined by the synchronization determination means that the recovery in the encoded data is earlier than the decoding start timing, the decoding means may perform decoding using the encoded data recovered by the forward error correction method decoding means, the encoded data included in the block, and intermediate data during a decoding process for a block which has been decoded. On the other hand, if it is determined by the synchronization determination means that the recovery in the encoded data is not earlier than the decoding start timing, the encoded data recovered by the forward error correction method decoding means may be decoded, and intermediate data obtained during the decoding may be set to be used to decode a subsequent block as intermediate data during a decoding process for a block which has been decoded.

The decoding means may include a first entropy decoding means for performing entropy decoding for the encoded data; a first inverse quantization means for performing inverse quantization for coefficient data obtained by decoding the encoded data in the first entropy decoding means; and an inverse wavelet transform means for performing an inverse wavelet transform for the coefficient data which is inversely quantized by the first inverse quantization means. The setting means may include a second entropy decoding means for performing entropy decoding for the encoded data recovered by the forward error correction method decoding means; a second inverse quantization means for performing inverse quantization for coefficient data obtained by decoding the encoded data in the second entropy decoding means; and an updating means for updating the intermediate data which is maintained by the inverse wavelet transform and which is used in the inverse wavelet transform, using the coefficient data which is inversely quantized by the second inverse quantization means.

According to one embodiment of the present invention, there is also provided an information processing method in an information processing device including the steps of causing an obtaining means of the information processing device to obtain encoded data obtained by encoding image data which is formed by blocks with predetermined data unit, for each block, and redundant data for the encoded data, which is obtained by encoding the encoded data using a forward error correction method; causing a decoding means of the information processing device to decode each block using the encoded data and intermediate data generated during a decoding process for a block which has been decoded if the encoded data to be included in the block and obtained by the obtaining means is all collected, and to decode each block using dummy data used instead of the lost encoded data, the encoded data, and intermediate data generated during a decoding process for a block which has been decoded if the encoded data to be included in the block and obtained by the obtaining means is not all collected; causing a forward error correction method decoding means of the information processing device to decode the encoded data and the redundant data which are obtained using the forward error correction method and recover the lost encoded data; and causing a setting means of the information processing device to decode the recovered encoded data and set intermediate data obtained during the decoding to be used to decode a subsequent block as intermediate data during a decoding process for a block which has been decoded.

According to one embodiment of the present invention, there is also provided a program enabling a computer to function as an obtaining means for obtaining encoded data obtained by encoding image data which is formed by blocks with predetermined data unit, for each block, and redundant data for the encoded data, which is obtained by encoding the encoded data using a forward error correction method; a decoding means for decoding each block using the encoded data and intermediate data generated during a decoding process for a block which has been decoded if the encoded data to be included in the block and obtained by the obtaining means is all collected, and decoding each block using dummy data used instead of the lost encoded data, the encoded data, and intermediate data generated during a decoding process for a block which has been decoded if the encoded data to be included in the block and obtained by the obtaining means is not all collected; a forward error correction method decoding means for decoding the encoded data and the redundant data obtained by the obtaining means using the forward error correction method and recovering the lost encoded data; and a setting means for decoding the encoded data recovered by the forward error correction method decoding means and setting intermediate data obtained during the decoding to be used to decode a subsequent block as intermediate data during a decoding process for a block which has been decoded.

According to another embodiment of the present invention, there is provided an information processing device including an encoding means for encoding image data which is formed by blocks with predetermined data unit, for each block; a first forward error correction method encoding means for recovering lost encoded data, and encoding encoded data which is obtained by encoding the image data in the encoding data, with first data unit, by a forward error correction method, in order to use the recovered encoded data to decode a corresponding block and to use intermediate data obtained during the decoding to decode encoded data of a subsequent block; a second forward error correction method encoding means for encoding encoded data which is obtained by encoding the image data in the encoding data, with second data unit larger than the first data unit, by the forward error correction method, in order to use intermediate data obtained during the decoding to decode encoded data of a subsequent block; and a transmission means for transmitting encoded data obtained by encoding the image data in the encoding means, first redundant data obtained by encoding the encoded data in the first forward error correction method encoding means, and second redundant data obtained by encoding the encoded data in the second forward error correction method encoding means.

The information processing device may further include a first data unit setting means for setting a size of the first data unit; and a second data unit setting means for setting a size of the second data unit. Here, the first forward error correction method encoding means may encode the encoded data by the forward error correction method with the first data unit set by the first data unit setting means. Also, the second forward error correction method encoding means may encode the encoded data by the forward error correction method with the second data unit set by the second data unit setting means.

The second data unit setting means may set the second data unit so as to be equal to or less than blocks obtained by combining the block, intermediate data generated during a decoding process for a corresponding block, and 0 or more subsequent block used for decoding.

In a decoding process for the encoded data, when the encoded data of a predetermined size or a size corresponding to a predetermined reproduction time is stored in a buffer and then is decoded, the first data unit setting means may set a size of the first data unit to be equal to or smaller than a size of the buffer, and the second data unit setting means may set a size of the second data unit to be equal to or larger than the size of the buffer.

The information processing device may further include a network situation information obtaining means for obtaining network situation information indicating a situation in a network via which the encoded data is transmitted. Here, the first data unit setting means may set the size of the first data unit using the network situation information obtained by the network situation information obtaining means, and the second data unit setting means may set the size of the second data unit using the network situation information obtained by the network situation information obtaining means.

The information processing device may further include a first redundancy setting means for setting first redundancy which is redundancy for encoding using the forward error correction method in the first forward error correction method encoding means; and a second redundancy setting means for setting second redundancy which is redundancy for encoding using the forward error correction method in the second forward error correction method encoding means. In this case, the first forward error correction method encoding means may encode the encoded data by the forward error correction method with the first redundancy set by the first redundancy setting means, and the second forward error correction method encoding means may encode the encoded data by the forward error correction method with the second redundancy set by the second redundancy setting means.

The information processing device may further include a network situation information obtaining means for obtaining network situation information indicating a situation in a network via which the encoded data is transmitted, and, here the first redundancy setting means may set the first redundancy using the network situation information obtained by the network situation information obtaining means, and the second redundancy setting means may set the second redundancy using the network situation information obtained by the network situation information obtaining means.

The first redundancy setting means may decrease redundancy for a block which is temporally later inside the second data unit.

The network situation information may include at least one of a packet loss rate information, transmission delay information, transmission and reception data rate information, and transmission jitter information.

The network situation information may further include an expected value of a burst packet loss rate indicating an occurrence rate of losses in consecutive packets of predetermined number or more or indicating a frequency where the number of lost packets in a predetermined section is equal to or more than a predetermined number.

The information processing device may further include a network situation information obtaining means for obtaining a burst packet loss rate indicating an occurrence rate of losses in consecutive packets of a predetermined number or more or indicating a frequency where the number of lost packets in a predetermined section is equal to or more than a predetermined number, as network situation information indicating a situation in a network via which the encoded data is transmitted; a first data unit setting means for setting a size of the first data unit; a second data unit setting means for setting a size of the second data unit; a first redundancy setting means for setting first redundancy which is redundancy for encoding using the forward error correction method in the first forward error correction method encoding means; and a second redundancy setting means for setting second redundancy which is redundancy for encoding using the forward error correction method in the second forward error correction method encoding means. Here, the first forward error correction method encoding means may encode the encoded data by the forward error correction method with the first redundancy set by the first redundancy setting means, with the first data unit set by the first data unit setting means. The second forward error correction method encoding means may encode the encoded data by the forward error correction method with the second redundancy set by the second redundancy setting means, with the second data unit set by the second data unit setting means. In addition, when the burst packet loss rate obtained by the network situation information obtaining means is equal to or more than a predetermined value, the first data unit setting means increases the first data unit and the second data unit setting means increases the second data unit, or the first redundancy setting means increases the first redundancy and the second redundancy setting means increases the second redundancy, or the first data unit setting means increases the first data unit, the second data unit setting means increases the second data unit, the first redundancy setting means increases the first redundancy and the second redundancy setting means increases the second redundancy.

According to another embodiment of the present invention, there is also provided an information processing method in an information processing device including the steps of causing an encoding means of the information processing device to encode image data which is formed by blocks with predetermined data unit, for each block; causing a first forward error correction method encoding means of the information processing device to recover lost encoded data, and encode encoded data which is obtained by encoding the image data in the encoding data, with first data unit, by a forward error correction method, in order to use the recovered encoded data to decode a corresponding block and to use intermediate data obtained during the decoding to decode encoded data of a subsequent block; causing a second forward error correction method encoding means of the information processing device to encode encoded data which is obtained by encoding the image data in the encoding data, with second data unit larger than the first data unit, by the forward error correction method, in order to use intermediate data obtained during the decoding to decode encoded data of a subsequent block; and causing a transmission means of the information processing device to transmit encoded data obtained by encoding the image data, first redundant data obtained by encoding the encoded data using the first forward error correction method, and second redundant data obtained by encoding the encoded data using the second forward error correction method.

According to another embodiment of the present invention, there is also provided a program enabling a computer to function as an encoding means for encoding image data which is formed by blocks with predetermined data unit, for each block; a first forward error correction method encoding means for recovering lost encoded data, and encoding encoded data which is obtained by encoding the image data in the encoding data, with first data unit, by a forward error correction method, in order to use the recovered encoded data to decode a corresponding block and to use intermediate data obtained during the decoding to decode encoded data of a subsequent block; a second forward error correction method encoding means for encoding encoded data which is obtained by encoding the image data in the encoding data, with second data unit larger than the first data unit, by the forward error correction method, in order to use intermediate data obtained during the decoding to decode encoded data of a subsequent block; and a transmission means for transmitting encoded data obtained by encoding the image data in the encoding means, first redundant data obtained by encoding the encoded data in the first forward error correction method encoding means, and second redundant data obtained by encoding the encoded data in the second forward error correction method encoding means.

According to still another embodiment of the present invention, there is provided an information processing device including an obtaining means for obtaining encoded data obtained by encoding image data which is formed by blocks with predetermined data unit, for each block, first redundant data for the encoded data, which is obtained by encoding the encoded data using a forward error correction method with first data unit, and second redundant data for the encoded data, which is obtained by encoding the encoded data using the forward error correction method with second data unit larger than the first data unit; a decoding means for decoding each block using the encoded data and intermediate data generated during a decoding process for a block which has been decoded if the encoded data to be included in the block and obtained by the obtaining means is all collected, and decoding each block using the encoded data and intermediate data generated during a decoding process for a block which has been decoded if the encoded data to be included in the block and obtained by the obtaining means is not all collected; a first forward error correction method decoding means for recovering lost encoded data, and decoding the encoded data and the first redundant data which are obtained by the obtaining means using the forward error correction method, in order to use the recovered encoded data to decode a corresponding block and to use intermediate data obtained during the decoding to decode encoded data of a subsequent block; a second forward error correction method decoding means for decoding the encoded data and the second redundant data obtained by the obtaining means using the forward error correction method, in order to use intermediate data obtained during the decoding to decode encoded data of a subsequent block; and a setting means for decoding the encoded data recovered by the second forward error correction method decoding means and setting intermediate data obtained during the decoding to be used to decode a subsequent block as intermediate data during a decoding process for a block which has been decoded.

The information processing device may further include a synchronization means for enabling the decoding means to decode the encoded data at a predetermined timing in accordance with a predetermined synchronization signal; and a synchronization determination means for determining whether or not recovery in the encoded data by the second forward error correction method decoding means is earlier than a decoding start timing for a block of the encoded data in the decoding means, which is controlled by the synchronization means. If it is determined by the synchronization determination means that the recovery in the encoded data is earlier than the decoding start timing, the decoding means may perform decoding using the encoded data recovered by the second forward error correction method decoding means, the encoded data included in the block, and intermediate data during a decoding process for a block which has been decoded, and if it is determined by the synchronization determination means that the recovery in the encoded data is not earlier than the decoding start timing, the setting means may decode the encoded data recovered by the second forward error correction method decoding means, and set intermediate data obtained during the decoding to be used to decode a subsequent block as intermediate data during a decoding process for a block which has been decoded.

The decoding means may include a first entropy decoding means for performing entropy decoding for the encoded data; a first inverse quantization means for performing inverse quantization for coefficient data obtained by decoding the encoded data in the first entropy decoding means; and an inverse wavelet transform means for performing an inverse wavelet transform for the coefficient data which is inversely quantized by the first inverse quantization means. In addition, the setting means may include a second entropy decoding means for performing entropy decoding for the encoded data recovered by the second forward error correction method decoding means; a second inverse quantization means for performing inverse quantization for coefficient data obtained by decoding the encoded data in the second entropy decoding means; and an updating means for updating the intermediate data which is maintained by the inverse wavelet transform and which is used in the inverse wavelet transform, using the coefficient data which is inversely quantized by the second inverse quantization means.

According to still another embodiment of the present invention, there is also provided an information processing method in an information processing device including the steps of causing an obtaining means of the information processing device to obtain encoded data obtained by encoding image data which is formed by blocks with predetermined data unit, for each block, first redundant data for the encoded data, which is obtained by encoding the encoded data using a forward error correction method with first data unit, and second redundant data for the encoded data, which is obtained by encoding the encoded data using the forward error correction method with second data unit larger than the first data unit; causing a decoding means to decode each block using the encoded data and intermediate data generated during a decoding process for a block which has been decoded if the encoded data to be included in the block and obtained by the obtaining means is all collected, and to decode each block using the encoded data and intermediate data generated during a decoding process for a block which has been decoded if the encoded data to be included in the block and obtained by the obtaining means is not all collected; causing a first forward error correction method decoding means of the information processing device to recover lost encoded data, and decodes the encoded data and the first redundant data which are obtained, using the forward error correction method, in order to use the recovered encoded data to decode a corresponding block and to use intermediate data obtained during the decoding to decode encoded data of a subsequent block; causing a second forward error correction method decoding means of the information processing device to decode the encoded data and the second redundant data which are obtained, using the forward error correction method, in order to use intermediate data obtained during the decoding to decode encoded data of a subsequent block; and causing a setting means of the information processing device to decode the recovered encoded data and set intermediate data obtained during the decoding to be used to decode a subsequent block as intermediate data during a decoding process for a block which has been decoded.

According to still another embodiment of the present invention, there is also provided a program enabling a computer to function as an obtaining means for obtaining encoded data obtained by encoding image data which is formed by blocks with predetermined data unit, for each block, first redundant data for the encoded data, which is obtained by encoding the encoded data using a forward error correction method with first data unit, and second redundant data for the encoded data, which is obtained by encoding the encoded data using the forward error correction method with second data unit larger than the first data unit; a decoding means for decoding each block using the encoded data and intermediate data generated during a decoding process for a block which has been decoded if the encoded data to be included in the block and obtained by the obtaining means is all collected, and decoding each block using the encoded data and intermediate data generated during a decoding process for a block which has been decoded if the encoded data to be included in the block and obtained by the obtaining means is not all collected; a first forward error correction method decoding means for recovering lost encoded data, and decoding the encoded data and the first redundant data which are obtained by the obtaining means using the forward error correction method, in order to use the recovered encoded data to decode a corresponding block and to use intermediate data obtained during the decoding to decode encoded data of a subsequent block; a second forward error correction method decoding means for decoding the encoded data and the second redundant data obtained by the obtaining means using the forward error correction method, in order to use intermediate data obtained during the decoding to decode encoded data of a subsequent block; and a setting means for decoding the encoded data recovered by the second forward error correction method decoding means and setting intermediate data obtained during the decoding to be used to decode a subsequent block as intermediate data during a decoding process for a block which has been decoded.

According to one embodiment of the present invention, encoded data obtained by encoding image data which is formed by blocks with predetermined data unit, for each block, and redundant data for the encoded data, which is obtained by encoding the encoded data using a forward error correction method, are obtained; each block is decoded using the encoded data and intermediate data generated during a decoding process for a block which has been decoded if the encoded data to be included in the block is all collected, and each block is decoded using dummy data used instead of the lost encoded data, the encoded data, and intermediate data generated during a decoding process for a block which has been decoded if the encoded data to be included in the block is not all collected; the encoded data and the redundant data obtained are decoded by the forward error correction method and the lost encoded data is recovered; and the recovered encoded data is decoded and intermediate data obtained during the decoding is set to be used to decode a subsequent block as intermediate data during a decoding process for a block which has been decoded.

According to another embodiment of the present invention, image data which is formed by blocks is encoded with predetermined data unit, for each block; lost encoded data is recovered, and encoded data which is obtained by encoding the image data in the encoding data is encoded with first data unit, by a forward error correction method, in order to use the recovered encoded data to decode a corresponding block and to use intermediate data obtained during the decoding to decode encoded data of a subsequent block; encoded data which is obtained by encoding the image data in the encoding data is encoded, with second data unit larger than the first data unit, by the forward error correction method, in order to use intermediate data obtained during the decoding to decode encoded data of a subsequent block; and encoded data obtained by encoding the image data, first redundant data obtained by encoding the encoded data in the first forward error correction method encoding means, and second redundant data obtained by encoding the encoded data in the second forward error correction method encoding means are transmitted.

According to still another embodiment of the present invention, there is an obtainment of encoded data obtained by encoding image data which is formed by blocks with predetermined data unit, for each block, first redundant data for the encoded data, which is obtained by encoding the encoded data using a forward error correction method with first data unit, and second redundant data for the encoded data, which is obtained by encoding the encoded data using the forward error correction method with second data unit larger than the first data unit; each block is decoded using the encoded data and intermediate data generated during a decoding process for a block which has been decoded if the encoded data to be included in the block and obtained by the obtaining means is all collected, and each block is decoded using the encoded data and intermediate data generated during a decoding process for a block which has been decoded if the encoded data to be included in the block and obtained by the obtaining means is not all collected; lost encoded data is recovered, and the encoded data and the first redundant data which are obtained are decoded using the forward error correction method, in order to use the recovered encoded data to decode a corresponding block and to use intermediate data obtained during the decoding to decode encoded data of a subsequent block; the encoded data and the second redundant data obtained by the obtaining means are decoded using the forward error correction method, in order to use intermediate data obtained during the decoding to decode encoded data of a subsequent block; and the recovered encoded data is decoded and intermediate data obtained during the decoding is set to be used to decode a subsequent block as intermediate data during a decoding process for a block which has been decoded.

According to the embodiments of the present invention, it is possible to perform data transmission. Particularly, it is possible to transmit data by suppressing increase in unnecessary delay and error propagation to subsequent data.

BRIEF DESCRIPTION OF THE DRAWINGS

FIG. 3 is a diagram illustrating an outline of analysis filtering.

FIG. 4 is a diagram illustrating an outline of the analysis filtering, which is subsequent to FIG. 3.

DESCRIPTION OF THE PREFERRED EMBODIMENTS

Hereinafter, embodiments of the present invention will be described. The description will be made in the following order.

1. First Embodiment (Network System: Use of FEC as Error Propagation Counter-measure)
2. Second Embodiment (Network System: Change of Use of FEC. For Error Propagation Counter-measure or for Recovery)
3. Third Embodiment (Network System: Simultaneous Use of FEC for Error Propagation Counter-measure and for Recovery)
4. Fourth Embodiment (Network System: Use of RTCP)
5. Fifth Embodiment (Personal Computer)

1. First Embodiment

[Configuration of Network System]

Figure 1:
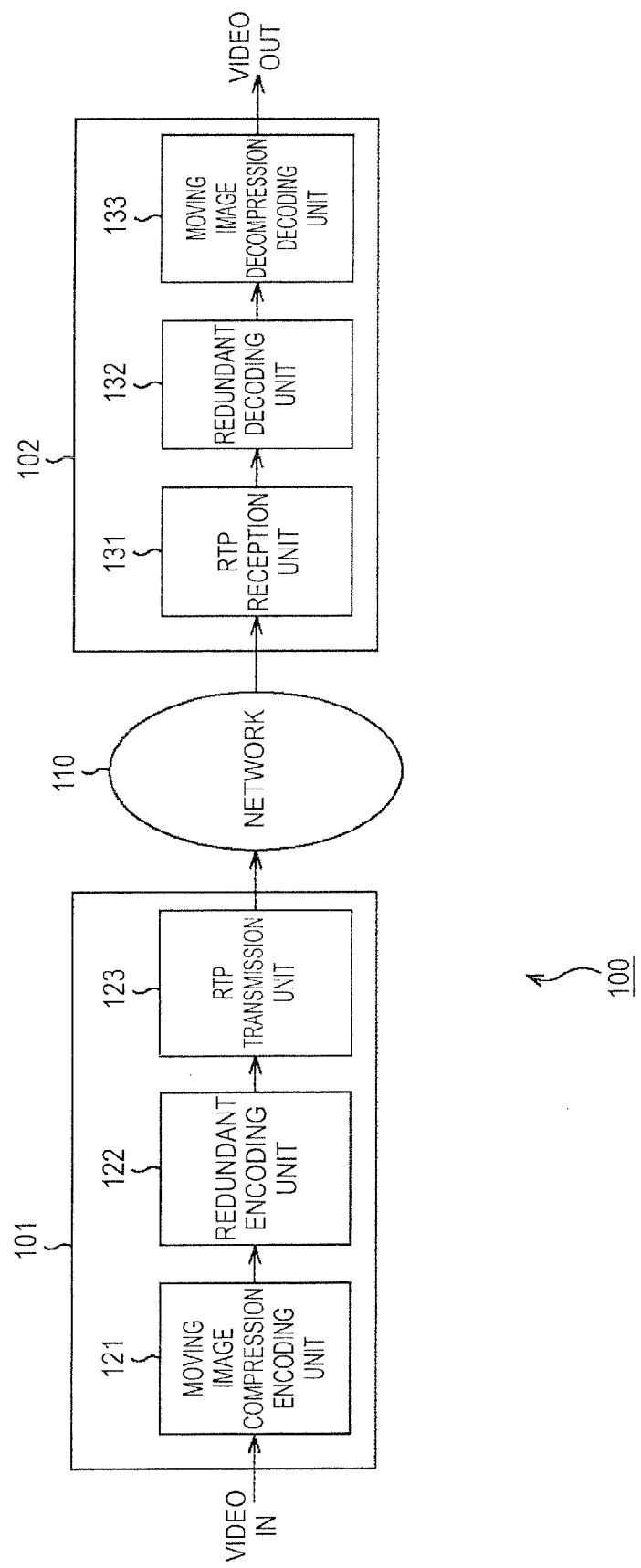
FIG. 1 is a block diagram illustrating a main configuration example of a network system according to an embodiment of the present invention.

FIG. 1 is a block diagram illustrating a configuration example of a network system according to an embodiment of the present invention.

In FIG. 1, a network system 100 is a system in which image data (moving image data or still image data) is transmitted from a transmission device 101 to a reception device 102 via a network 110. Hereinafter, although a case of transmitting moving image data will be described for convenience of description, the following description is applicable to transmission of still image data. A moving image is thought to be frame images or a set of field images, that is, a set of still images. Therefore, the network system 100 can transmit the still image data by performing fundamentally the same manner as a case of transmitting moving image data described below.

The transmission device 101 packetizes input moving image data (video IN) through encoding, and transmits the packets to the reception device 102 via the network 110. As shown in FIG. 1, the transmission device 101 includes a moving image compression encoding unit 121, a redundant encoding unit 122, and an RTP (Real-time Transport Protocol) transmission unit 123.

The moving image compression encoding unit 121 performs compression encoding for the moving image data (video IN) input to the transmission device 101 and supplies the generated encoded data to the redundant encoding unit 122.

The redundant encoding unit 122 performs redundant encoding for the encoded data supplied from the moving image compression encoding unit 121 and generates redundant data. The redundant encoding unit 122 supplies the generated redundant data to the RTP transmission unit 123 along with the encoded data (as FEC (Forward Error Correction) encoded data)

The RTP transmission unit 123 transmits the supplied FEC encoded data to the reception device 102 via the network 110 as RTP packets.

The reception device 102 receives the RTP packets transmitted from the transmission device 101 via the network 110, depacketizes the RTP packets, and by performing redundant decoding or decompression decoding, generates and outputs moving image data. As shown in FIG. 1, the reception device 102 includes an RTP reception unit 131, a redundant decoding unit 132, and a moving image decompression decoding unit 133.

The RTP reception unit 131 receives the RTP packets transmitted from the RTP transmission unit 123 and supplies the FEC encoded data to the redundant decoding unit 132. The redundant decoding unit 132 performs redundant decoding for the supplied FEC encoded data by a decoding method corresponding to the redundant encoding method in the redundant encoding unit 122 and thus recovers lost data using the redundant data. The redundant decoding unit 132 supplied the obtained encoded data to the moving image decompression decoding unit 133. The moving image decompression decoding unit 133 performs decompressing decoding for the encoded data by a method corresponding to the compression encoding method in the moving image compression encoding unit 121, and generates moving image data in the baseband. The moving image decompression decoding unit 133 outputs the generated moving image data from the reception device 102 (video OUT).

[Description of Moving Image Compression Encoding and Decompression Decoding]

Next, an example of the moving image compression encoding and the decompression decoding in the moving image compression encoding unit 121 and the moving image decompression decoding unit 133 will be described.

Figure 2:
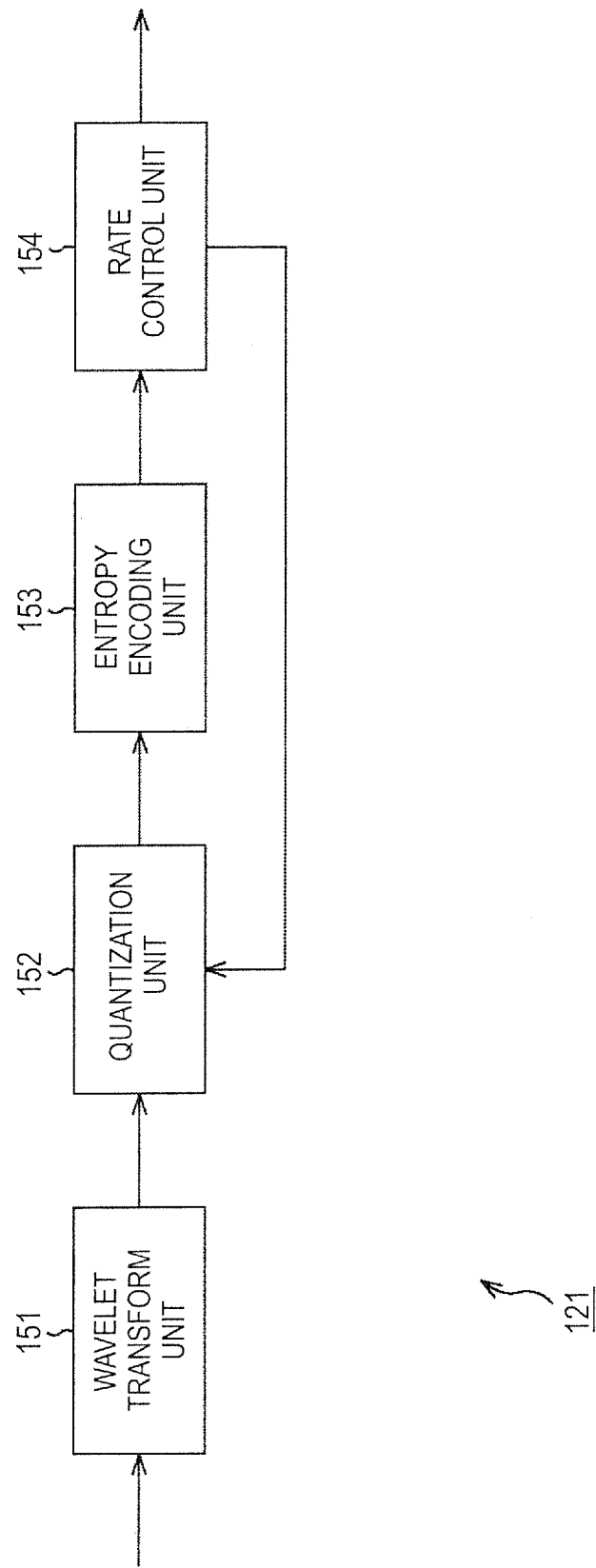
FIG. 2 is a block diagram illustrating a configuration example of a moving image compression encoding unit.

FIG. 2 is a block diagram illustrating a detailed configuration example of the moving image compression encoding unit 121. The moving image compression encoding unit 121 generates hierarchies of image data in a descending order regarding important degree of its resolution, and performs hierarchy encoding for each hierarchy so as to be encoded. For example, the moving image compression encoding unit 121 generates hierarchical data in a descending order regarding important degree of spatial resolution. In addition, for example, the moving image compression encoding unit 121 generates hierarchical data in a descending order regarding important degree of temporal resolution. Further, for example, the moving image compression encoding unit 121 generates hierarchical data in a descending order regarding important degree of SNR (Signal to Noise Ratio). The moving image compression encoding unit 121 encodes the hierarchical data generated in this way for each hierarchy.

In such a hierarchy encoding method, there is, for example, a JPEG (Joint Photographic Experts Group) 2000 scheme in which each picture of moving image data undergoes a wavelet transform and entropy encoding. The hierarchy encoding method is arbitrary, but, in the following, a case where the moving image compression encoding unit 121 performs the wavelet transform and the entropy encoding for the moving image data each plurality of lines will be described.

As shown in FIG. 2, the moving image compression encoding unit 121 includes a wavelet transform unit 151, a quantization unit 152, an entropy encoding unit 153, and rate control unit 154. The wavelet transform unit 151 performs the wavelet transform for each picture of the moving image each plurality of lines.

The wavelet transform is a process which performs analysis filtering for dividing input data into high frequency components and low frequency components in both of an image plane horizontal direction and an image plane vertical direction. In other words, the input data by the wavelet transform process is divided into four components (sub-bands) including a component (an HH component) which has high frequency in both of the horizontal direction and the vertical direction, a component (an HL component) which has high frequency in the horizontal direction and low frequency in the vertical direction, a component (an LH component) which has low frequency in the horizontal direction and high frequency in the vertical direction, and a component (an LL component) which has low frequency in both of the horizontal direction and the vertical direction.

The wavelet transform unit 151 recursively repeats the wavelet transform process for the component (the LL component) which has low frequency in both of the horizontal direction and the vertical direction and which is obtained by the analysis filtering. In other words, by the wavelet transform process, each picture of moving image data is divided into a plurality of hierarchical sub-bands (frequency components) (hierarchical data is generated). The entropy encoding unit 153 encodes each sub-band.

The image data for each picture of the moving image is input to the wavelet transform unit 151 for each line longitudinally from the upper side of the image. In addition, image data for each line is input for each sample (one column) transversely from the left side of the image.

The wavelet transform unit 151 performs the analysis filtering in the image plane horizontal direction (horizontal analysis filtering) for the image data input in this way each time it is provided with data of the number of samples for which the analysis filtering can be performed (as soon as it is provided with the samples). For example, the wavelet transform unit 151 performs the horizontal analysis filtering for the image data 161 in the baseband shown in the left side of FIG. 3 each time M columns are input, and divides it into a component L having low frequency and a component H having high frequency in the horizontal direction for each line. The horizontal analysis filtering result 162 shown in the right side of FIG. 3 indicates components L having low frequency and components H having high frequency in the horizontal direction, corresponding to an amount of N lines which are divided by the wavelet transform unit 151.

Next, the wavelet transform unit 151 performs the analysis filtering in the vertical direction (vertical analysis filtering) for the respective component of the horizontal analysis filtering result 162. If coefficients of vertical lines necessary for the vertical analysis filtering are generated through the horizontal analysis filtering, the wavelet transform unit 151 performs the vertical analysis filtering for the coefficients of vertical lines necessary for the vertical analysis filtering for each column.

As a result, the horizontal analysis filtering result 162 is divided into wavelet transform coefficients (hereinafter, referred to as a coefficient) of four components including, as shown in the left side of FIG. 4, a component (an LL component) which has low frequency in both of the horizontal direction and the vertical direction, a component (an HL component) which has high frequency in the horizontal direction and low frequency in the vertical direction, a component (an LH component) which has low frequency in the horizontal direction and high frequency in the vertical direction, and a component (an HH component) which has high frequency in both of the horizontal direction and the vertical direction (hierarchical data 163).

Until coefficients of a predetermined hierarchy (division level) are obtained, the HL component, the LH component, and the HH component among the obtained analysis filtering results are output to an external device. The remaining LL component undergoes the second analysis filtering in the wavelet transform unit 151. In other words, for example, the hierarchical data 163 shown in the left side of FIG. 4 is transformed into the hierarchical data 164 shown in the right side of FIG. 4. In the hierarchical data 164, four components including an LLLL component, an LLHL component, an LLLH component, and an LLHH component are generated from the LL component.

Figure 5:
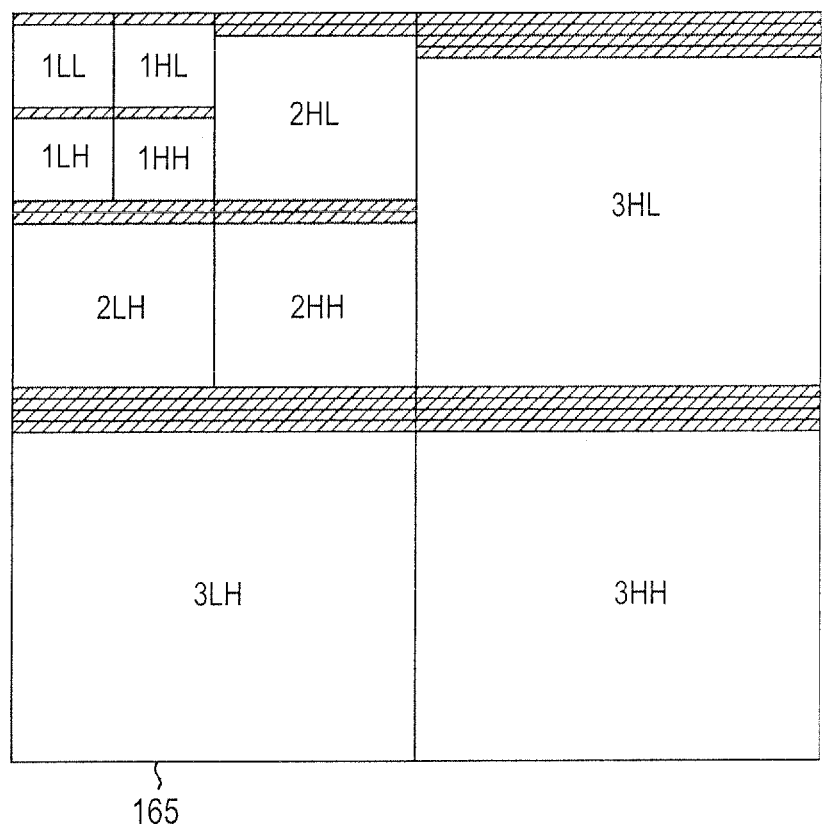
FIG. 5 is a diagram illustrating a line block.

The wavelet transform unit 151 recursively performs the analysis filtering a number of predetermined times for the moving image data and generates hierarchical data which is hierarchized up to a desired division level. FIG. 5 is a diagram illustrating an example of hierarchical data which is hierarchized up to the division level 3 (three hierarchies) In FIG. 5, the hierarchical data 165 which is divided up to the division level 3 is constituted by the respective sub-bands including the 3HL component, the 3LH component, and the 3HH component for the division level 1 (hierarchy number 3), the 2HL component, the 2LH component, and the 2HH component for the division level 2 (hierarchy number 2), and the 1LL component, the 1HL component, the 1LH component, and the 1HH component for the division level 3 (hierarchy number 1).

In the wavelet transform process, the number of generated lines becomes smaller in inverse proportion to the square of 2 each time the filtering is repeated (each time the hierarchy decreases by one lower rank). The number of lines in the baseband necessary to generate one line of coefficients of a final division level (hierarchy number 1) can be set by how many times the filtering is repeated (the number of hierarchies of the final division level). Typically, the number of hierarchies is set in advance.

Image data in the baseband (image data of a plurality of lines) necessary to generate one line of coefficients of the final division level or coefficients of each hierarchy are collectively referred to as a line block (or precinct).

In FIG. 5, parts marked with the diagonal lines are coefficients forming the one line block. As shown in FIG. 5, the line block includes the coefficients corresponding to one line of the respective components of the hierarchy number 1, the coefficients corresponding to two lines of the respective components of the hierarchy number 2, and the coefficients corresponding to four lines of the respective components of the hierarchy number 3. In addition, the image data corresponding to them before the analysis filtering is performed, that is, in this example, image data corresponding to an amount of eight lines is also referred to as a line block (or precinct).

Next, an operation method in the above-described analysis filtering will be described in detail. The most general operation method of operation methods in the analysis filtering is a method called a convolution operation. The convolution method is the most fundamental mechanism for realizing a digital filter, and performs multiplication by convolving actual input data in tap coefficients of a filter. However, in the convolution operation, in some cases, a calculation load increases as the length of the taps is long.

As a method for dealing with this situation, there is known a lifting technique of the wavelet transform, which is introduced in the paper "W. Swelden, "The lifting scheme: A custom-design construction of Biorthogonal wavelets", Applied and Computational Harmonic Analysis, vol. 3, no. 2, pp. 186-200, 1996".

Figure 6:
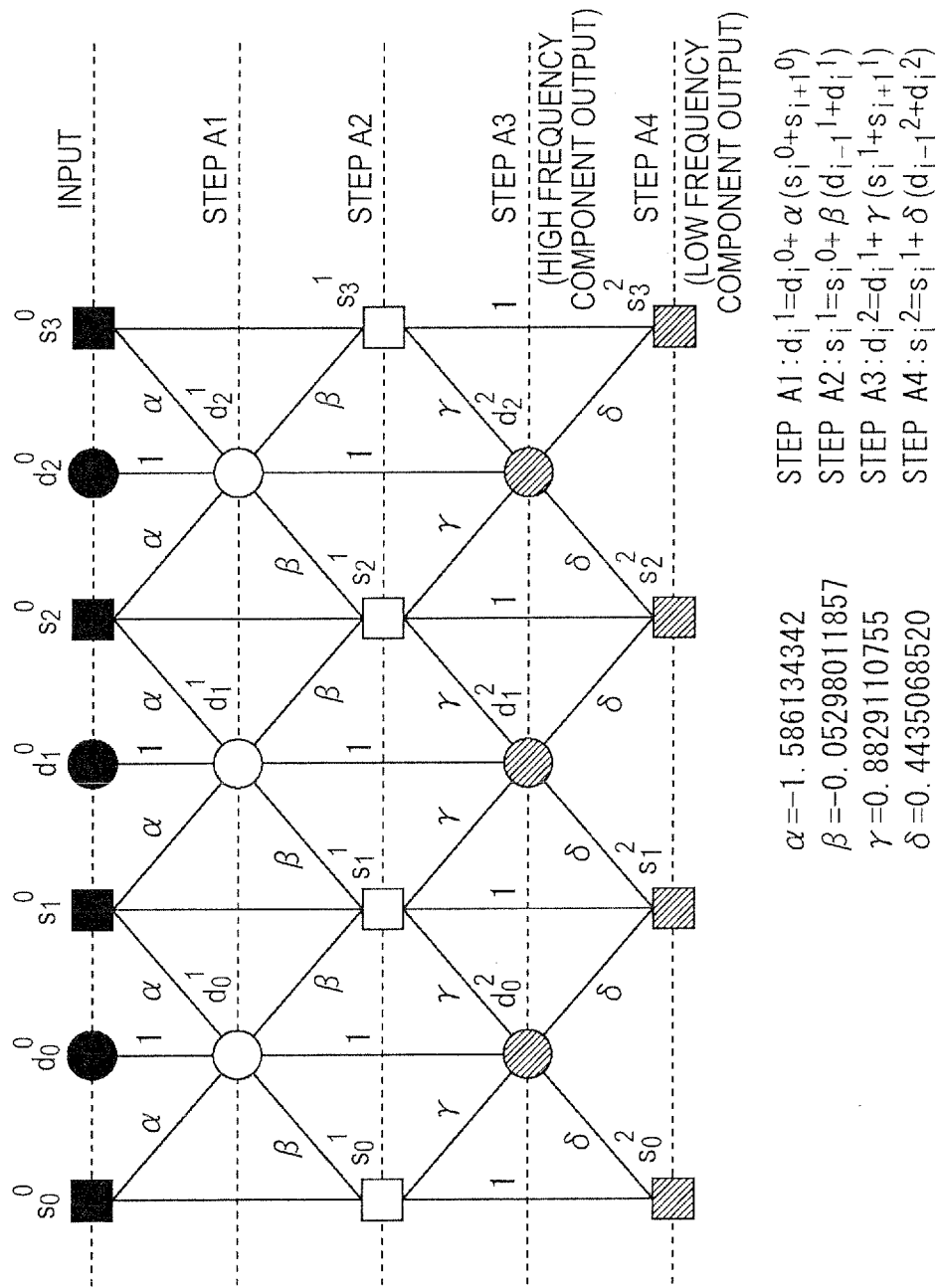
FIG. 6 is a diagram illustrating an example of a 9×7 filter.

FIG. 6 shows a lifting configuration of a 9×7 analysis filter which is also employed in the JPEG 2000 specification. The analysis filtering in a case of applying the lifting technique to the 9×7 analysis filter will now be described.

In the example in FIG. 6, the first stage (the uppermost stage) indicates a sample group (pixel lines) of an input image, and the second and third stages indicate components (coefficients) generated through processes in step A1 and step A2, respectively. In addition, the fourth stage indicates an high frequency component output generated through a process in step A3, and the fifth stage indicates a low frequency component output generated through a process in step A4. In the uppermost part, the sample group of the input image is not only positioned but also coefficients obtained by a previous analysis filtering may be positioned. Here, the sample group of the input image is assumed to be positioned in the uppermost part, the square mark (■) denotes an even-numbered sample or line, and the circle mark (●) denotes an odd-numbered sample or line.

In the analysis filtering performed by applying the lifting technique to the 9×7 analysis filter, the high frequency component can be obtained in the process in step A3, and the low frequency component can be obtained in the process in step A4. The processes in steps A1 to A4 are expressed by the following equations (1) to (4).

$$\text{step } A1: d_i^1 = d_i^0 + \alpha(s_i^0 + s_{i+1}^0) \tag{1}$$

$$\text{step } A2: s_i^1 = s_i^0 + \beta(d_{i-1}^1 + d_i^1) \tag{2}$$

$$\text{step } A3: d_i^2 = d_i^1 + \gamma(s_i^1 + s_{i+1}^1) \tag{3}$$

$$\text{step } A4: s_i^2 = s_i^1 + \delta(d_{i-1}^2 + d_i^2) \tag{4}$$

($\alpha = -1.586134342$, $\beta = -0.05298011857$, $\gamma = 0.8829110755$, $\delta = 0.4435068520$)

In this way, in the analysis filtering in the case of using the lifting technique, the processes are performed in steps A1 and A2, coefficients of the high frequency component are generated in step A3, and then coefficients of the low frequency component are generated in step A4. A filter bank used at this time is implemented simply by addition and shift as shown in the equations (1) to (4). Therefore, it is possible to greatly reduce a calculation amount. Therefore, as described below, the lifting technique is applied to the horizontal analysis filtering and the vertical analysis filtering.

Figure 7:
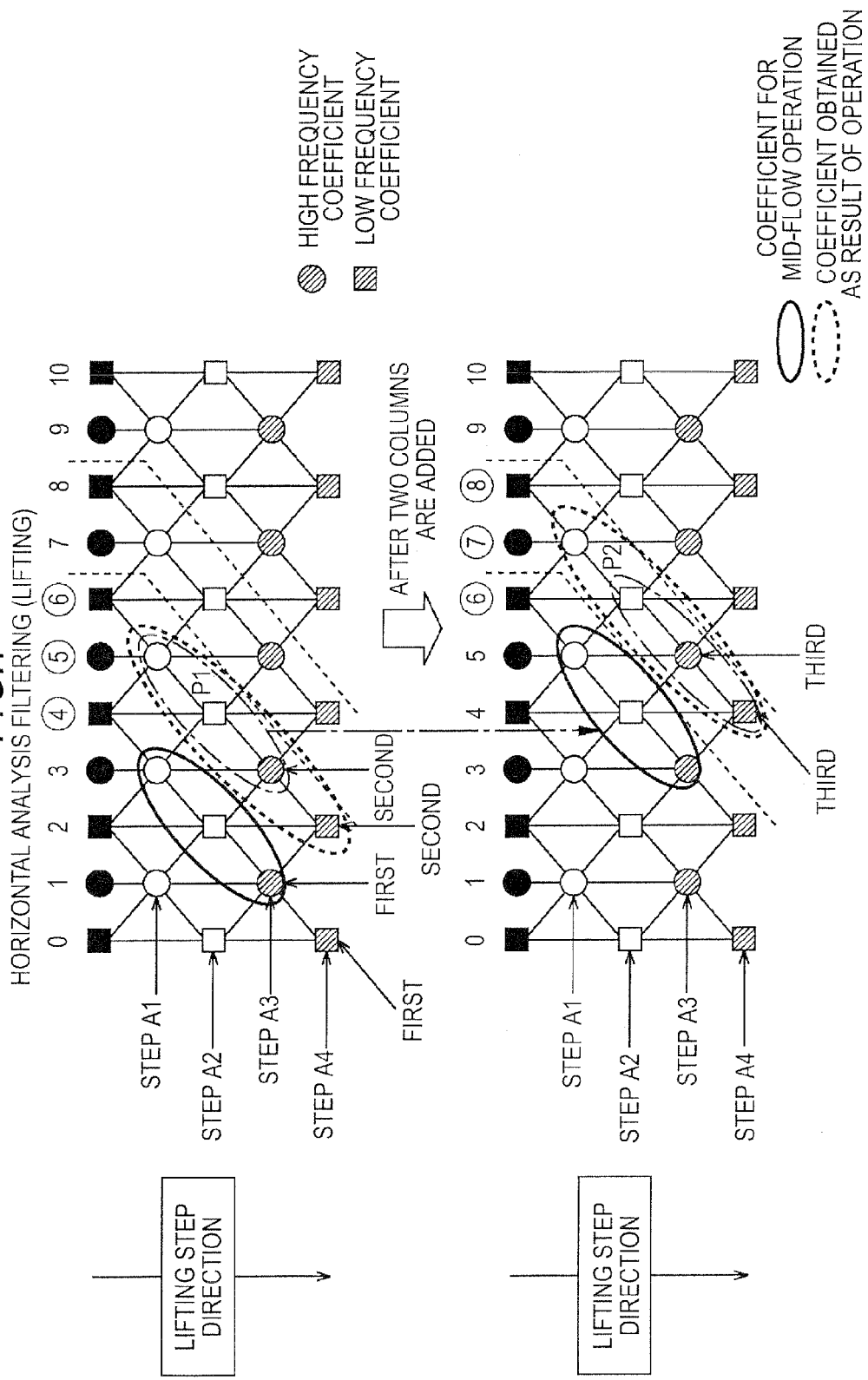
FIG. 7 is a diagram illustrating a lifting operation example.

First, the vertical analysis filtering will be described in detail. FIG. 7 shows an example where the horizontal analysis filtering is performed using the lifting configuration in FIG. 6.

In the example in FIG. 7, the above-described processes in four steps (steps A1 to A4) in FIG. 6 are performed for input coefficients in the horizontal direction, and high frequency component coefficients (hereinafter, referred to as high frequency coefficients) and low frequency component coefficients (hereinafter, referred to as low frequency coefficients) are generated, the lifting steps are moved downwardly from the top of the figure. In addition, the numbers shown on the coefficients in the horizontal direction denote column numbers.

In addition, the circles and the squares in the first stage from above respectively denote input high frequency coefficients and low frequency coefficients, and the circles and the squares from the second stage respectively denote high frequency coefficients and low frequency coefficients generated during the lifting operation. Among them, the circles and the squares with the diagonal lines respectively denote high frequency coefficients and low frequency coefficients obtained by the lifting operation.

Hereinafter, the operation will be sequentially described from above. The upper part of FIG. 7 shows an example where coefficients of three columns having column numbers 4 to 6 in the horizontal direction are input and undergo an operation using the lifting configuration in the horizontal direction (hereinafter, referred to as a horizontal lifting operation)

In order to obtain the first high frequency coefficient in step A3 and obtain the first low frequency coefficient in step A4 in the horizontal lifting operation, it is necessary for coefficients of four columns having column numbers 0 to 4 to be input.

Thereafter, in order to obtain the second high frequency coefficient and low frequency coefficient, three coefficients marked with the thick solid line and coefficients of two columns having column numbers 5 and 6 marked with circled numbers are necessary, and, further, in order to calculate a coefficient denoted by P1 in step A2, a coefficient of column number 4 marked with the circled number is necessary.

The three coefficients marked with the thick solid lines are a portion of coefficients generated during the horizontal lifting operation for obtaining the first high frequency coefficient and low frequency coefficient (hereinafter, also referred to as a first horizontal lifting operation)

That is to say, in order to obtain the second high frequency coefficient and low frequency coefficient, it is finally necessary for the coefficients of three columns having the column numbers 4 to 6 marked with the circled numbers to be input, and further, it is necessary for the three coefficients which are marked with the thick solid line and are generated during the first horizontal lifting operation, to be latched as coefficients for mid-flow operation. Actually, the number of coefficients is three at most, and thus they can be handled by using a small capacity of storage region such as a flip-flop.

Therefore, the horizontal lifting operation is performed using the three coefficients, marked with the thick solid line, which have been latched in the first horizontal lifting operation and the input coefficients of three columns having the column numbers 4 to 6. Thereby, during and after the operation, four coefficients (marked with the thick dotted line) including the second high frequency coefficient and low frequency coefficient are generated. Among them, the three coefficients marked with the chain line are coefficients used to obtain third high frequency coefficient and low frequency coefficient, and thus are latched in an embedded flip-flop as coefficients as mid-flow operation.

The lower part of FIG. 7 shows an example where a coefficient having the column number 6 is input, and then coefficients of two columns in the horizontal direction are additionally input, that is, the coefficients of three columns having the column numbers 6 to 8 are input, and the horizontal lifting operation is performed.

In the same manner as the second case, in order to obtain the third high frequency coefficient and low frequency coefficient, three coefficients marked with the thick solid line and coefficients of two columns having the column numbers 7 and 8 marked with the circled numbers are necessary, and, in order to calculate a coefficient denoted by P2 in step A2, the coefficient having the column number 6 marked with the circled number is also necessary.

The three coefficients marked with the thick solid line in the lower part is latched in the flip-flop in the second horizontal lifting operation as marked with the chain line in the upper part.

Therefore, the horizontal lifting operation is performed using the three coefficients, marked with the thick solid line, which have been latched in the second horizontal lifting operation and the input coefficients of three columns having the column numbers 6 to 8. Thereby, four coefficients (marked with the thick dotted line) including the third high frequency coefficient and low frequency coefficient are generated. Among them, the three coefficients marked with the chain line are coefficients used to obtain fourth high frequency coefficient and low frequency coefficient, and thus are latched in the embedded flip-flop.

In this way, while coefficients of three columns are sequentially input and three coefficients for mid-flow operation are held, the horizontal lifting operation is performed up to the rightmost column of the image and thus the analysis filtering in the horizontal direction is completed.

In the above description, although the example of the horizontal analysis filtering corresponding to one line using the lifting configuration has been described, an operation in which lines of coefficients are sequentially input downwardly from above and the horizontal analysis filtering is performed using the lifting configuration will be described with reference to FIG. 8. In addition, in FIG. 8, coefficients corresponding to those in FIGS. 6 and 7 are shown in the same manner and thus the description thereof will be omitted.

Figure 8:
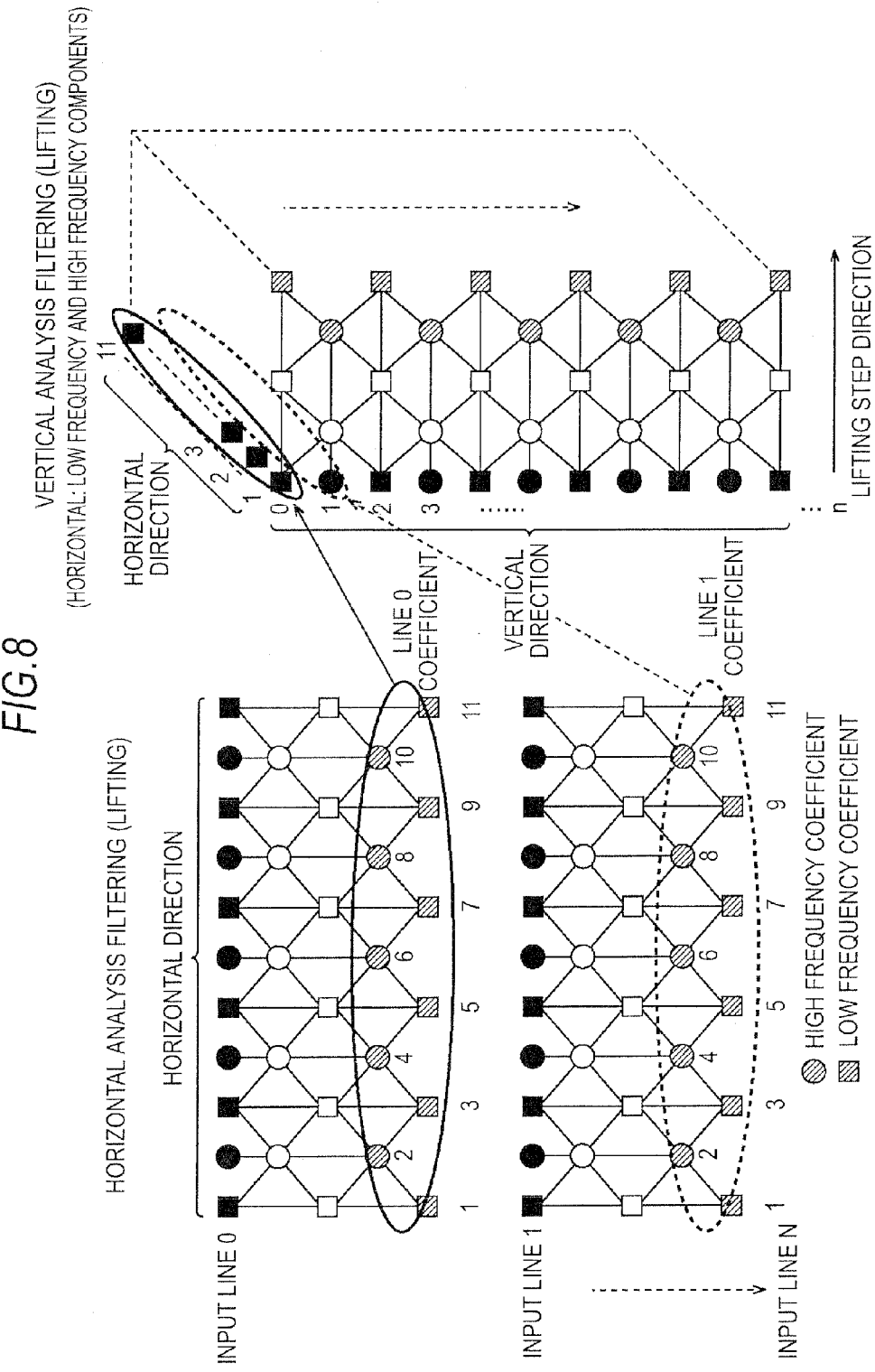
FIG. 8 is a diagram illustrating a lifting operation example.

The left part of FIG. 8 shows an example where the horizontal lifting operation is performed for each input line, and the right part thereof conceptually shows an example where the vertical lifting operation is performed for coefficients obtained by performing the horizontal lifting operation for the respective input lines which are developed vertically from above.

If sequentially described from the left part of the figure, the coefficients in the leading input line 0 undergo the horizontal lifting operation formed by the four steps and generate the low frequency coefficients and high frequency coefficients with the numbers 1 to 11. Among them, the coefficients with the odd numbers 1, 3, 5, 7, 9 and 11 are low frequency coefficients and the coefficients with the even numbers 2, 4, 6, 8 and 10 are high frequency coefficients.

Although only the input line 1 is shown in the figure, this is true of an input line 1 to an input line n. In other words, the coefficients in the leading input line 1 undergo the horizontal lifting operation formed by the four steps and generate the low frequency coefficients and high frequency coefficients with the numbers 1 to 11, and among them, the coefficients with the odd numbers 1, 3, 5, 7, 9 and 11 are low frequency coefficients and the coefficients with the even numbers 2, 4, 6, 8 and 10 are high frequency coefficients.

Further, as shown in the right part of FIG. 8, the coefficients with the numbers 1 to 11 obtained by performing the horizontal filtering for the input line 0 are horizontally developed in series in the first stage from above from the front side to the rear side. The coefficients with the numbers 1 to 11 obtained by performing the horizontal filtering for the input line 1 are horizontally developed in series in the second stage from above from the front side to the rear side. The coefficients obtained by performing the horizontal filtering for the input line 2 are horizontally developed in series in the third stage from above from the front side to the rear side.

As such, the coefficients obtained by performing the horizontal filtering for the respective input lines 0 to n are sequentially developed vertically from above as shown in the right part of FIG. 8. In addition, actually, for the coefficient with the numbers 1 to 11 obtained by performing the horizontal filtering for each input line, the low frequency component and the high frequency component are alternately arranged in the horizontal direction from the front side to the rear side.

In addition, each time the coefficients in the vertical direction are collected by a predetermined number, that is, a predetermined number of lines is collected, as shown in the lifting step direction in the right part, the operation using the lifting configuration in the vertical direction (that is, the vertical lifting operation) is performed from the light side to the right side.

Figure 9:
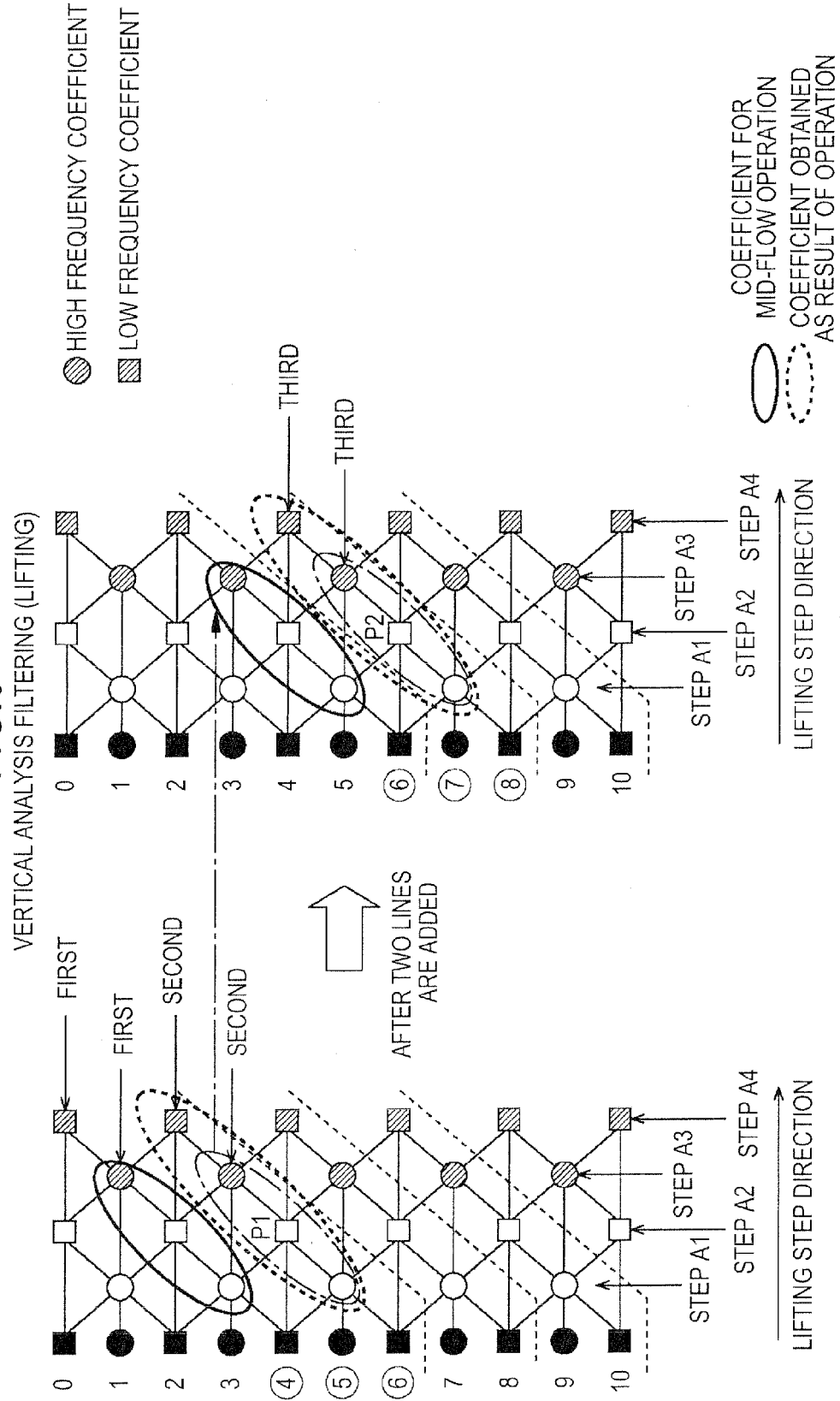
FIG. 9 is a diagram illustrating a lifting operation example.

Next, the vertical analysis filtering will be described in detail. FIG. 9 shows an example in which the analysis filtering in the vertical direction is performed using the lifting configuration in FIG. 6.

In addition, FIG. 9 focuses on one coefficient which is developed and arranged in the horizontal direction shown in the right part of FIG. 8, and it is apparent that, in the actual two-dimensional wavelet transform, calculation for the analysis filtering in the vertical direction is necessary for only the number of coefficients in the horizontal direction of frequency components (sub-bands) which are generated during the wavelet transform.

FIG. 9 shows an example in which the coefficients in the vertical direction undergo the processes in the above-described four steps (steps A1 to A4) in FIG. 6 and generate high frequency coefficients and low frequency coefficients, and the lifting step direction is moved from the left side of the figure to the right side thereof. The numbers shown in the left side of the coefficients in the vertical direction denote line numbers.

In addition, the circles and the squares in the first column from the left side respectively denote high frequency coefficients and low frequency coefficients, and the circles and the squares from the second column respectively denote high frequency coefficients and low frequency coefficients generated during the lifting operation. Among them, the circles and the squares with the diagonal lines of high frequency coefficients and low frequency coefficients, respectively, are obtained as a result of the lifting operation.

Hereinafter, the operation will be sequentially described from the left side. The left part of FIG. 9 shows an example where coefficients of three lines having line numbers 4 to 6 in the vertical direction are input and undergo the vertical lifting operation.

In order to obtain the first high frequency coefficient in step A3 and obtain the first low frequency coefficient in step A4 in the vertical lifting operation, it is necessary for coefficients of four lines having line numbers 0 to 4 to be input.

Thereafter, in order to obtain the second high frequency coefficient and low frequency coefficient, three coefficients marked with the thick solid line and coefficients of two lines having line numbers 5 and 6 marked with circled numbers are necessary, and, further, in order to calculate a coefficient denoted by P1 in step A2, a coefficient of line number 4 marked with the circled number is necessary.

The three coefficients marked with the thick solid lines are a portion of coefficients generated during the vertical lifting operation for obtaining the first high frequency coefficient and low frequency coefficient (hereinafter, also referred to as a first vertical lifting operation).

That is to say, in order to obtain the second high frequency coefficient and low frequency coefficient, it is finally necessary for the coefficients of three lines having the line numbers 4 to 6 marked with the circled numbers to be input. Further, the three coefficients which are marked with the thick solid line and are generated during the first horizontal lifting operation are necessary. The wavelet transform unit 151 stores the three coefficients as coefficients for mid-flow operation.

Therefore, the vertical lifting operation is performed using the three coefficients, marked with the thick solid line, which have been stored in the first vertical lifting operation and the coefficients of three lines having the column numbers 4 to 6 which are read from a buffer of a corresponding level and are input. Thereby, four coefficients (marked with the thick dotted line) including the second high frequency coefficient and low frequency coefficient are obtained. Among them, the three coefficients marked with the chain line are coefficients used to obtain third high frequency coefficient and low frequency coefficient, and thus are stored.

The right part of FIG. 9 shows an example where a coefficient having the line number 6 is read, and then coefficients of two lines in the vertical direction are additionally read, that is, the coefficients of three lines having the column numbers 6 to 8 are input, and the vertical lifting operation is performed.

In the same manner as the second case, in order to obtain the third high frequency coefficient and low frequency coefficient, three coefficients marked with the thick solid line and coefficients of two lines having the line numbers 7 and 8 marked with the circled numbers are necessary, and, in order to calculate a coefficient denoted by P2 in step A2, the coefficient having the line number 6 marked with the circled number is also necessary.

The three coefficients marked with the thick solid line in the right part are stored in the second vertical lifting operation as marked with the chain line in the left part. Therefore, the vertical lifting operation is performed using the three coefficients, marked with the thick solid line, which have been stored in the second vertical lifting operation and the input coefficients of three lines having the line numbers 6 to 8 which are read from a buffer of a corresponding level. Thereby, four coefficients (marked with the thick dotted line) including the third high frequency coefficient and low frequency coefficient are generated. Among them, the three coefficients marked with the chain line are coefficients used to obtain a fourth high frequency coefficient and low frequency coefficient, and thus are stored.

In this way, while coefficients of three lines are sequentially input and three coefficients for mid-flow operation are held, the vertical lifting operation is performed up to the lowermost line and thus the analysis filtering in the vertical direction is completed.

Referring to FIG. 2 again, the quantization unit 152 quantizes the coefficients of the respective components generated by the wavelet transform unit 151 by dividing the coefficients by, for example, quantization step size, and generates quantization coefficients. At this time, the quantization unit 152 may set the quantization step size for each line block (precinct). The line block includes the coefficients of all the frequency components in a certain image region (in the case of FIG. 5, ten frequency components from 1LL to 3HH), and thus the quantization for each line block can achieve the advantage in the multiple resolution analysis which is a feature of the wavelet transform. In addition, only the number of the line blocks is set, and thus a load of the quantization is reduced.

In addition, since energy of an image signal is generally concentrated on the low frequency components and further the human eye is sensitive to deterioration in low frequency components, it is preferable to perform weighting during the quantization such that the quantization step size in the sub-bands of the low frequency components resultantly has a small value. By this weighting, a relatively large amount of information is allocated to the low frequency components and subjective image quality is entirely improved.

The entropy encoding unit 153 performs source coding for the quantization coefficients generated by the quantization unit 152 and generates compressed encoded code streams.

The source coding may use, for example, the Hoffman coding described in the JPEG scheme or the MPEG (Moving Picture Experts Group) scheme or a high density arithmetic coding described in the JPEG 2000 scheme.

Here, whether the entropy encoding is performed for coefficients in which range is a very important factor which is directly related to compression efficiency. For example, in the JPEG scheme or the MPEG scheme, DCT (Discrete Cosine Transform) is performed for an 8×8 block, and information is compressed by performing the Huffman coding for the generated 64 DCT coefficients. In other words, the 64 DCT coefficients belong to a range of the entropy encoding.

The wavelet transform unit 151 performs the wavelet transform for the 8×8 block with line units unlike the DCT, and thus the entropy encoding unit 153 performs the source coding for the block independently for each frequency band (sub-band) and further every P line (s) in each frequency band.

P is one line as the minimum, since reference information is little in a case where the number of lines is small, a memory capacity can be reduced. In contrast, in a case of the number of lines is large, since an amount of information is increased accordingly, encoding efficiency can be improved. However, if P becomes a value exceeding the number of lines in a line block in each frequency band, even lines in a next line block are necessary. For this reason, the entropy encoding unit 153 waits for quantization coefficient data for the line block to be generated by the wavelet transform and the quantization, and this waiting time becomes a delay time.

Therefore, for the short delay, P is preferably equal to or less than the number of lines of a line block. For example, in the example shown in FIG. 5, since the number of lines of the line block is one in the frequency bands of 1LL, 1HL, 1LH, and 1HH, P is 1. In addition, since the number of lines of the line block is two in the sub-bands of 2HL, 2LH, and 2HH, P is 1 or 2.

The rate control unit 154 finally performs control according to a target bit rate or compression ratio, and outputs the encoded code streams after the rate control to an external device. For example, the rate control unit 154 transmits a control signal to the quantization unit 152 so as to decrease the quantization step size in a case of increasing the bit rate, and to increase the quantization step size in a case of decreasing the bit rate.

Figure 10:
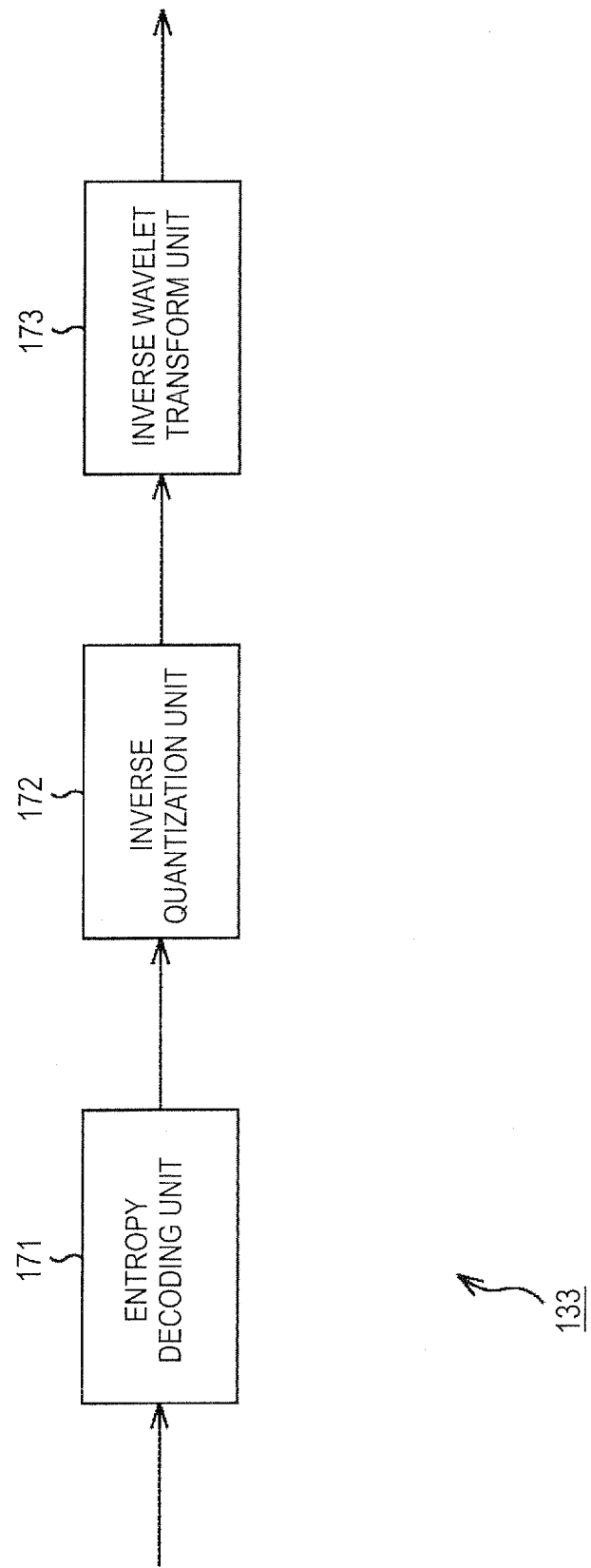
FIG. 10 is a block diagram illustrating a configuration example of a moving image decompression decoding unit.

Next, a method for performing the decompression decoding for the encoded data having undergone the compression encoding will be described. FIG. 10 is a block diagram illustrating a configuration example of the moving image decompression decoding unit 133 which performs the decompression decoding. In FIG. 10, the moving image decompression decoding unit 133 includes an entropy decoding unit 171, an inverse quantization unit 172, and an inverse wavelet transform unit 173.

The entropy decoding unit 171 performs source decoding for the input encoded data and generates quantization coefficient data. The source decoding may use, for example, Huffman decoding or high efficiency arithmetic decoding, corresponding to the source coding in the moving image compression encoding unit 121. In addition, when the source coding has been performed every P line (s) in the moving image compression encoding unit 121, the entropy decoding unit 171, in the same manner, independently performs the source decoding for each sub-band and every P line (s) in each sub-band.

The inverse quantization unit 172 performs the inverse quantization by multiplying the quantization coefficient data by the quantization step size and generates coefficient data.

The quantization step size is typically described in headers of the encoded code streams. In addition, when the quantization step size has been set for each line block in the moving image compression encoding unit 121, the inverse quantization unit 172, in the same manner, performs the inverse quantization by setting an inverse quantization step size for each line block.

The inverse wavelet transform unit 173 performs a process reverse to the process in the wavelet transform unit 151. In other words, the inverse wavelet transform unit 173 performs filtering (synthesis filtering) which synthesizes low frequency components and high frequency components for the coefficient data which is divided into a plurality of frequency bands by the wavelet transform unit 151, in both of the horizontal direction and the vertical direction.

Since the filtering can be efficiently performed corresponding to the analysis filtering when the above-described lifting technique is applied, in the same manner, it is preferable to use the lifting technique for the synthesis filtering of the inverse wavelet transform.

Figure 11:
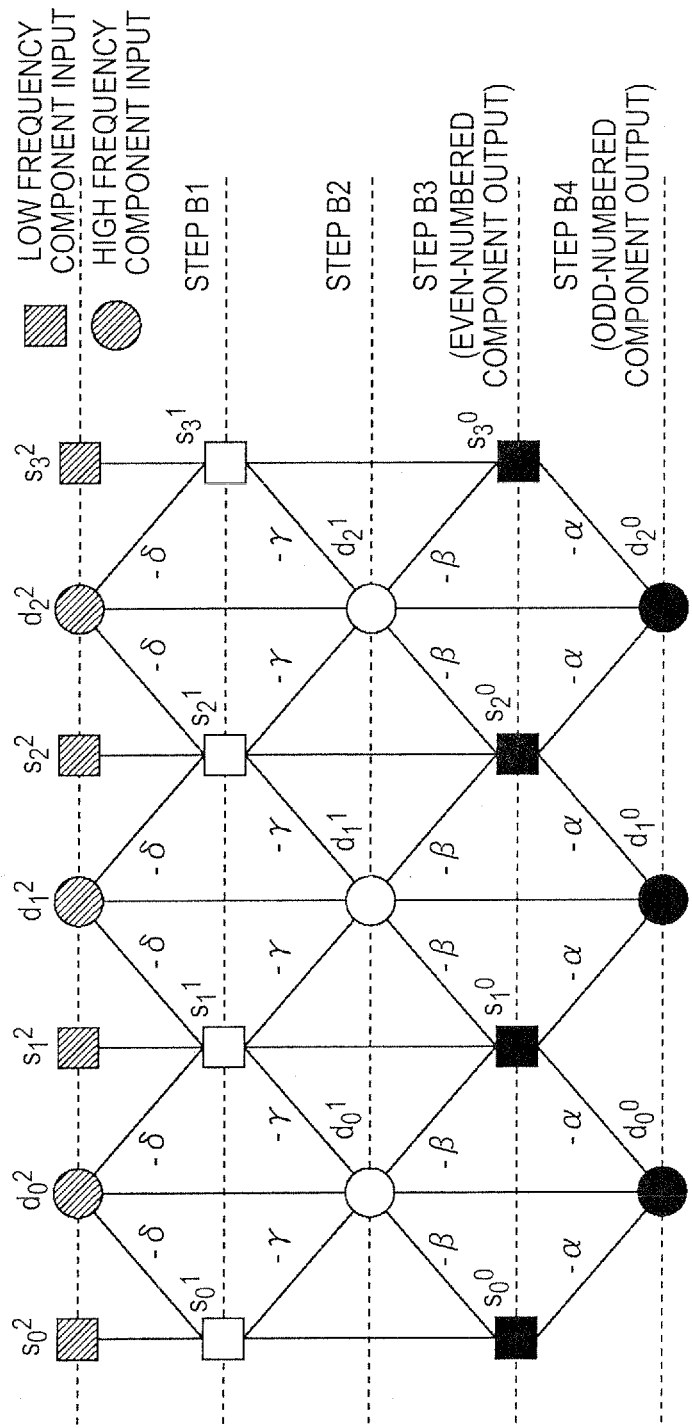
FIG. 11 is a diagram illustrating an example of a 9×7 filter.

FIG. 11 shows a lifting configuration of a 9×7 analysis filter employed in the JPEG 2000 specification. The synthesis filtering in a case where the lifting technique is applied to the 9×7 analysis filter will be described.

In the example in FIG. 11, the first stage (the uppermost stage) indicates the coefficients generated by the wavelet transform, the circle mark (●) denotes a high frequency component and the square mark (■) denotes a low frequency component. The second and third stages respectively indicate components (coefficients) generated in processes in steps B1 and B2. In addition, the fourth stage indicates even-numbered component outputs generated in a process in step B3, and the fifth stage indicates odd-numbered component outputs generated in a process in step B4.

In the synthesis filtering in the case where the lifting technique is applied to the 9×7 analysis filter, the even-numbered components can be obtained in the process in step B3 and the odd-numbered components can be obtained in the process in step B4. The processes in steps B1 to B4 are expressed by the following equations (5) to (8).

$$\text{step } B1: s_i^1 = s_i^2 - \delta(d_{i-1}^2 + d_i^2) \quad (5)$$

$$\text{step } B2: d_i^1 = d_i^3 - \gamma(s_i^1 + s_{i+1}^1) \quad (6)$$

$$\text{step } B3: s_i^0 = s_i^1 - \beta(d_{i-1}^1 + d_i^1) \quad (7)$$

$$\text{step } B4: d_i^0 = d_i^1 - \alpha(s_i^0 + s_{i+1}^0) \quad (8)$$

($\alpha = -1.586134342$, $\beta = -0.05298011857$, $\gamma = 0.8829110755$, $\delta = 0.4435068520$)

In this way, in the synthesis filtering in the case of using the lifting technique, the processes are performed in steps B1 and B2, coefficients of the even-numbered component are generated in step B3, and then coefficients of the odd-numbered component are generated in step B4. A filter bank used at this time is implemented simply by division and shift as shown in the equations (5) to (8). Therefore, it is possible to greatly reduce a calculation amount.

Therefore, as described below, in the inverse wavelet transform unit 173 as well, the lifting technique is applied to the synthesis filtering in the image vertical direction (vertical synthesis filtering) and the synthesis filtering in the image horizontal direction (horizontal synthesis filtering). The vertical synthesis filtering performs basically the same operation as the vertical analysis filtering described with reference to FIG. 6 except for equations to be used, and the horizontal synthesis filtering performs basically the same operation as the horizontal analysis filtering described with reference to FIG. 7.

Figure 12:
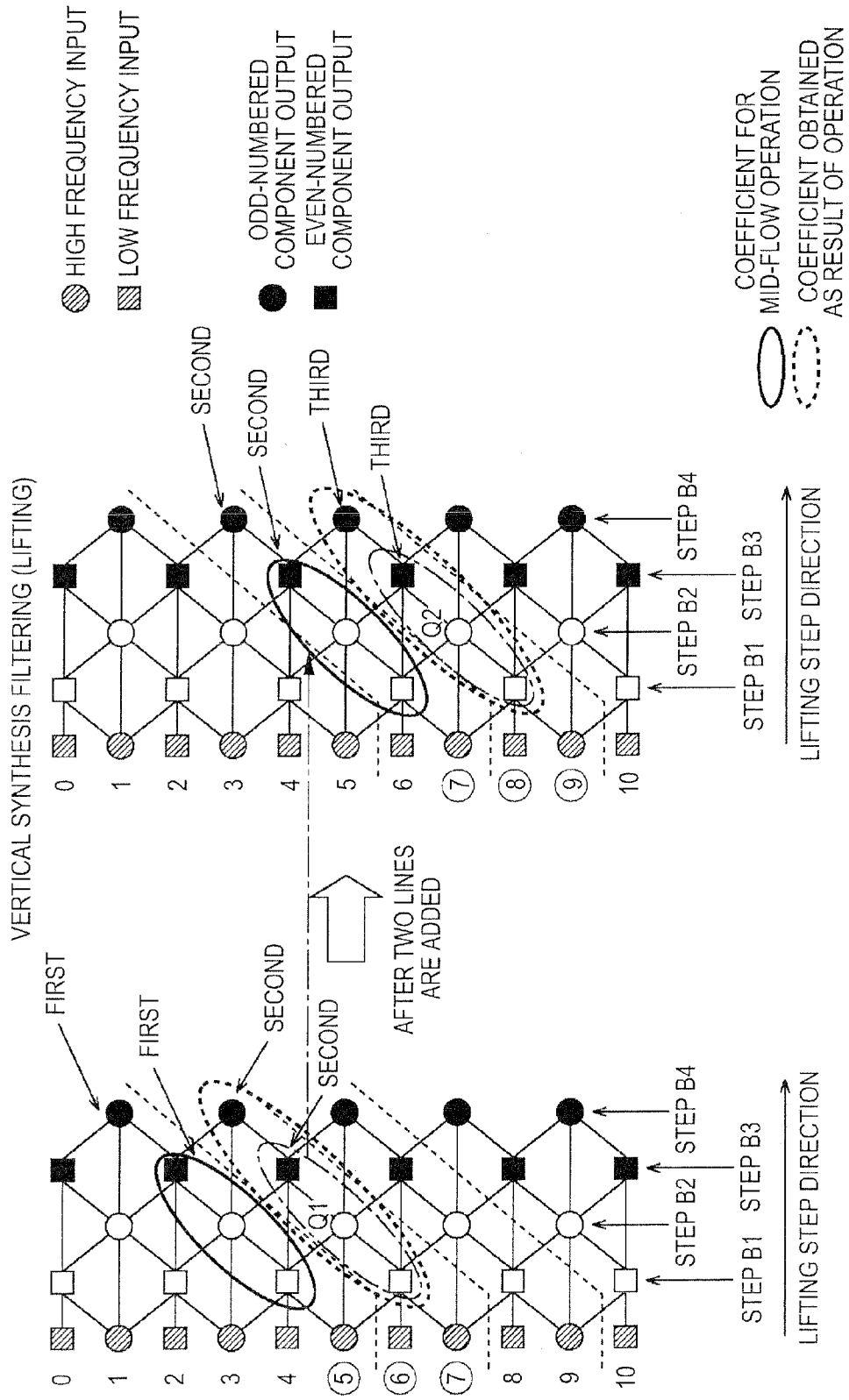
FIG. 12 is a diagram illustrating a lifting operation example.

First, the vertical synthesis filtering will be described in detail. FIG. 12 shows an example where the vertical synthesis filtering is performed for coefficient groups in the vertical direction using the lifting configuration in FIG. 11.

In the example in FIG. 12, the above-described processes in four steps (steps B1 to B4) in FIG. 11 are performed for the coefficient in the vertical direction, and even-numbered coefficients (hereinafter, also referred to as even coefficients) and odd-numbered components (hereinafter, referred to as odd coefficients) are generated, the lifting steps are moved from the left side to the right side in the figure.

In addition, the numbers shown in the left side of the coefficients in the vertical direction denote line numbers, and the circles and the squares with the diagonal lines in the first column from the left side respectively denote high frequency inputs and low frequency inputs. The circles and the squares from the second column respectively denote high frequency coefficients and low frequency coefficients generated during the lifting operation, and among them, the black circles and the black squares respectively denote odd coefficients and even coefficients obtained as a result of the lifting operation.

Hereinafter, the operation will be sequentially described from the left side. The left part of FIG. 12 shows an example where coefficients of three lines having line numbers 4 to 6 in the vertical direction are input and undergo an operation using the lifting configuration in the vertical direction (that is, the vertical lifting operation). In addition, in this case, the even coefficient in the uppermost side does not form a pair with an odd coefficient, and thus the description thereof will be omitted.

In order to obtain the first even coefficient in step B3 in the vertical lifting operation and obtain the first odd coefficient in step B4, coefficients of six lines having the line numbers 0 to 5 are necessary.

Thereafter, in order to obtain the second even coefficient and odd coefficient, three coefficients marked with the thick solid line and coefficients of two lines having line numbers 6 and 7 marked with the circled numbers are necessary, and, further, in order to calculate a coefficient denoted by Q1 in step B2, a coefficient of line number 5 marked with the circled number is necessary.

The three coefficients marked with the thick solid lines are a portion of coefficients generated during the vertical lifting operation for obtaining the first even coefficient and odd coefficient (hereinafter, also referred to as a first vertical lifting operation).

Thus, in order to obtain the second even coefficient and odd coefficient, it is finally necessary for the coefficients of three lines having the line numbers 5 to 7 marked with the circled numbers to be input, and further, the three coefficients which are marked with the thick solid line and are generated during the first horizontal lifting operation are stored. At this time, the coefficients of three lines in the vertical direction are read for each level.

Therefore, the vertical lifting operation is performed using the three coefficients, marked with the thick solid line, which have been stored in a buffer in the first vertical lifting operation and the input coefficients of three lines having the column numbers 5 to 7. Thereby, four coefficients (marked with the thick dotted line) including the second even coefficient and odd coefficient are obtained. Among them, the three coefficients marked with the chain line are coefficients used to obtain third even coefficient and odd coefficient, and thus are stored.

The right part of FIG. 12 shows an example where a coefficient having the line number 7 is read, and then coefficients of two lines in the vertical direction are additionally read, that is, the coefficients of three lines having the line numbers 7 to 9 are input, and the vertical lifting operation is performed.

In the same manner as the second case, in order to obtain the third even coefficient and odd coefficient, three coefficients marked with the thick solid line and coefficients of two lines having the line numbers 8 and 9 marked with the circled numbers are necessary, and, in order to calculate a coefficient denoted by Q2 in step B2, the coefficient having the line number 7 marked with the circled number is also necessary.

The three coefficients marked with the thick solid line in the right part are stored in a coefficient buffer in the second vertical lifting operation as marked with the chain line in the left part.

Therefore, the vertical lifting operation is performed using the three coefficients, marked with the thick solid line, which have been stored in the second vertical lifting operation and the input coefficients of three lines having the line numbers 7 to 9. Thereby, four coefficients (marked with the thick dotted line) including the third even coefficient and odd coefficient are generated. Among them, the three coefficients marked with the chain line are coefficients used to obtain the fourth even coefficient and odd coefficient, and thus are stored.

In this way, while coefficients of three lines are sequentially input and three coefficients for mid-flow operation are held, the vertical lifting operation is performed up to the lowermost line and thus the synthesis filtering in the vertical direction is completed.

Figure 13:
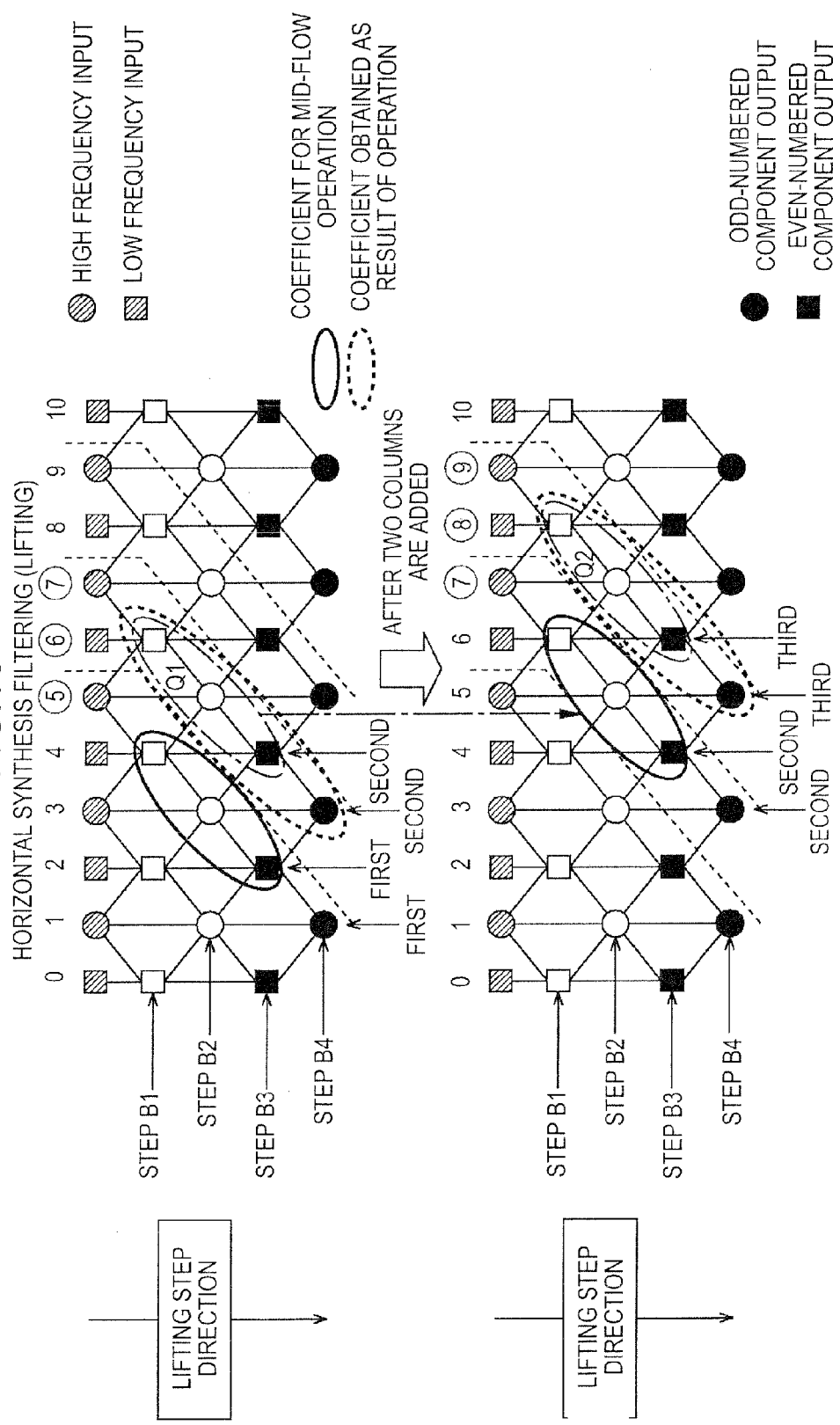
FIG. 13 is a diagram illustrating a lifting operation example.

Next, the vertical synthesis filtering will be described in detail. FIG. 13 shows an example where the results of the synthesis filtering in the vertical direction are arranged in the horizontal direction, and the horizontal synthesis filtering is performed using the lifting configuration in FIG. 11.

In the example in FIG. 13, the above-described processes in four steps (steps B1 to B4) in FIG. 11 are performed for the coefficients in the horizontal direction, and even coefficients and odd coefficients are generated, the lifting steps are moved downwardly from the top of the figure.

In addition, the numbers shown on the coefficients in the horizontal direction denote column numbers, the circles and the squares with the diagonal lines in the first stage from above respectively denote input high frequency inputs and low frequency inputs. The circles and the squares from the second stage respectively denote high frequency coefficients and low frequency coefficients generated during the lifting operation. Among them, the black circles and the black squares respectively denote even coefficients and odd coefficients obtained by the lifting operation.

Hereinafter, the operation will be sequentially described from above. The upper part of FIG. 13 shows an example where coefficients of three columns having column numbers 5 to 7 in the horizontal direction are input and undergo an operation using the lifting configuration in the horizontal direction (hereinafter, referred to as a horizontal lifting operation). Also, in this case, the even coefficient in the leftmost side does not form a pair with an odd coefficient, and the description thereof will be omitted.

In order to obtain the first even coefficient in step B3 and obtain the first odd coefficient in step B4 in the horizontal lifting operation, it is necessary for coefficients of six columns having column numbers 0 to 5 to be input.

Thereafter, in order to obtain the second even coefficient and odd coefficient, three coefficients marked with the thick solid line and coefficients of two columns having column numbers 6 and 7 marked with circled numbers are necessary, and, further, in order to calculate a coefficient denoted by Q1 in step B2, a coefficient of column number 5 marked with the circled number is necessary.

The three coefficients marked with the thick solid lines are a portion of coefficients generated during the horizontal lifting operation for obtaining the first odd coefficient and even coefficient (hereinafter, also referred to as a first horizontal lifting operation).

That is to say, in order to obtain the second odd coefficient and even coefficient, it is finally necessary for the coefficients of three columns having the column numbers 5 to 7 marked with the circled numbers to be input, and further, it is necessary for the three coefficients which are marked with the thick solid line and are generated during the first horizontal lifting operation, to be latched. Actually, the number of coefficients is three at most, and thus they can be handled by using a small capacity of storage region such as a flip-flop.

Therefore, the horizontal lifting operation is performed using the three coefficients, marked with the thick solid line, which have been latched in the first horizontal lifting operation and the input coefficients of three columns having the column numbers 5 to 7. Thereby, during and after the operation, four coefficients (marked with the thick dotted line) including the second odd coefficient and even coefficient are obtained. Among them, the three coefficients marked with the chain line are coefficients used to obtain third odd coefficient and even coefficient, and thus are latched in an embedded flip-flop.

The lower part of FIG. 13 shows an example where a coefficient having the column number 7 is input, and then coefficients of two columns in the horizontal direction are additionally input, that is, the coefficients of three columns having the column numbers 7 to 9 are input, and the horizontal lifting operation is performed.

In the same manner as the second case, in order to obtain the third odd coefficient and even coefficient, three coefficients marked with the thick solid line and coefficients of two columns having the column numbers 8 and 9 marked with the circled numbers are necessary, and, in order to calculate a coefficient denoted by Q2 in step B2, the coefficient having the column number 7 marked with the circled number is also necessary.

The three coefficients marked with the thick solid line in the lower part is latched in the second horizontal lifting operation as marked with the chain line in the upper part.

Therefore, the horizontal lifting operation is performed using the three coefficients, marked with the thick solid line, which have been latched in the second horizontal lifting operation and the input coefficients of three columns having the column numbers 7 to 9. Thereby, four coefficients (marked with the thick dotted line) including the third odd coefficient and even coefficient are generated. Among them, the three coefficients marked with the chain line are coefficients used to obtain fourth odd coefficient and even coefficient, and thus are latched in the embedded flip-flop.

In this way, while coefficients of three columns are sequentially input and three coefficients for mid-flow operation are held, the horizontal lifting operation is performed up to the rightmost column and thus the synthesis filtering in the horizontal direction is completed.

As described above, since the vertical synthesis filtering and the horizontal synthesis filtering can use the lifting configuration of the 9×7 wavelet transform filter as well, as described with reference to FIG. 10, it is necessary for a buffer of a corresponding division level to use a buffer for storing coefficients of each line in order to store coefficients corresponding to an amount of three lines. In addition, in order to obtain the coefficients of Q1 and Q2 in FIG. 12, a coefficient of a line which has already been used in the vertical lifting operation is used in the next vertical lifting operation.

Therefore, inside the buffer of the corresponding level, the coefficients stored in a line buffer are transmitted to a neighboring line buffer one after the other.

As such, the moving image data undergoes the compression encoding in the transmission device 101, transmitted and received as the encoded data, and undergoes the decompression decoding in the reception device 102.

Figure 14:
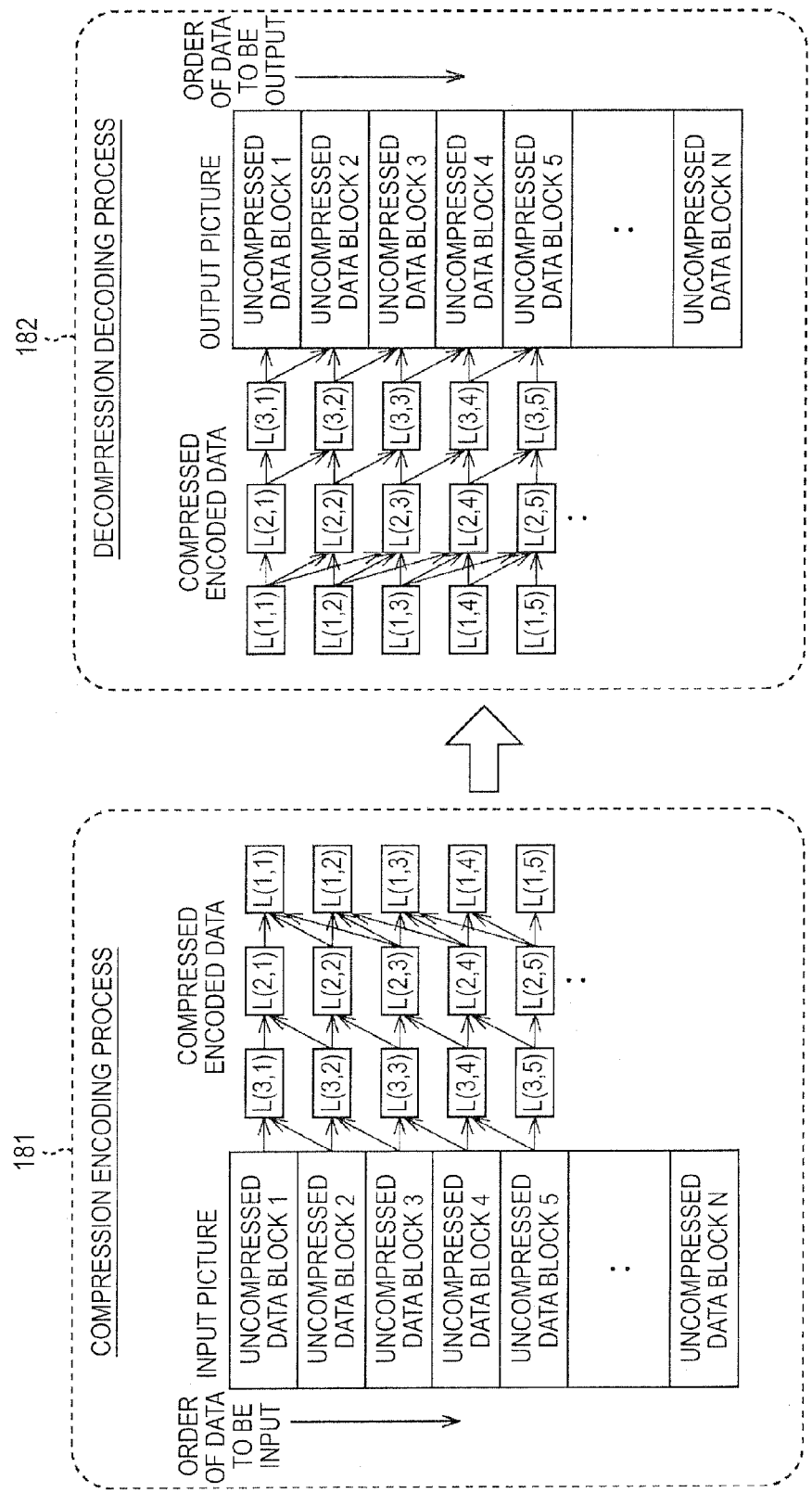
FIG. 14 is a diagram illustrating a form of the compression encoding process and decompression decoding process.

FIG. 14 schematically shows the respective compression encoding process and the decompression decoding process. The compression encoding process 181 shown in FIG. 14 is performed in the transmission device 101 and the decompression decoding process 182 is performed in the reception device 102.

As shown in FIG. 14, in the compression encoding process 181, uncompressed image data of one picture undergoes the wavelet transform each plurality of lines (line block) and is divided into a plurality of hierarchical sub-bands. The uncompressed data block 1 to the uncompressed data block N in FIG. 14 respectively indicate image data of a predetermined number of lines (for example, a line block).

L(i, n) in FIG. 14 denotes compressed encoded data of a predetermined number of lines in sub-bands of each hierarchy. Here, i denotes a hierarchy number. In addition, n denotes a number of the compressed encoded data L in each hierarchy. In the example in FIG. 14, i is 1, 2, and 3, and n is 1, 2, . . . , and N.

The compressed encoded data L(1, n) having the hierarchy number 1 is obtained by encoding the LL component, the HL component, the LH component, and the HH component in the lowest rank hierarchy, and the compressed encoded data L(i, n) (i≧2) in hierarchies having the hierarchy number 2 or more is obtained by encoding an HL component, an LH component, and an HH component in each hierarchy.

As described above, the analysis filtering is performed using the lifting operation. Therefore, the compressed encoded data L(i, n) depends on data of a plurality of blocks (blocks other than n) in a hierarchy which is higher than the corresponding hierarchy (the left side of the figure). In FIG. 14, the arrows among the uncompressed data blocks n or the compressed encoded data L(i, n) denote the dependency relationship.

For example, the compressed encoded data L(1, 1) having the hierarchy number 1 depends on the compressed encoded data L(2, 1), L(2, 2) and L(2, 3) having the hierarchy number 2, the compressed encoded data L(3, 1), L(3, 2), L(3, 3) and L(3, 4) having the hierarchy number 3, and the uncompressed data block 1, the uncompressed data block 2, the uncompressed data block 3, the uncompressed data block 4, and the uncompressed data block 5 of the uncompressed data. In addition, for example, the compressed encoded data L(2, 3) having the hierarchy number 2 depends on the compressed encoded data L(3, 2) and L(3, 3) having the hierarchy number 3, and the uncompressed data block 1 to the uncompressed data block 3 of the uncompressed data.

In this way, data of a plurality of blocks is necessary to generate compressed data of one block. The decompression decoding process 182 is realized by a process symmetric with the compression encoding process 181 as shown in FIG. 14. Therefore, the dependency relationship exists in the same manner as the encoding process.

For example, all of the uncompressed data block 1 to the uncompressed data block 5 are generated using the compressed encoded data L(1, 1) having the hierarchy number 1. In other words, the uncompressed data block 1 to the uncompressed data block 5 all depend on the compressed encoded data L(1, 1) having the hierarchy number 1.

Therefore, for example, if a irrecoverable loss (error) occurs in data of the compressed encoded data L(1, 1) having the hierarchy number 1, the error is propagated to subsequent blocks due to this dependency relationship and thus is expanded to the uncompressed data block 1 to the uncompressed data block 5.

For example, even if the lost part is concealed by complementary data, the complementary data used for the concealment causes image quality to be deteriorated because it is different from lost original data. In other words, even in this case, the error propagation as described above occurs.

If a range of the image quality deterioration is expanded in this way, the deterioration is visible. That is to say, the image quality deterioration is substantially increased.

However, in order to suppress errors from occurring, that is, to improve a recovery performance of lost packets, it is necessary to increase the FEC (Forward Error Correction) block size. However, if the FEC block becomes large, delay time is also increased. The network system 100 is a system used to transmit image data with a short delay as described above, and allowable delay time is not much. For this reason, it is difficult to improve the recovery performance of lost packets simply by increasing the FEC block size.

[Description of Process in Entire System]

Figure 15:
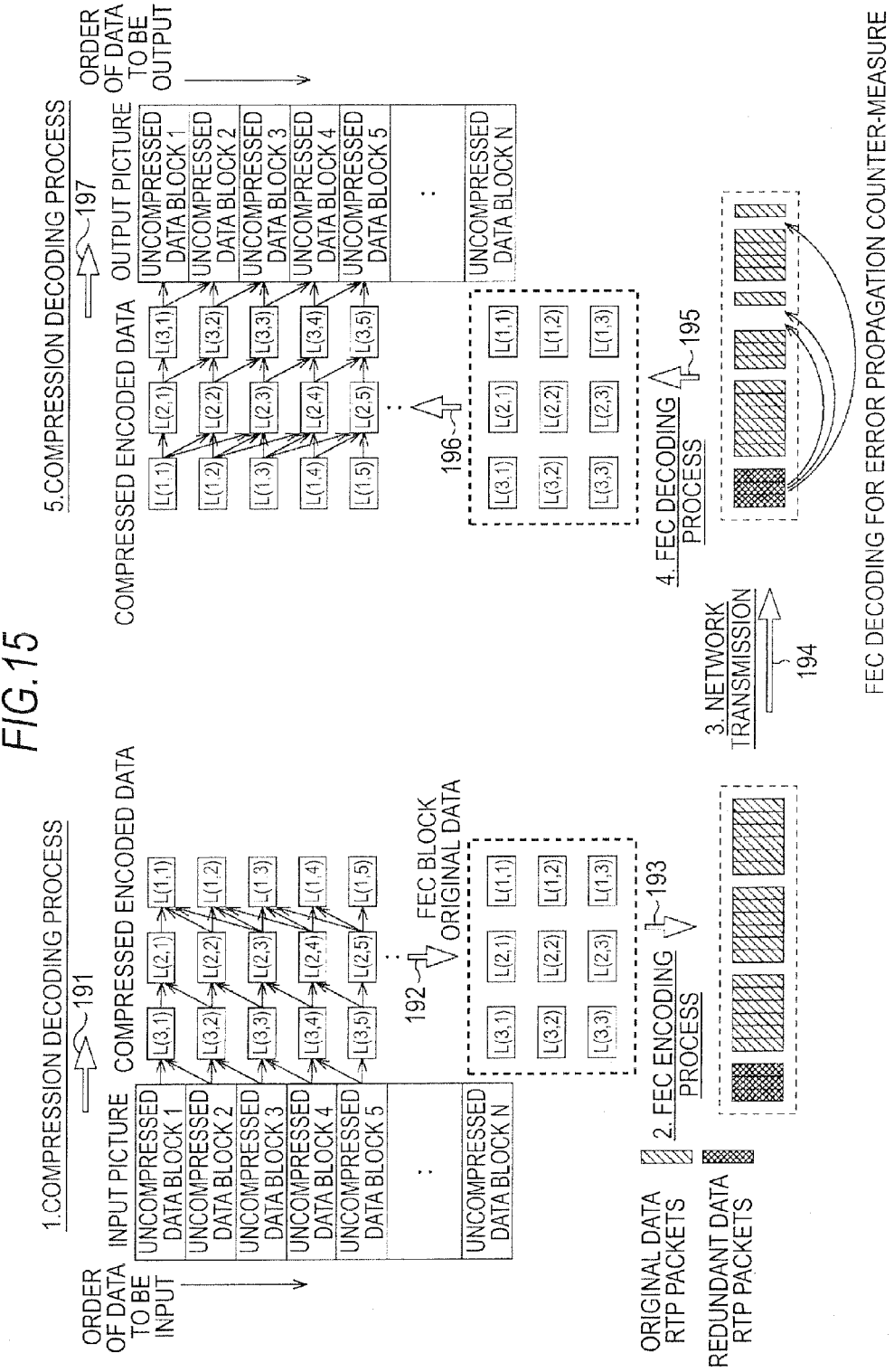
FIG. 15 is a diagram illustrating an outline of processes performed in the respective parts of the network system.

Therefore, the network system 100, as shown in FIG. 15, uses FEC such that errors which have occurred are propagated to other blocks.

For example, video data (video IN) which is input to the transmission device 101 from a video input interface via a video camera undergoes the hierarchical compression encoding by the moving image compression encoding unit 121 as described above. Each picture of the video data undergoes the wavelet transform using the lifting, as marked with the arrow 191, and is transformed into the compressed encoded data.

The compressed encoded data undergoes the FEC (Forward Error Correction) encoding with predetermined number units in the redundant encoding unit 122. The redundant encoding unit 122 generates an FEC block for the compressed encoded data according to, for example, the dependency relationship as marked with the arrow 192.

In the case of the example in FIG. 15, the FEC block for nine pieces of the compressed encoded data L (three blocks) is generated so as to include all of the compressed encoded data L on which the compressed encoded data L (for example, L(1, 1)) having the hierarchy number 1 depends.

The redundant encoding unit 122 divides the FEC block so as to be RTP-packetized (original data RTP packets) and generates redundant data (redundant data RTP packets).

The RTP transmission unit 123 transmits the respective RTP packets to the reception device 102 via the network 110 as marked with the arrow 194. The RTP reception unit 131 of the reception device 102 receives the RTP packets.

The redundant decoding unit 132 performs the FEC decoding process for the received RTP packets as marked with the arrow 195 so as to be depacketized, and extracts encoded data of each hierarchy in each block.

The data obtained through the FEC decoding in the redundant decoding unit 132 is mainly used as an error propagation counter-measure. In other words, the data is used to decode subsequent blocks.

As marked with the arrow 196, the encoded data of each hierarchy in each block having undergone the FEC decoding undergoes the decompression decoding as marked with the arrow 197 and undergoes the inverse wavelet transform. The lost data recovered by the redundant decoding unit 132 is used to synthesize other blocks in the inverse wavelet transform process.

In the inverse wavelet transform, subsequent blocks can be decoded so as not to include errors by using original data recovered through the FEC decoding. In other words, it is possible to suppress loss errors from being propagated to other blocks. Since an influence of errors can be decreased to a small scale, it is possible to suppress visual image quality deterioration which a user experiences.

For example, if a loss occurs in the compressed encoded data L (for example, L(1, 1)), as described above, there is concern that an influence of the error is expanded to the uncompressed data block 1 to the uncompressed data block 5, but the influence of the error can be limited to the uncompressed data block 1 through the suppression of the error propagation as described above.

In addition, although the FEC decoding result is used to recover lost packets, in this case, as described above, it is difficult to improve the recovery performance due to the limitation of the delay time. If there is a failure in recovery, the influence range is expanded due to the error propagation.

Therefore, as described above, the FEC decoding result is used for the error propagation counter-measure. In this case, a timing of using the FEC decoding result is delayed to a decoding process for the next subsequent block, and thus the FEC block can be made large accordingly, and the recovery performance can be easily improved.

Since it is necessary for the network system 100 to transmit data with a shorter delay, the number of lines in each block is small, and even if errors occurs in one block, a visual influence of the errors is little. In other words, the reception device 102 suppresses the error propagation as described above and thus can sufficiently image quality deterioration.

In addition, in the above description, although the method of using the wavelet transform as the compression encoding method has been described, any methods may be used as long as methods of using data of other parts of original data in order to generate encoded data with encoding (hierarchical) processing units (there is a dependency between the encoding (hierarchical) processing units), as encoding methods for decoding encoded data into a plurality of resolutions (scalable codec). For example, the methods may use ITU-T (International Telecommunication Union Telecommunication Standardization Sector) H.264/SVC (Scalable Video Codec).

[Configuration Example of Redundant Encoding Unit]

Figure 16:
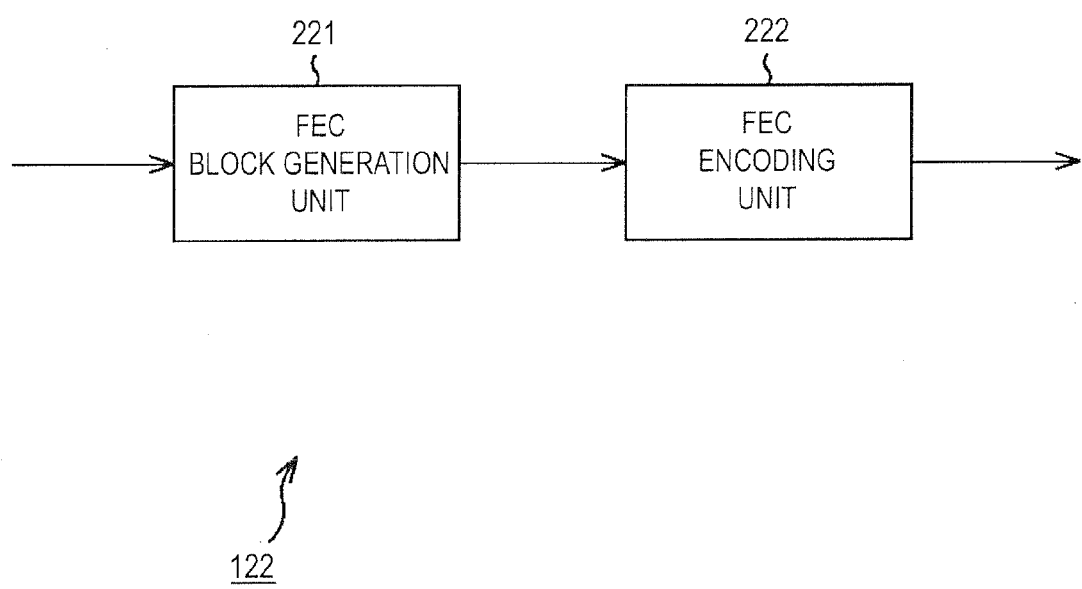
FIG. 16 is a block diagram illustrating a main configuration example of a redundant encoding unit.

Next, respective units are explained in detail. FIG. 16 is a block diagram illustrating a main configuration example of the redundant encoding unit 122 of the transmission device 101. As shown in FIG. 16, the redundant encoding unit 122 includes an FEC block generation unit 221 and an FEC encoding unit 222, generates an FEC block for encoded data with predetermined data units using the FEC block generation unit 221, and performs FEC encoding for each FEC block using the FEC encoding unit 222.

[Configuration Example of Redundant Decoding Unit]

Figure 17:
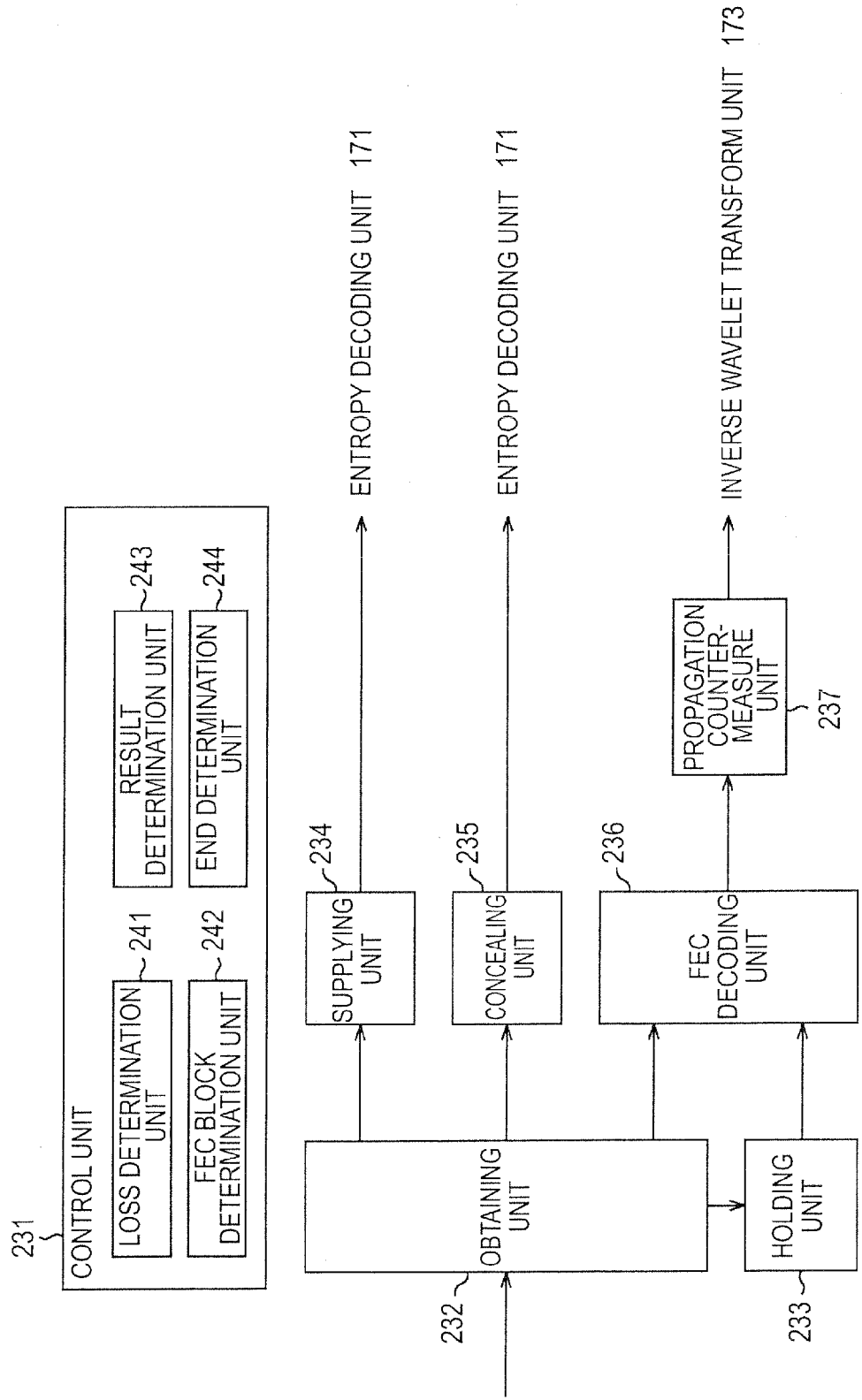
FIG. 17 is a block diagram illustrating a main configuration example of a redundant decoding unit.

FIG. 17 is a block diagram illustrating a main configuration example of the redundant decoding unit 132 of the reception device 102.

As shown in FIG. 17, the redundant decoding unit 132 includes a control unit 231, an obtaining unit 232, a holding unit 233, a supplying unit 234, a concealing unit 235, an FEC decoding unit 236, and a propagation counter-measure unit 237.

The control unit 231 controls the obtaining unit 232 to the propagation counter-measure unit 237. In FIG. 17, although arrows regarding the control unit 231 are not shown, actually, the control unit 231 supplies control commands or data to the respective sections and appropriately collects information from the respective sections.

The obtaining unit 232 obtains data which is received by the RTP reception unit 131. The holding unit 233 includes a storage medium such as, for example, a semiconductor memory, and holds data supplied from the obtaining unit 232. The supplying unit 234 supplies the data received by the obtaining unit 232 to the entropy decoding unit 171 of the moving image decompression decoding unit 133 as reception data. The concealing unit 235 supplies predetermined for concealment to the entropy decoding unit 171 of the moving image decompression decoding unit 133 instead of lost data.

The FEC decoding unit 236 performs FEC decoding for data supplied from the obtaining unit 232 or data read by the holding unit 233 and recovers lost data. The propagation counter-measure unit 237 supplies the data recovered by the FEC decoding unit 236 to the inverse wavelet transform unit 173 as data for error propagation counter-measure.

In addition, the control unit 231 performs various kinds of control processes. The control unit 231 includes, for example, a loss determination unit 241, an FEC block determination unit 242, a result determination unit 243, and an end determination unit 244, as functional blocks. These functional blocks indicate functions realized by the control unit 231 executing programs or processing data. Details of each process will be described later.

[Configuration Example of Propagation Counter-Measure Unit]

Figure 18:
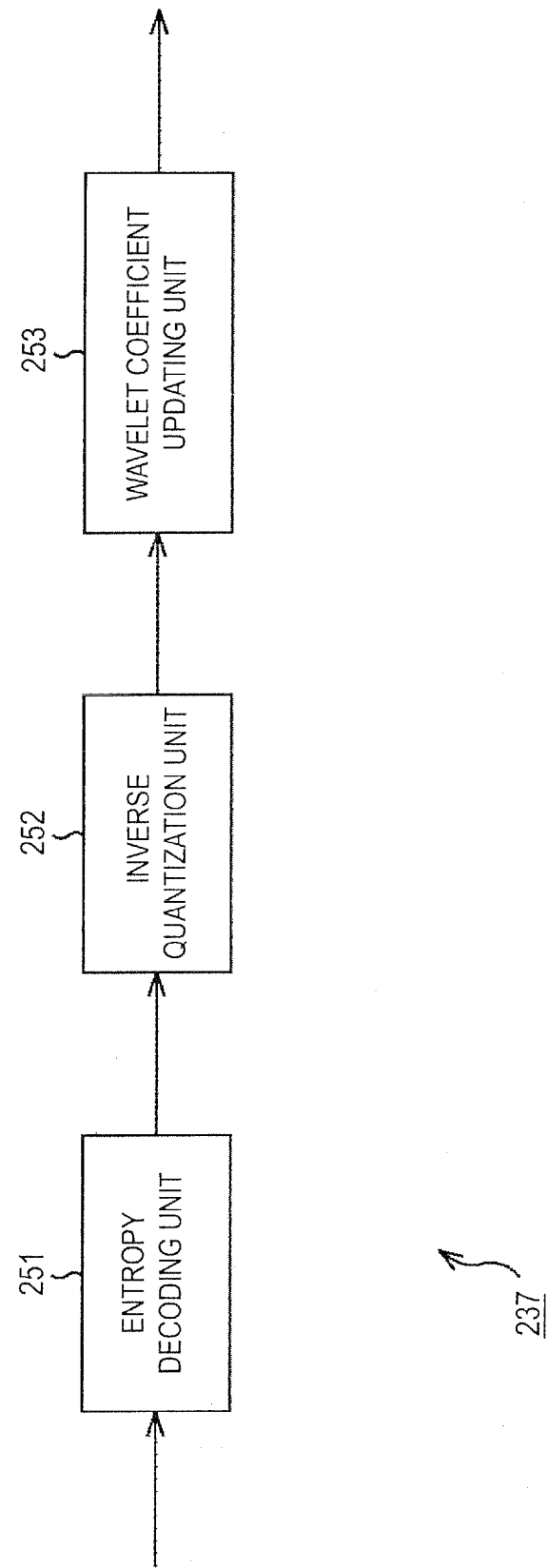
FIG. 18 is a block diagram illustrating a main configuration example of a propagation counter-measure unit.

FIG. 18 is a block diagram illustrating a main configuration example of the propagation counter-measure unit 237.

As shown in FIG. 18, the propagation counter-measure unit 237 includes an entropy decoding unit 251, an inverse quantization unit 252, and the wavelet coefficient updating unit 253. The entropy decoding unit 251 and the inverse quantization unit 252 are the same as the entropy decoding unit 171 and the inverse quantization unit 172 in FIG. 10. In other words, the propagation counter-measure unit 237 generates wavelet coefficients from the encoded data obtained through the FEC decoding in the same manner as the moving image decompression decoding unit 133.

The wavelet coefficient updating unit 253 supplies the wavelet coefficient supplied from the inverse quantization unit 252 to the inverse wavelet transform unit 173 (FIG. 10) of the moving image decompression decoding unit 133, and replaces (updates) wavelet coefficients of a corresponding block which are held by the inverse wavelet transform unit 173 for the lifting operation for a subsequent block with the supplied wavelet coefficients.

[Flow in Redundant Encoding Process]

Figure 19:
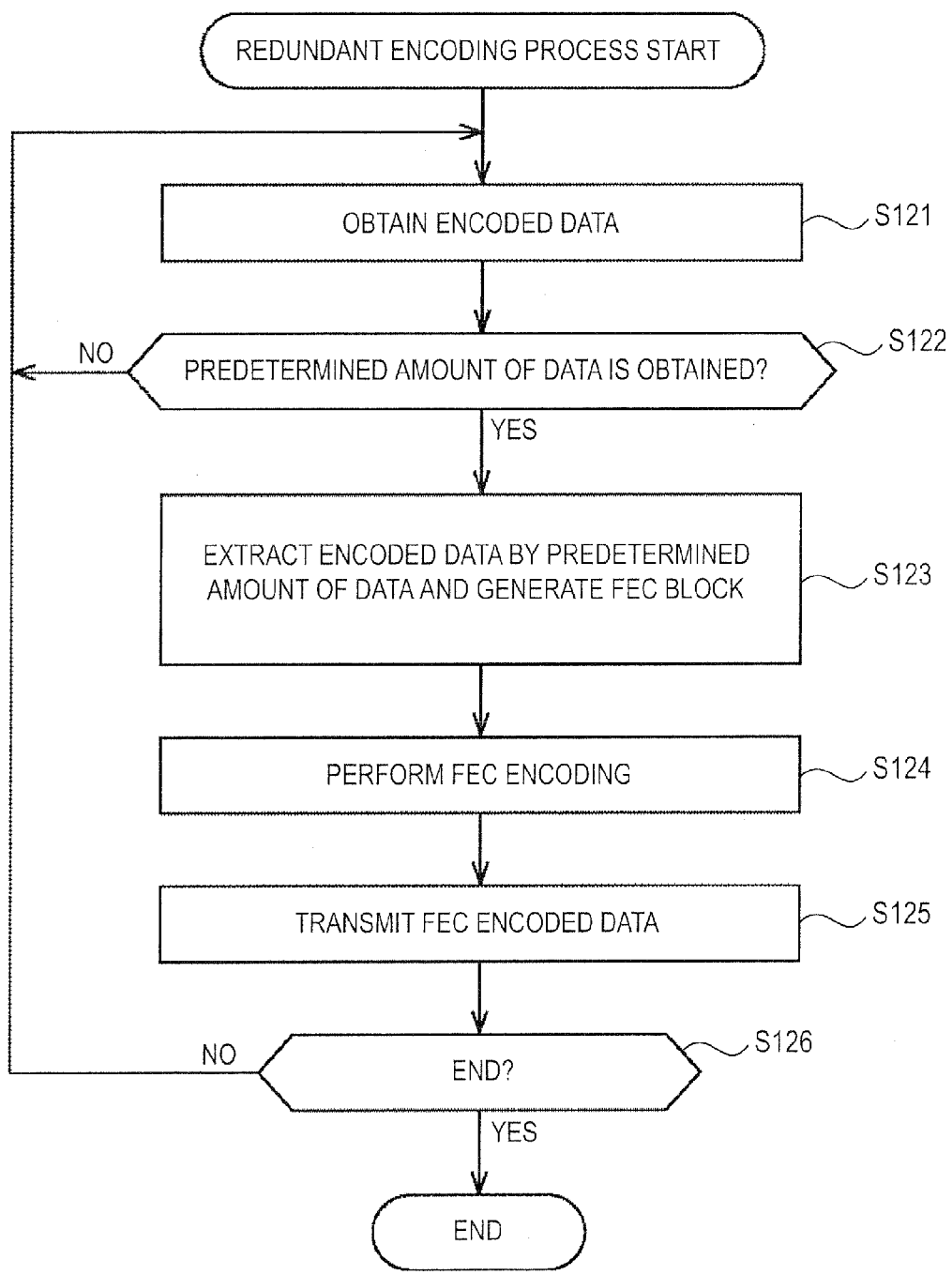
FIG. 19 is a flowchart illustrating an example of a flow in the redundant encoding process.

Next, an example of a flow in processes performed the above-described processing units will be described. First, referring to the flowchart in FIG. 19, an example of a redundant encoding process performed by the redundant encoding unit 122 of the transmission device 101 will be described.

If the redundant encoding process starts, the FEC block generation unit 221 of the redundant encoding unit 122 obtains encoded data supplied from the moving image compression encoding unit 121 in step S121.

In step S122, the redundant encoding unit 122 determines whether or not to obtain the encoded data corresponding to a predetermined amount of data which is data unit with which the FEC block generation unit 221 performs FEC. If it is determined not to be obtained, the redundant encoding unit 122 returns to the process in step S121. In other words, the FEC block generation unit 221 repeatedly performs the process until the encoded data corresponding to a predetermined amount of data is obtained.

If the encoded data corresponding to a predetermined amount of data is obtained through the process, the flow goes to step S123 where the redundant encoding unit 122 perform a process. The FEC block generation unit 221, in step S123, extracts the encoded data in a predetermined amount of data from the obtained encoded data, generates FEC blocks, and supplied the generated blocks to the FEC encoding unit 222.

The FEC encoding unit 222, in step S124, performs the FEC encoding for each FEC block, and, in step S215, transmits the generated FEC encoded data to the RTP transmission unit 123.

In step S216, the redundant encoding unit 122 determines whether or not to finish the redundant encoding process, and, if it is determined not to finish the redundant encoding process, the flow returns to step S121, and the processes therefrom are repeated.

In addition, in step S126, if it is determined to finish the redundant encoding process, the redundant encoding unit 122 finishes the redundant encoding process.

As described above, the encoded data is generated as the FEC blocks with predetermined data amount units, and the redundant data is generated by performing the FEC encoding for each FEC block. The redundant data and the original encoded data are collectively referred to as FEC encoded data. The redundant encoding unit 122 supplies the FEC encoded data (redundant data and original encoded data) to the RTP transmission unit 123. In other words, the transmission device 101 transmits the FEC encoded data to the reception device 102.

[Flow in Redundant Decoding Process]

Figure 20:
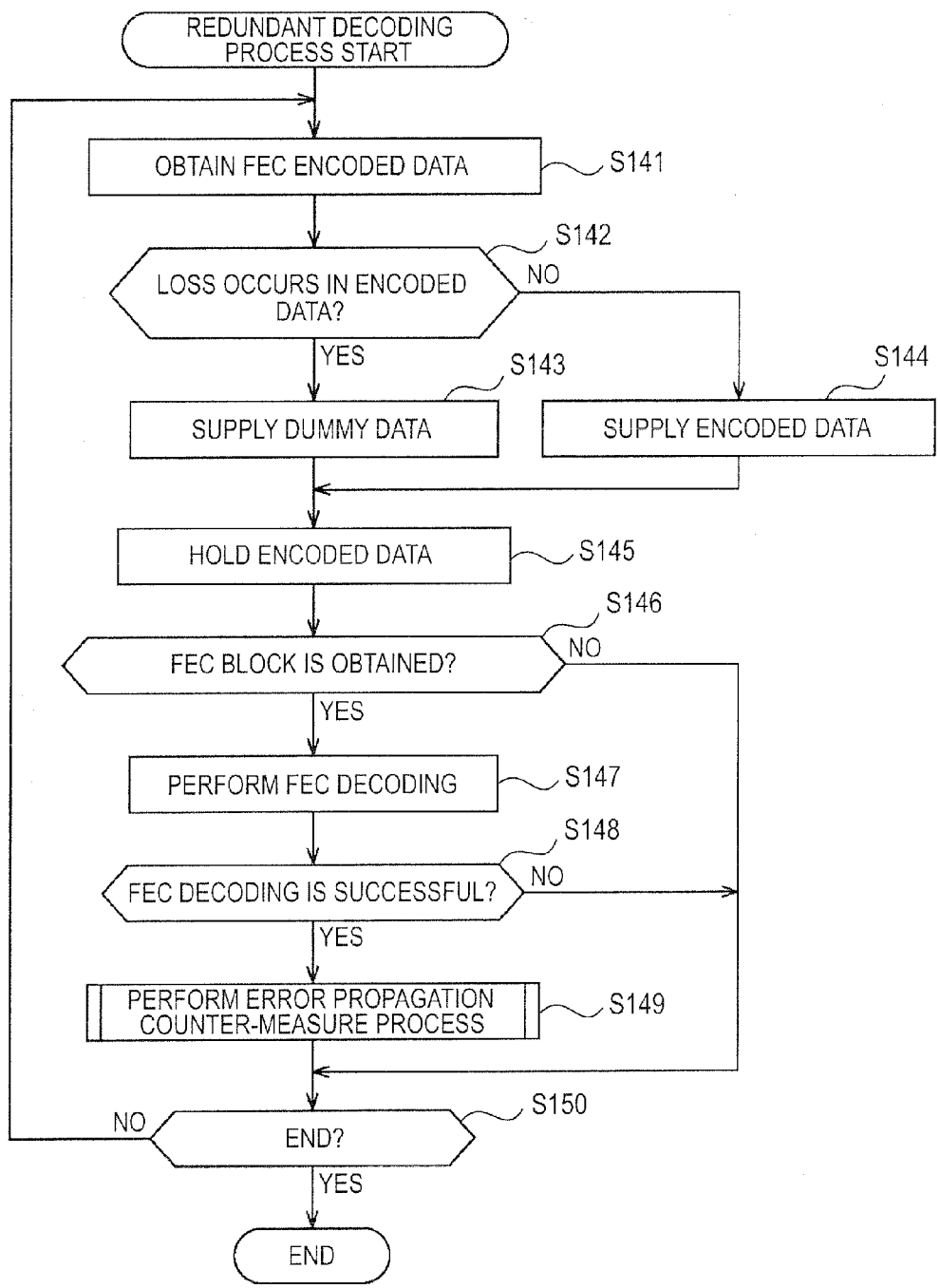
FIG. 20 is a flowchart illustrating an example of a flow in the redundant decoding process.

Next, an example of a flow in the redundant decoding process performed by the redundant decoding unit 132 of the reception device 102 will be described with reference to the flowchart in FIG. 20.

If the redundant decoding process starts, the obtaining unit 232 of the redundant decoding unit 132, in step S141, obtains the FEC encoded data transmitted from the transmission device 101 via the RTP reception unit 131, and extracts the encoded data.

In step S142, the loss determination unit 241 inspects packets included in the obtained FEC encoded data and determines whether or not losses occur in the encoded data. If it is determined that losses occur, the loss determination unit 241 makes the flow go to step S143.

In step S143, the obtaining unit 232 supplies the encoded data to the concealing unit 235. The concealing unit 235 performs a so-called error concealment process. In other words, the concealing unit 235 supplies predetermined dummy data to the entropy decoding unit 171 of the moving image decompression decoding unit 133, for example, instead of lost encoded data. A data unit for replacing lost data with the dummy data is arbitrary, and, for example, may be FEC block unit. That is to say, the concealing unit 235 may supply dummy data instead of an FEC block including lost encoded data, or may replace only a lost part of encoded data with dummy data so as to be supplied. If the process in step S143 is finished, the concealing unit 235 makes the flow go to step S145.

In addition, in step S142, if it is determined that losses do not occur in the encoded data included in the obtained FEC encoded data, the loss determination unit 241 makes the flow go to step S144.

In step S144, the obtaining unit 232 supplies the encoded data to the supplying unit 234. The supplying unit 234 supplies the encoded data to the entropy decoding unit 171 of the moving image decompression decoding unit 133. If the process in step S144 is finished, supplying unit 234 makes the flow go to step S145.

In step S145, the obtaining unit 232 supplies the encoded data to the holding unit 233. The holding unit 233 holds the supplied encoded data.

In step S146, the FEC block determination unit 242 of the control unit 231 determines whether or not the obtaining unit 232 obtains an FEC block. If it is determined that data in an amount of the FEC block is obtained, the FEC block determination unit 242 makes the flow goes to step S147.

In step S147, the obtaining unit 232 supplies the FEC encoded data corresponding to an amount of the obtained FEC block to the FEC decoding unit 236. The FEC decoding unit 236 performs the FEC decoding for the supplied FEC block.

In step S148, the result determination unit 243 of the control unit 231 determines whether or not the FEC decoding is performed successfully. If it is determined that the FEC decoding is performed successfully, the result determination unit 243 makes the flow go to step S149. In addition, the FEC decoding unit 236 (encoded data) supplies the FEC decoding result to the propagation counter-measure unit 237.

In addition, actually, if there are no losses in the encoded data, it is not necessary to perform the FEC decoding. In this case, the FEC decoding unit 236 outputs the supplied encoded data as an FEC decoding result.

In step S149, the propagation counter-measure unit 237 supplies the encoded data to the inverse wavelet transform unit 173 of the moving image decompression decoding unit 133, and performs an error propagation counter-measure process so as not to propagate an influence of the losses to other blocks. Details of the error propagation counter-measure process will be described later.

If the error propagation counter-measure process is finished, the propagation counter-measure unit 237 makes the flow go to step S150. In addition, in step S146, if it is determined that an FEC block is not obtained, the FEC block determination unit 242 makes the flow go to step S150. In addition, in step S148, if it is determined that the FEC decoding is not performed successfully, the result determination unit 243 makes the flow go to step S150.

Further, if there are no losses in the encoded data, errors do not occur in the block and thus it is not necessary to suppress the error propagation. Therefore, in this case, the propagation counter-measure unit 237 may perform the error propagation counter-measure process or may omit the process.

In step S150, the end determination unit 244 of the control unit 231 determines whether or not the redundant decoding process ends, and if it is determined that the redundant decoding process does not end, the flow returns to step S141, and the processes therefrom are repeated. In addition, in step S150, if it is determined that the redundant decoding process ends, the end determination unit 244 finishes the redundant decoding process.

[Flow in Error Propagation Counter-Measure Process]

Figure 21:
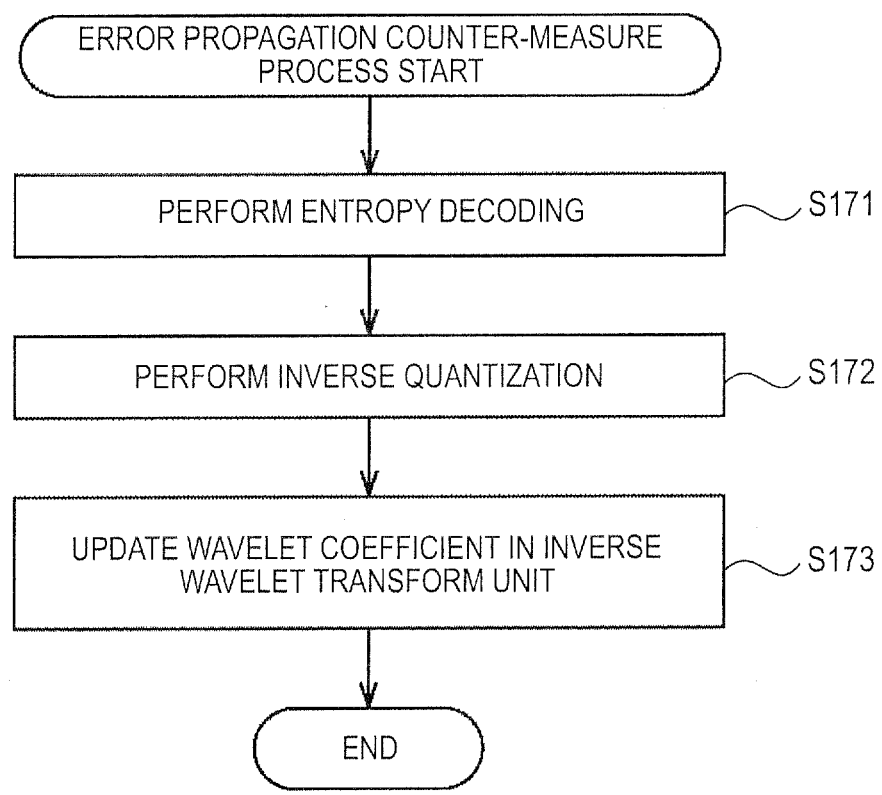
FIG. 21 is a flowchart illustrating an example of a flow in an error propagation counter-measure process.

With reference to the flowchart in FIG. 21, an example of a flow in the error propagation counter-measure process performed in step 3149 in FIG. 20 will be described.

If the error propagation counter-measure process starts, the propagation counter-measure unit 237, in step S171, performs the entropy decoding for the encoded data in the same manner as the entropy decoding unit 171, and, in step S172, performs the inverse quantization for the decoded result in the same manner as the inverse quantization unit 172.

In step S173, the propagation counter-measure unit 237 supplies the inversely quantized wavelet coefficient to the inverse wavelet transform unit 173 and updates a wavelet coefficient which is held for the inverse wavelet transform for a next block by the inverse wavelet transform unit 173.

There are no losses in the encoded data supplied to the propagation counter-measure unit 237. Therefore, the wavelet coefficient which is supplied from the propagation counter-measure unit 237 to the inverse wavelet transform unit 173 is not influenced by the losses.

The inverse wavelet transform unit 173 performs the inverse wavelet transform for the next block using the wavelet coefficient and thus it is possible to suppress errors from being propagated to subsequent blocks. Therefore, the moving image decompression decoding unit 133 can suppress expansion in a range on which data losses have an influence in decoded image.

As described above, the redundant decoding unit 132 can suppress visual image quality deterioration in the decoded image due to the data losses. Particularly, in the case of the system which transmits images with a short delay as described above, since the encoding units are small, even if the recovery in a place where losses occur is not performed, a visual influence which the data losses have on the decoded image is very small.

In contrast, if shorter delay data transmission is to be realized, dependency degree on other blocks is heightened, and thus the suppression of the error propagation as described above is more important in order to reduce a visual influence which data losses have on the decoded image.

Therefore, in the system which transmits image data with a shorter delay, a reduction effect in a visual influence due to the suppression of the error propagation as described above is increased.

In addition, as described above, by using the FEC decoding result in the suppression of the error propagation, a timing of using the FEC decoding result is delayed up to a process timing for the next block. In other words, allowable time for the FEC process is lengthened, and thus the FEC block can be made large accordingly. Therefore, the recovery performance in the FEC process is improved, and thereby the redundant decoding unit 132 can further reliably reduce a visual influence which the data losses have on the decoded image.

2. Second Embodiment

[Configuration of Redundant Decoding Unit]

In addition, the method for recovering lost data in the same manner as the related art and the method for suppressing the error propagation described in the first embodiment may be used together. For example, the reception device 102 performs synchronous reproduction. If an FEC decoding process is performed in line with decoding starting time in a synchronization signal, the FEC decoding process may be performed as a process for data recovery, and the recovered encoded data may be used in a decoding process for the block. If an FEC decoding process is not performed at the decoding starting time in the synchronization signal, the FEC decoding process may be performed as the error propagation counter-measure as described above, and the recovered encoded data may be used in a decoding process for a next block.

Figure 22:
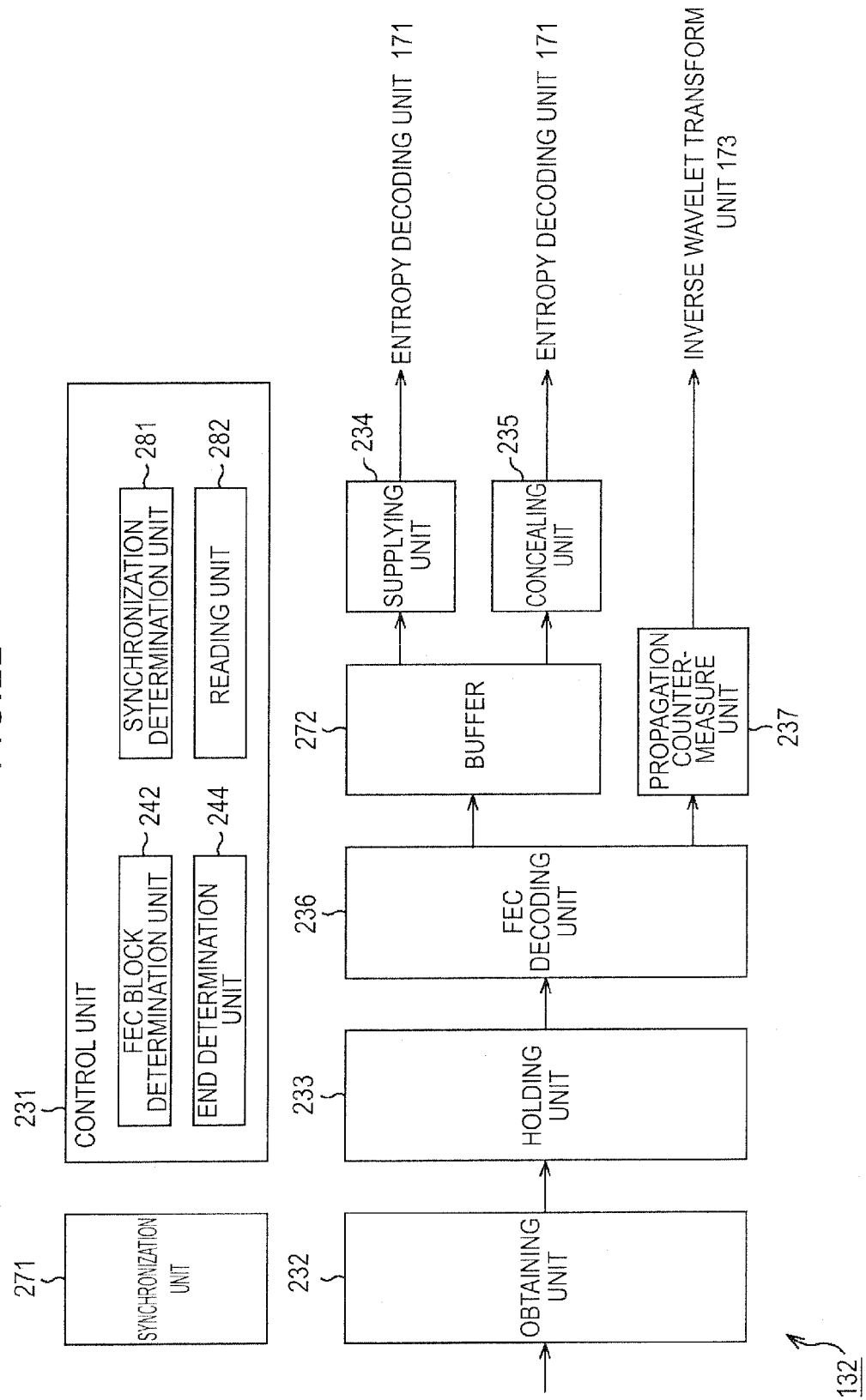
FIG. 22 is a block diagram illustrating another configuration example of the redundant decoding unit.

FIG. 22 is a block diagram illustrating a main configuration example of the redundant decoding unit 132 in that case.

In this case as well, the redundant decoding unit 132 fundamentally has the same configuration as the case in FIG. 17, but further includes a synchronization unit 271 which provides a synchronization signal to the respective units and a buffer 272 which arranges output timings of data, in order to perform synchronous reproduction.

Although arrows are not shown, the synchronization unit 271 provides a synchronization signal to the respective units. The respective units adjust operation timings using the synchronization signal.

Further, in this case, the FEC encoded data obtained by the obtaining unit is held by the holding unit 233 and then is supplied to the FEC decoding unit 236. The FEC decoding unit 236 optionally performs the FEC decoding for the FEC encoded data, and supplies the obtained encoded data to the buffer 272 to be held.

The supplying unit 234 and the concealing unit 235 read the encoded data accumulated in the buffer 272 at a predetermined synchronization time and supply the read encoded data to the entropy decoding unit 171. In this way, the output timings of the encoded data are adjusted using the buffer 272 (output timings are synchronized with each other).

If the recovery in the encoded data is performed in line with the output timing, the FEC decoding unit 236 decodes the recovered encoded data in the same manner as normal data.

In addition, an FEC decoding result which is performed out of line with the output timing is supplied to the inverse wavelet transform unit 173 by the propagation counter-measure unit 237 and is used for the error propagation counter-measure in the same manner as the first embodiment.

The control unit 231 includes a synchronization determination unit 281 and a reading unit 282 instead of the loss determination unit 241 and the result determination unit 243. The synchronization determination unit 281 determines whether or not the obtainment of the FEC decoding result is performed in line with a timing (predetermined synchronization time) for the encoded data output from the buffer 272.

The reading unit 282 reads the encoded data accumulated in the buffer 272 at a predetermined timing according to the synchronization signal and supplies the read encoded data to the entropy decoding unit 171 (synchronous reproduction).

As a time stamp value of RTP packets, for example, a value which reflects an input time of the uncompressed data block referenced by each compressed encoded data block in the transmission device 101 is set. The reading unit 282 sets, for example, a first packet in a stream as a timing defining packet, designates a time delayed by an "initial buffer delay time" from the arrival time thereof as a decoding reproduction scheduled time for the time stamp value added to the first packet, and reads subsequent packets using a time synchronized with the added time stamp as the decoding reproduction scheduled time.

The "initial buffer delay time" is obtained by, for example, the following equation (9) using process delay after reception until a decoding process is performed, a maximal process delay jitter value, and a maximal network jitter value, and the like.

$$\text{Initial buffer delay time} = \text{uncompressed data block input interval} \times \text{buf\_param} + \text{FEC decoding process time} + \text{jitter allowable time} \quad (9).$$

In the equation (9), the "uncompressed data block input interval" is an interval in which uncompressed data blocks are input from video data (video IN) in the transmission device 101. In addition, "buf_param" is an expected number of the uncompressed data blocks which are buffered in the reception device 102. The "FEC decoding process time" indicates a time for the FEC decoding process. The "jitter allowable time" indicates a variation width in an allowable delay time.

In addition, the FEC decoding unit 236 performs the FEC decoding only in the case where there are losses, and recovers lost data. Further, if there is a failure in the FEC decoding, the propagation counter-measure unit 237 may not suppress the error propagation even if the wavelet coefficient in the inverse wavelet transform unit 173 is updated, and thus the error propagation counter-measure process may be omitted.

[Flow in Redundant Decoding Process]

An example of a flow in the redundant decoding process in this case will be described with reference to the flowchart in FIG. 23.

Figure 23:
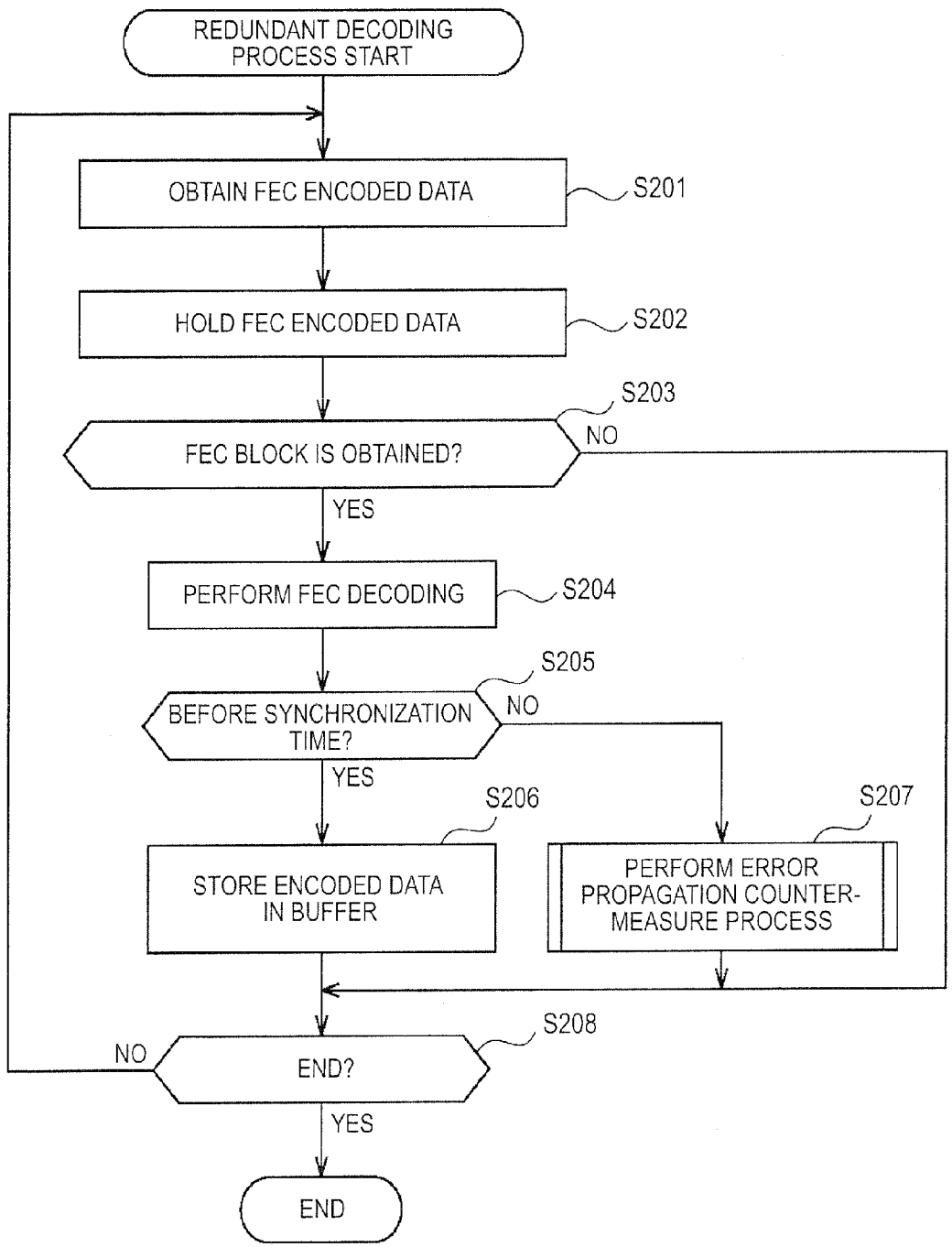
FIG. 23 is a flowchart illustrating another example of a flow in the redundant decoding process.

As shown in FIG. 23, in step S201, if the obtaining unit 232 obtains FEC encoded data from the RTP reception unit 131, the holding unit 233 holds the FEC encoded data in step S202.

In step S203, the FEC block determination unit 242 determines whether or not the FEC encoded data of one or more FEC block is held in the holding unit 233, and if it is determined that the data is held, makes the flow go to step S204.

If the FEC encoded data is accumulated in an amount of an FEC block, the FEC decoding unit 236, in step S204, reads the FEC encoded data, and if losses are in the encoded data, performs the FEC decoding.

In step S205, the synchronization determination unit 281 determines whether or not the FEC decoding process is performed earlier than the synchronization time (the encoded data output timing from the buffer 272). The synchronization determination unit 281 determines whether or not the FEC decoding process is performed in line with the output timing from the buffer 272. If it is determined that the FEC decoding process is performed earlier than the synchronization time, the synchronization determination unit 281 makes the flow go to step S206.

If an FEC decoding result is obtained before the synchronization time, the encoded data is used in the decoding process for the block. In other words, the encoded data recovered through the FEC decoding also undergoes the decompression decoding in the same manner as data in which losses do not occur. In step S206, the FEC decoding unit 236 stores the encoded data obtained as a result of the FEC decoding in the buffer 272. If the process in step S206 is finished, the FEC decoding unit 236 makes the flow go to step S208.

In addition, in step S205, if it is determined that the FEC decoding process is later than the synchronization time (out of line therewith), the synchronization determination unit 281 makes the flow go to step S207. The FEC decoding unit 236 supplies the encoded data obtained as a result of the FEC decoding to the propagation counter-measure unit 237. In step S207, the propagation counter-measure unit 237 performs the error propagation counter-measure process as described with reference to the flowchart in FIG. 21. If the error propagation counter-measure process is finished, the propagation counter-measure unit 237 makes the flow go to step S208.

In addition, in step S203, if it is determined that the FEC encoded data of one FEC block is not accumulated in the holding unit 233, the FEC block determination unit 242 makes the flow go to step S208.

In step S208, the end determination unit 244 of the control unit 231 determines whether or not the redundant decoding process ends, and if it is determined the redundant decoding process does not end, makes the flow return to step S201, and the processes therefrom are repeated. In addition, in step S208, if it is determined that the redundant decoding process ends, the end determination unit 244 finishes the redundant decoding process.

[Flow in Synchronous Reproduction Process]

Figure 24:
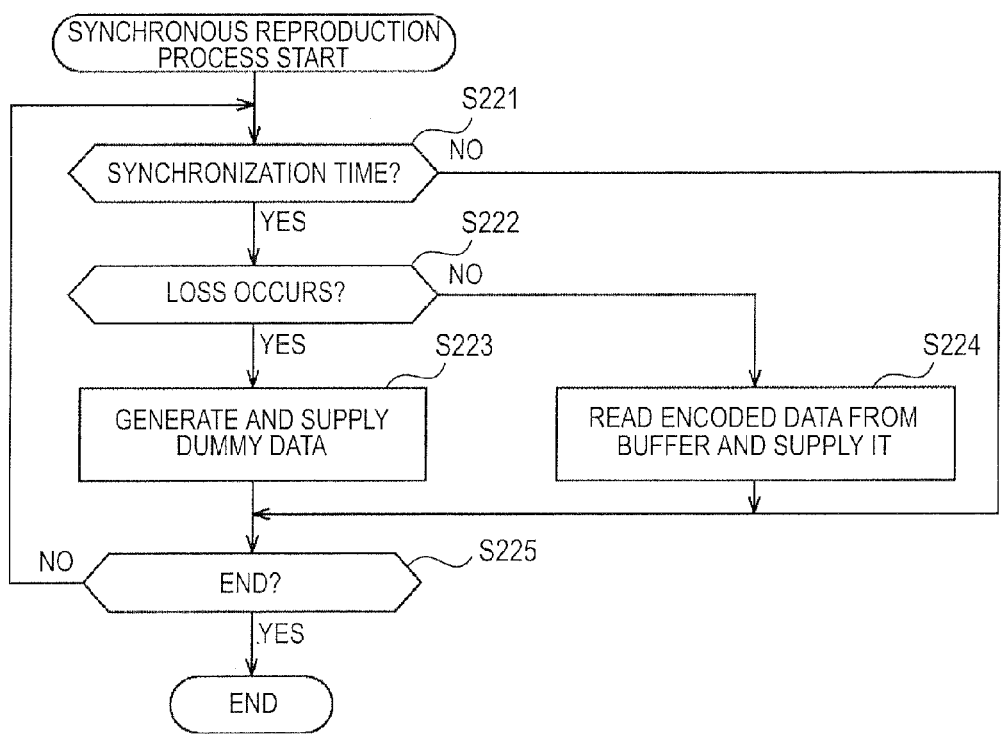
FIG. 24 is a flowchart illustrating an example of a flow in a synchronized reproduction process.

Next, an example of a flow in the synchronous reproduction process will be described with reference to the flowchart in FIG. 24. The reading unit 282 of the control unit 231 reads the encoded data accumulated in the buffer 272 at a predetermined timing using the synchronization signal managed by the synchronization unit 271 as a reference. By controlling the output timing in this way, the moving image decompression decoding unit 133 can perform the decompression decoding process at a predetermined interval and can output decoded images at a predetermined time interval. That is to say, it is possible to perform synchronous reproduction.

The reading unit 282, in step S221, determines whether or not a predetermined timing (synchronization time) according to the synchronization signal comes, and if it is determined that the synchronization time comes, makes the flow go to step S222.

In step S222, the reading unit 282 determines whether or not losses occur in the encoded data. If it is determined that losses (which are irrecoverable by the FEC decoding unit 236) occur in the encoded data accumulated in the buffer 272, the reading unit 282 makes the flow go to step S223.

In step S223, the concealing unit 235 discards the encoded data accumulated in the buffer 272, generates dummy data instead of the discarded encoded data, and supplies the dummy data to the entropy decoding unit 171. If the dummy data is supplied, the concealing unit 235 makes the flow go to the S225.

In addition, in step S222, if it is determined that losses do not occur in the encoded data, the reading unit 282 makes the flow go to step S224. In step S224, the supplying unit 234 reads the encoded data accumulated in the buffer 272 and supplies the read encoded data to the entropy decoding unit 171. If the encoded data is supplied, the supplying unit 234 makes the flow go to step S225.

In addition, in step S221, if it is determined that the synchronization time does not come, the reading unit 282 makes the flow go to step S225.

In step S225, the reading unit 282 determines whether or not to the synchronous reproduction process is finished, and if it is determined that the synchronous reproduction process is not finished, makes the flow return to step S221, and repeats the processes therefrom. In addition, in step S225, if it is determined that the synchronous reproduction process is finished, the reading unit 282 finishes the synchronous reproduction process.

As described above, by performing the redundant decoding process or the synchronous reproduction process, the redundant decoding unit 132, in the same manner as the first embodiment, can suppress the error propagation, and, if the FEC decoding process is performed in line with the synchronization time, can use the recovered encoded data in the decompression decoding process for the block, thereby recovering errors in the block.

3. Third Embodiment

[Description of Process in Entire System]

In addition, both of the FEC encoding for suppressing the error propagation as described in the first embodiment and the FEC encoding for recovery as described in the second embodiment may be performed for the encoded data.

Figure 25:
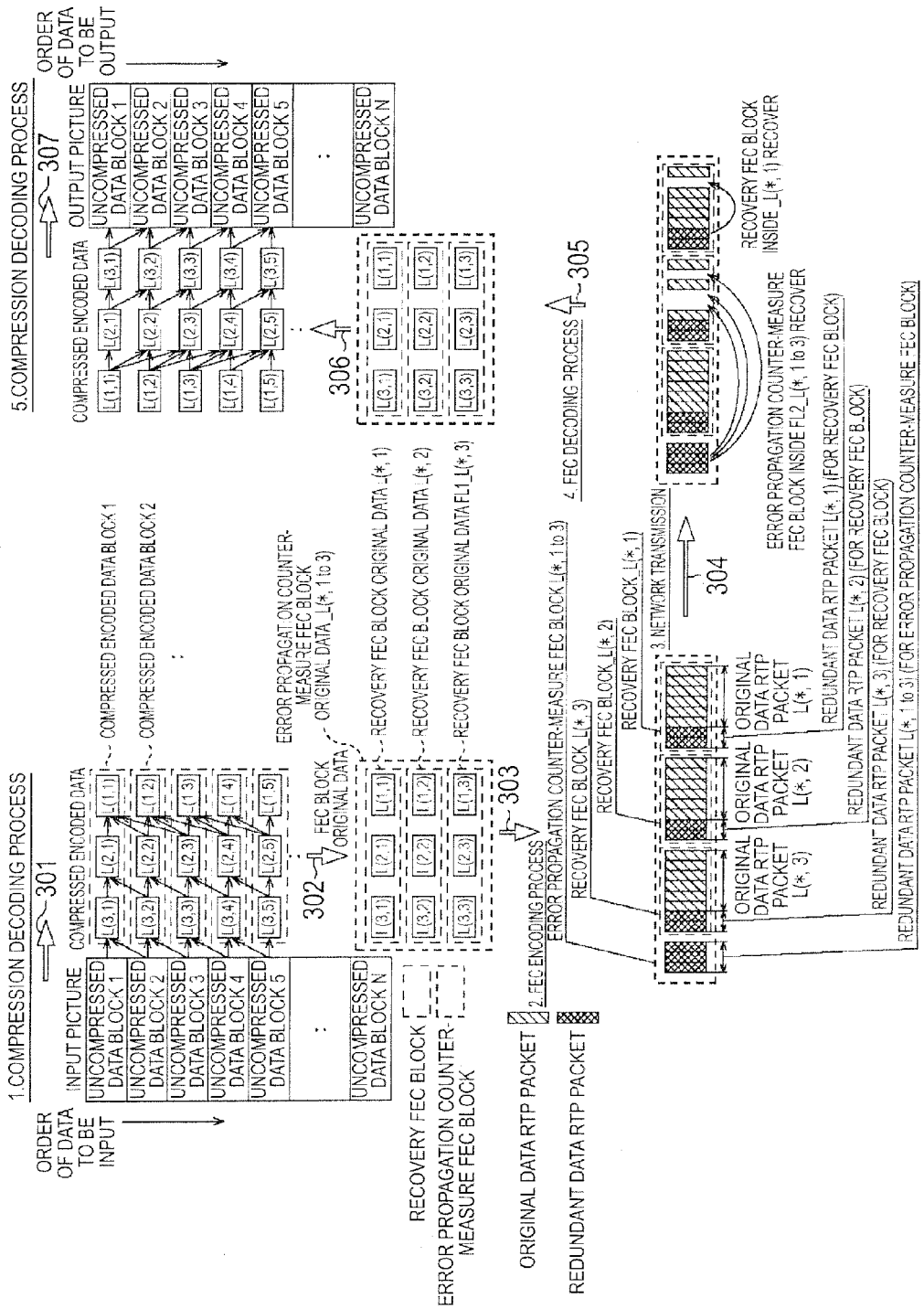
FIG. 25 is a diagram illustrating an outline of processes performed in the respective parts of the network system.

In this case, the network system 100 performs processes as shown in FIG. 25.

In other words, the moving image compression encoding unit 121 performs the compression encoding process (the arrow 301) and generates, for example, a compressed encoded data block corresponding to each "uncompressed data block". The redundant encoding unit 122 generates one compressed encoded data block as "FEC block original data for recovery" and generates a compressed encoded data block group corresponding to three "uncompressed data blocks" as "FEC block original data for an error propagation counter-measure" (the arrow 302).

The number of the redundant packets is arbitrary, and, for example, the number of the "recovery FEC blocks" is assumed as two and the number of the "error propagation counter-measure FEC blocks" is assumed as three. Hereinafter, an FEC block original data unit for recovery corresponding to a compressed encoded data block n is denoted by "recovery FEC block original data L(*, n)", and an FEC block original data unit for an error propagation counter-measure corresponding to compressed encoded data blocks n to n+2 is denoted by "error propagation counter-measure FEC block original data L(*, n to n+2)".

In addition, here, the "FEC block original data unit for recovery" corresponds to one "uncompressed data block" and the parameter buf_param for determining the "initial buffer delay time" is set to 1. Thereby, if the jitter or packet loss does not occur, the FEC decoding process can be performed until the synchronous decoding reproduction for packets in the "recovery FEC block" is performed.

The redundant encoding unit 122 performs the FEC encoding process for each of the recovery FEC block and the error propagation counter-measure FEC block and generates redundant data (the arrow 303). The generated FEC encoded data is transmitted to the reception device 102 via the network 110 (the arrow 304).

At this time, it is assumed that one packet loss occurs in the recovery FEC block L(*, 1) and three packet losses occur in the recovery FEC block L(*, 2).

In the redundant decoding unit 132, both of the FEC decoding process for recovery and the FEC decoding process for the error propagation counter-measure are performed (the arrow 305). In this case, before the synchronous decoding reproduction starts, the packet loss in the recovery FEC block L(*, 1) is recovered in the recovery FEC block L(*, 1). Therefore, the compressed encoded data is supplied to the moving image decompression decoding unit 133 as data for decoding (the arrow 306).

However, the number of the lost packets in the recovery FEC block L(*, 2) exceeds the number of the redundant packets in the recovery FEC block, and this is not recovered in the recovery FEC block and further is not recovered before the synchronous decoding reproduction starts. However, the lost packets are recovered by decoding the error propagation counter-measure FEC blocks L(*, 1 to 3). Therefore, the compressed encoded data L(1, n) is supplied to the moving image decompression decoding unit 133 as "data for the error propagation counter-measure" and is used for the error propagation counter-measure.

In addition, the number of lost packets in the error propagation counter-measure FEC blocks L(*, 1 to 3) is four and exceeds the number of the redundant packets in the error propagation counter-measure FEC blocks, but the one lost packet is recovered in the recovery FEC block L(*, 1), and thus can be recovered using three redundant packets.

The moving image decompression decoding unit 133 performs the decompression decoding for the compressed encoded data supplied in this way and generates output pictures (uncompressed data blocks) (the arrow 307).

[Configuration of Redundant Encoding Unit]

Figure 26:
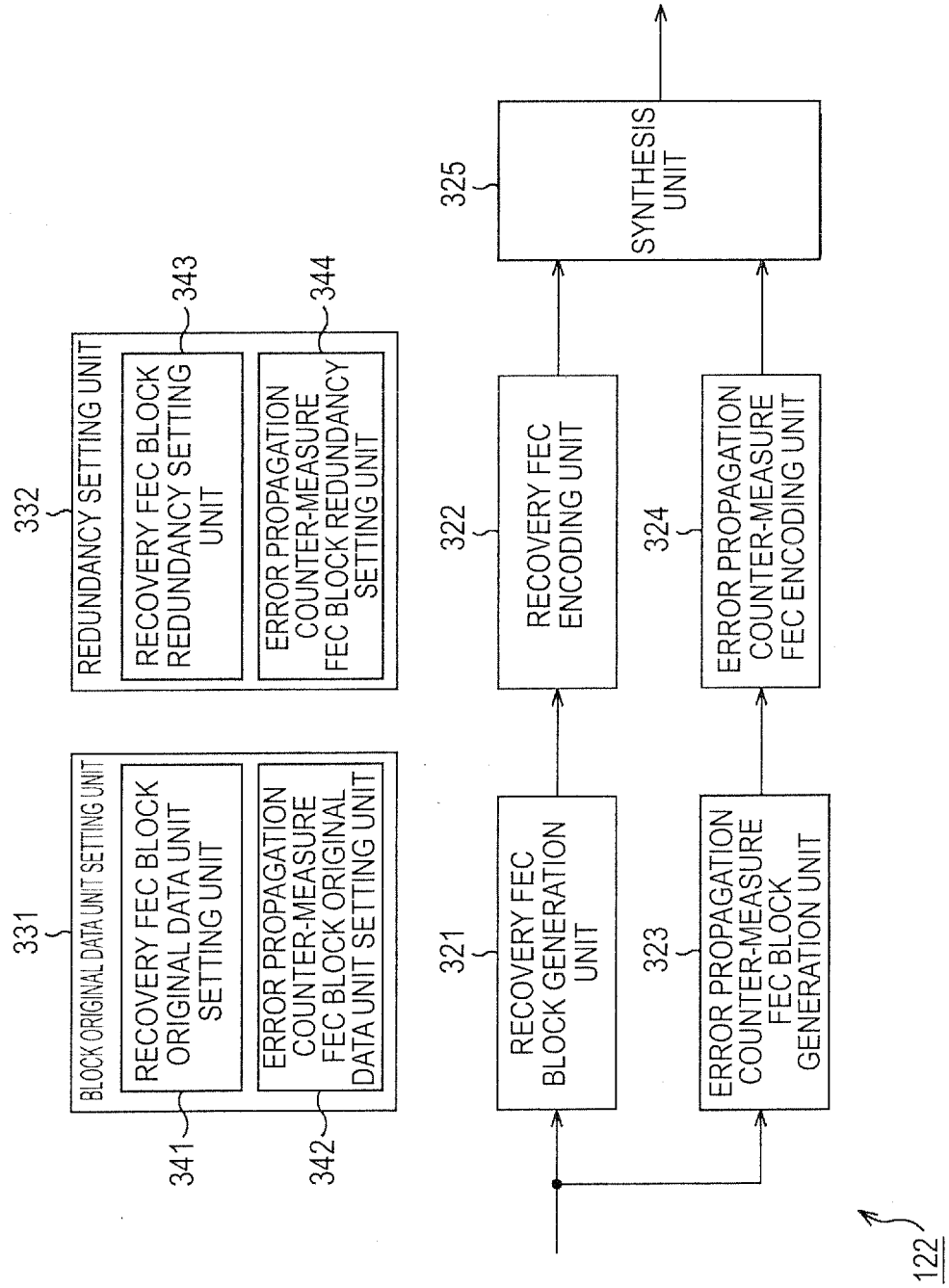
FIG. 26 is a block diagram illustrating another configuration example of the redundant encoding unit.

FIG. 26 is a block diagram illustrating a main configuration example of the redundant encoding unit 122. In this case as well, the redundant encoding unit 122 fundamentally has the same configuration as that shown in FIG. 16, but includes two configurations for recovery and the error propagation counter-measure. In other words, the redundant encoding unit 122 includes a recovery FEC block generation unit 321, a recovery FEC encoding unit 322, an error propagation counter-measure FEC block generation unit 323, and an error propagation counter-measure FEC encoding unit 324.

The recovery FEC block generation unit 321 and the error propagation counter-measure FEC block generation unit 323 fundamentally perform the same process as that in the FEC block generation unit 221 except for FEC blocks to be processed. The recovery FEC encoding unit 322 and the error propagation counter-measure FEC encoding unit 324 fundamentally perform the same process as that in the FEC encoding unit 222 except for FEC blocks to be processed.

In the "FEC process", for example, the compressed encoded data to be processed is divided into a plurality of RTP packets, and the FEC redundant encoding is performed for each RTP packet which has been packetized. The FEC redundant encoding may use loss error correction code such as, for example, the Reed-Solomon coding.

First, in regards to these processing sections, a set (the number of original data packets, the number of redundant packets) is determined regarding an FEC block which is a process unit of the FEC process. For example, if (the number of original data packets, the number of redundant packets)= (10, 5) is designated, five redundant packets are generated for every ten original data packets by the FEC process. In other words, the transmission device 101 transmits a total of fifteen packets regarding the FEC block. If receiving ten packets among the packets regarding the FEC block, the reception device 102 can recover original data through the FEC decoding process.

In addition, the data size of original data of recovery FEC block generated by the recovery FEC block generation unit 321 is smaller than the data size of original data of error propagation counter-measure FEC block generated by the error propagation counter-measure FEC block generation unit 323.

If the FEC block original data unit is set to be large, typically burst packet loss resistance is heightened, but when the FEC block original data unit is set such that packet reception time inside an FEC block is included in the "initial buffer delay time", the delay is greatly increased. For this reason, if neither jitter nor packet losses occur, the "initial buffer delay time" is set such that all packets inside the "recovery FEC block" are assured of reception and none of packets inside the "error propagation counter-measure FEC block" are assured of reception before the synchronous decoding reproduction starts.

The recovered encoded data can be used for the synchronous decoding reproduction if the recovery in the lost packets is performed before the synchronous decoding reproduction starts, and if the recovery in the lost packets is performed after the synchronous decoding reproduction starts, the recovered encoded data is used for the error propagation counter-measure for subsequent decoded data in compressed code decoding. Thereby, it is possible to suppress increase in delay due to the enlargement of the FEC block original data unit and to suppress error propagation when burst packet losses occur.

In addition, the redundant encoding unit 122 includes a block original data unit setting unit 331 which sets the data size of original data corresponding to one FEC block, and a redundancy setting unit 332 which sets redundancy (the number of redundant packets) for one FEC block.

The block original data unit determination unit 331 includes a recovery FEC block original data unit setting unit 341 and an error propagation counter-measure FEC block original data unit setting unit 342. In other words, the data size of original data is set for both of the recovery FEC block and the error propagation counter-measure FEC block. Details of the FEC block original data unit setting process will be described later.

In addition, the redundancy setting unit 332 includes a recovery FEC block redundancy setting unit 343 and an error propagation counter-measure FEC block redundancy setting unit 344. In other words, redundancy is set for both of the recovery FEC block and the error propagation counter-measure FEC block. Details of the redundancy setting process will be described later.

By the block original data unit setting unit 331 and the redundancy setting unit 332, the data size and the redundancy of original data of one FEC block are designated in a form of (the number of original data packets, the number of redundant packets).

The redundant encoding unit 122 also includes a synthesis unit 325. The synthesis unit 325 synthesizes recovery FEC encoded data generated by the recovery FEC encoding unit 322 with error propagation counter-measure FEC encoded data generated by the error propagation counter-measure FEC encoding unit 324, to be output. In addition, for example, if there is an overlapping part of the synthesized recovery FEC encoded data and error propagation counter-measure FEC encoded data, the synthesis unit 325 performs the synthesis through optimization such as omission of either set of overlapping data.

[Configuration of Redundant Decoding Unit]

Figure 27:
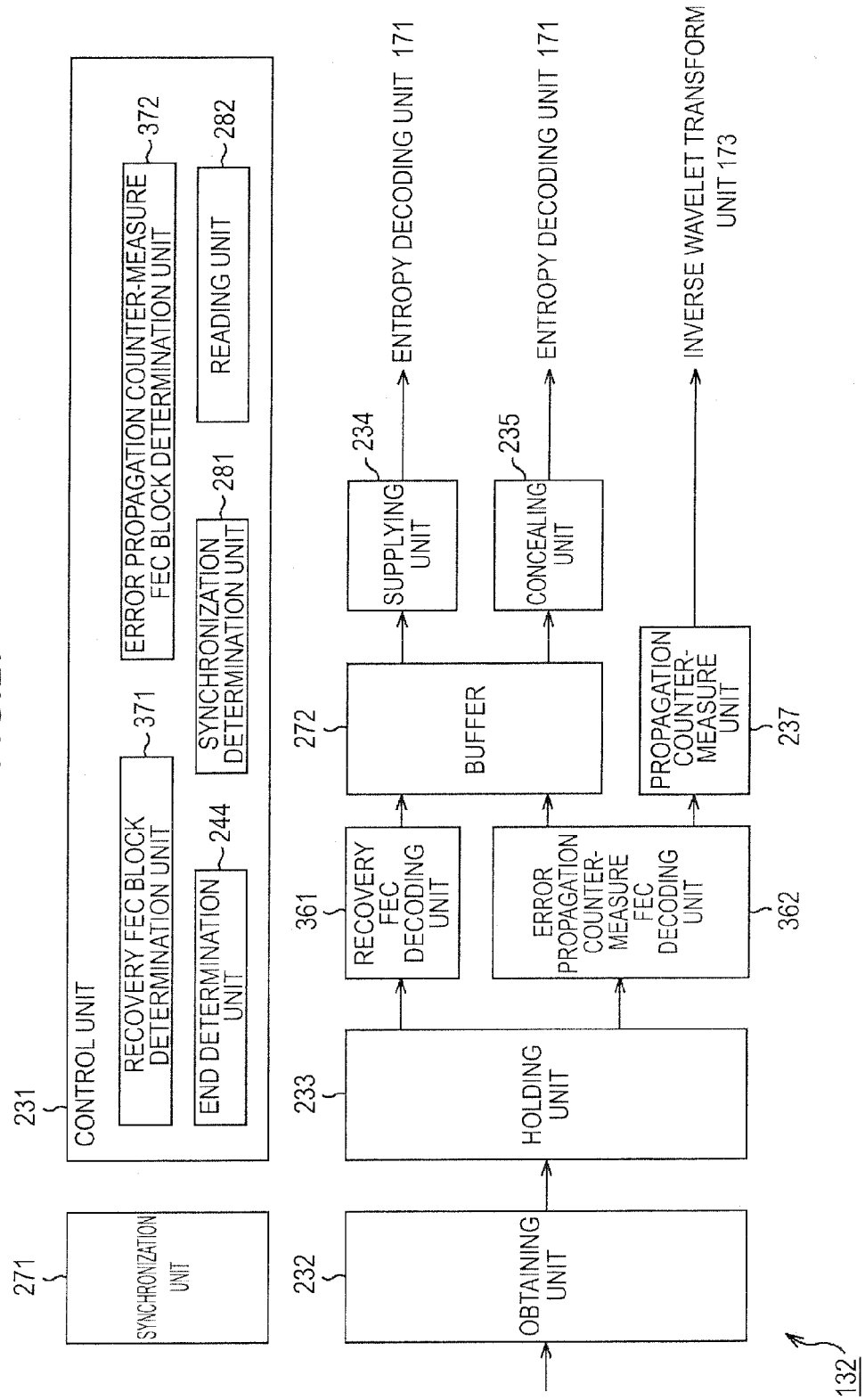
FIG. 27 is a block diagram illustrating still another configuration example of the redundant decoding unit.

FIG. 27 is a block diagram illustrating a configuration example of the redundant decoding unit 132 in this case. As shown in FIG. 27, the redundant decoding unit 132 in this case fundamentally has the same configuration as the case described with reference to FIG. 22, but includes a recovery FEC decoding unit 361 and an error propagation counter-measure FEC decoding unit 362 instead of the FEC decoding unit 236.

The recovery FEC decoding unit 361 performs the FEC decoding process for the recovery FEC block. The error propagation counter-measure FEC decoding unit 362 performs the FEC decoding process for the error propagation counter-measure FEC block. In other words, the recovery FEC decoding unit 361 and the error propagation counter-measure FEC decoding unit 362 performs the FEC decoding process fundamentally in the same manner as the FEC decoding unit 236 except for the FEC block to be processed.

In addition, the control unit 231 includes a recovery FEC block determination unit 371 and an error propagation counter-measure FEC block determination unit 372 instead of the FEC block determination unit 242. The recovery FEC block determination unit 371 determines whether or not the FEC encoded data of one recovery FEC block is accumulated in the holding unit 233. The error propagation counter-measure FEC block determination unit 372 determines whether or not the FEC encoded data of one error propagation counter-measure FEC block is accumulated in the holding unit 233.

[Flow in Redundant Encoding Process]

Figure 28:
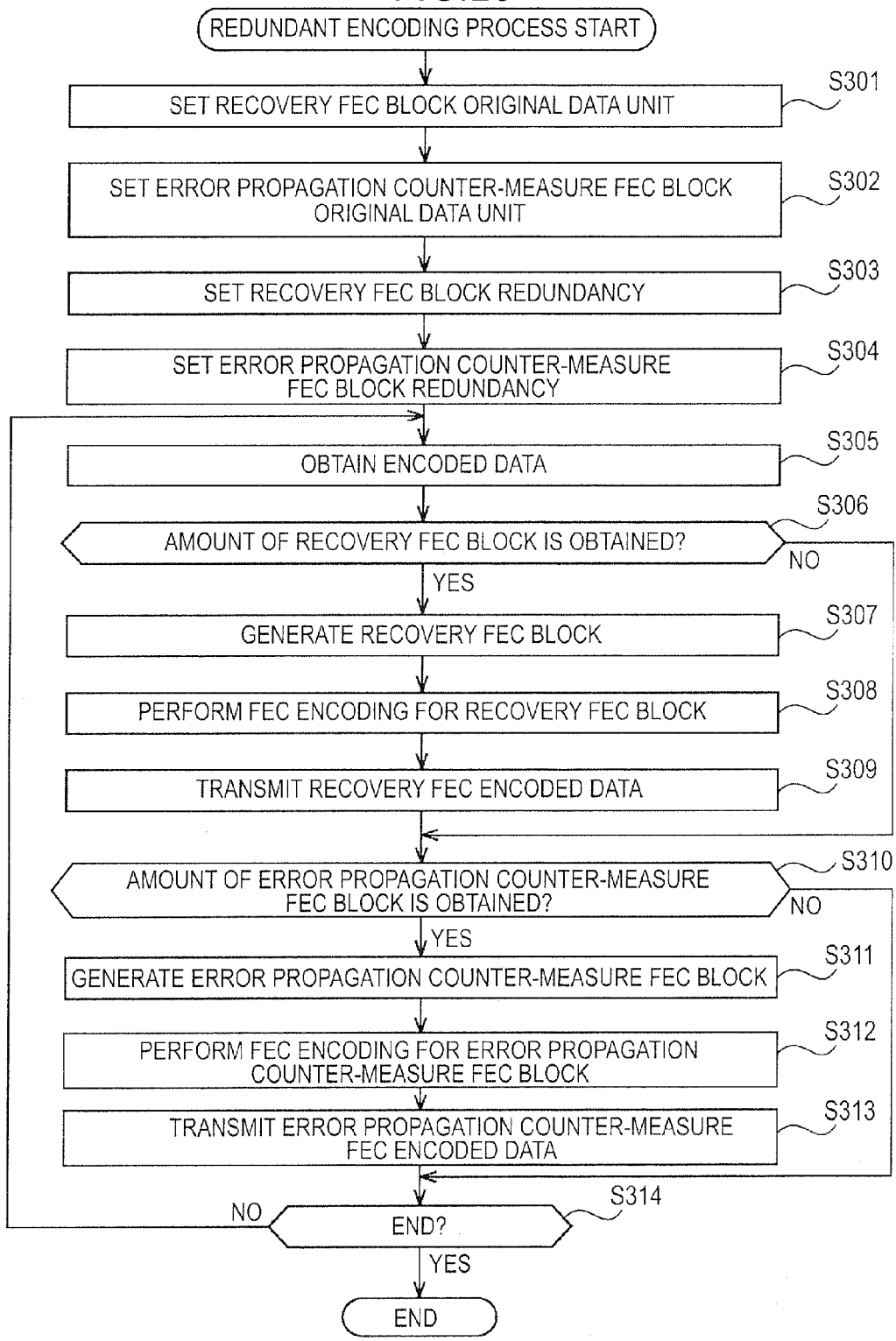
FIG. 28 is a flowchart illustrating another example of a flow in the redundant encoding process.

Next, an example of a flow in the redundant encoding process in this case will be described with reference to the flowchart in FIG. 28.

If the redundant encoding process starts, in step S301, the recovery FEC block original data unit setting unit 341 sets a recovery FEC block original data unit.

The recovery FEC block original data unit setting unit 341 sets the "initial buffer delay time" so as to satisfy the following equation (10), for example, using a target delay time (allowable delay time in a process in the entire network system 100) given by a user or the like.

Target delay time=transmission device delay time+
 expected transmission maximal delay time+initial buffer delay time+reproduction process delay time (10).

In the equation (10), the "transmission device delay time" indicates a delay time in each process executed by the transmission device 101. The "expected transmission maximal delay time" indicates an expected maximal value in a delay time due to packet transmission between the transmission device 101 and the reception device 102. The "initial buffer delay time" is given by the above-described equation (9). The "reproduction process delay time" indicates a delay time due to the reproduction process (including the decoding process and the like) performed in the reception device 102.

In addition, compressed encoded data blocks corresponding to uncompressed data blocks of the same number as "buf_param" at this time are set as the "recovery FEC block original data unit". In the case of the example in FIG. 25, the "recovery FEC block original data unit" is set for each compressed encoded data block.

In step S302, the error propagation counter-measure FEC block original data unit setting unit 342 sets an error propagation counter-measure FEC block original data unit.

The "error propagation counter-measure FEC block original data unit" is set in a range smaller than a range where, for example, compressed encoded data generated when uncompressed data blocks included in an influence range of compressed encoded data of the hierarchy 1 are input and larger than the "recovery FEC block original data unit".

In other words, the "error propagation counter-measure FEC block original data unit" may be set to be equal or smaller than blocks obtained by combining intermediate data generated during the decoding of a corresponding block with 0 or more subsequent blocks used in the decoding.

If the "error propagation counter-measure FEC block original data unit" is set to be larger than this, the decoding reproduction of uncompressed data blocks in an influence range of recovered packets is finished when recovery is performed by the FEC decoding process, and thus there is a possibility of a small effect. In the case of the example in FIG. 25, the "recovery FEC block original data unit" is set for each compressed encoded data block. In addition, the influence range of the compressed encoded data L(1, 1) has five uncompressed data blocks, and thus the "error propagation counter-measure FEC block original data unit" is set every three compressed encoded data blocks which are smaller than that.

In addition, the recovery FEC block original data unit and the error propagation counter-measure FEC block original data unit may be set independently from each other. Therefore, as described above, the error propagation counter-measure FEC block original data unit may or may not be an integral multiple of the error propagation counter-measure FEC block original data unit. For example, a piece of recovery FEC block original data may extend over plural pieces of error propagation counter-measure FEC block original data.

In addition, in the decoding process for the encoded data, when encoded data with a predetermined size or with a size corresponding to a predetermined reproduction time is decoded after being stored in a buffer, the size of the "recovery FEC block original data unit" may be set to be equal to or smaller than the buffer size and the size of the "error propagation counter-measure FEC block original data unit" may be set to be equal to or larger than the buffer size.

In step S303, the recovery FEC block redundancy setting unit 343 sets redundancy for the recovery FEC block. In step S304, the error propagation counter-measure FEC block redundancy setting unit 344 sets redundancy for the error propagation counter-measure FEC block.

The redundancy for the recovery FEC block and the error propagation counter-measure FEC block is set so as to satisfy, for example, a loss recovery performance index. For example, if an expected packet loss rate is p, the number of packets in an FEC block is n, and the number of original data packets is k, the number of redundant packets is n−k. In this case, if a target FEC block loss rate is Pt, the target FEC block loss rate Pt is calculated by the following equation (11).

$$P_t \geq 1 - \sum_{j=0}^{n-k} {}_nC_j p^j (1-p)^{n-j} \quad (n > k) \tag{11}$$

The number of original data packets k is set as described above in the FEC block original data unit setting process in step S301 or step S302. Therefore, the recovery FEC block redundancy setting unit 343 and the error propagation counter-measure FEC block redundancy setting unit 344 respectively set the number of redundant packets (redundancy) n−k for each FEC block by using the equation (11).

If the FEC block original data unit and the redundancy are set, the redundant encoding unit 122 obtains encoded data in step S305. In step S306, the recovery FEC block generation unit 321 determines whether or not the encoded data of one recovery FEC block is obtained. The recovery FEC block original data unit at this time follows the setting in step S301.

If it is determined that the encoded data of one recovery FEC block is obtained, the recovery FEC block generation unit 321 makes the flow go to step S307, and generates a recovery FEC block (original data) using the encoded data of one recovery FEC block.

In step S308, the recovery FEC encoding unit 322 performs the FEC encoding for the generated recovery FEC block, and generates redundant data. In other words, the recovery FEC encoding unit 322 generates recovery FEC encoded data which is FEC encoded data of the recovery FEC block. The redundancy at this time follows the settings in step S303.

In step S309, the synthesis unit 325 transmits the generated recovery FEC encoded data to the RTP transmission unit 123 which is made to transmit it. If the recovery FEC encoded data is transmitted, the synthesis unit 325 makes the flow go to step S310. In addition, in step S306, if it is determined that the encoded data of one recovery FEC block is not obtained, the recovery FEC block generation unit 321 makes the flow go to step S310.

In steps S310 to S313, the respective processing sections of the error propagation counter-measure FEC block generation unit 323, the error propagation counter-measure FEC encoding unit 324, and the synthesis unit 325 perform the same process as the process for the recovery FEC block in steps S306 to S309, for the error propagation counter-measure FEC block.

However, the synthesis unit 325 does not transmit a part where the error propagation counter-measure FEC encoded data overlaps with the recovery FEC encoded data, to the RTP transmission unit 123 in step S313. That is to say, the synthesis unit 325 transmits, for example, only the redundant data of the error propagation counter-measure FEC block to the RTP transmission unit 123.

In step S314, the redundant encoding unit 122 determines whether or not the redundant encoding process is finished, and if it is determined that the process is not finished, makes the flow return to step S305 and repeats the processes therefrom. In addition, in step S314, if it is determined that the redundant encoding process is finished, the redundant encoding unit 122 finishes the redundant encoding process.

In this way, the transmission device 101 can perform the FEC encoding for the FEC blocks for both the recovery and the error propagation counter-measure, and generate redundant data. Thereby, the reception device 102 can improve the recovery performance in the FEC process and suppress the error propagation.

[Flow in Redundant Decoding Process]

Figure 29:
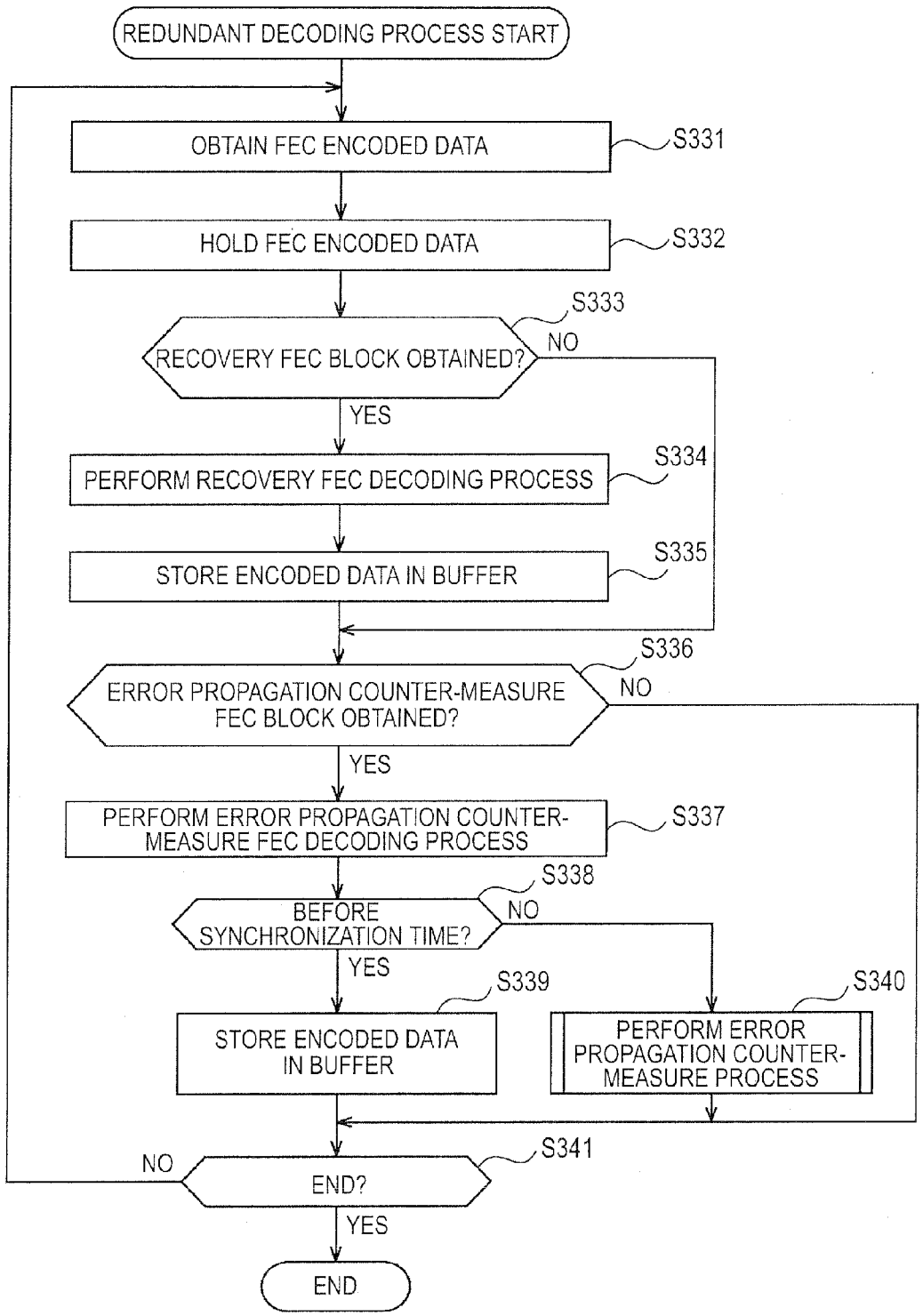
FIG. 29 is a flowchart illustrating still another example of a flow in the redundant decoding process.

Next, an example of a flow in the redundant decoding process performed by the redundant decoding unit 132 in this case will be described with reference to the flowchart in FIG. 29.

In this case as well, the flow in the redundant decoding process is fundamentally the same as the case descried with reference to the flowchart in FIG. 23, but is different in that the FEC decoding process is performed for each of the recovery FEC block and the error propagation counter-measure FEC block.

In step S331, the obtaining unit 232 obtains FEC encoded data from the RTP reception unit 131, and, in step S332, the holding unit 233 holds the FEC encoded data.

Steps S333 to S335 correspond to processes for the recovery FEC block. In step S333, the recovery FEC block determination unit 371 determines whether or not the FEC encoded data of one or more recovery FEC blocks is held by the holding unit 233, and if it is determined to be held, makes the flow go to step S334.

If the FEC encoded data of one recovery FEC block is accumulated, the recovery FEC decoding unit 361 reads the FEC encoded data in step S334, and performs the FEC decoding for the read data if losses occur in the encoded data. In step S335, the recovery FEC decoding unit 361 stores the encoded data obtained as a result of the FEC decoding in the buffer 272 and makes the flow go to step S336.

In addition, if it is determined that one recovery FEC block is not obtained in step S333, the recovery FEC block determination unit 371 makes the flow go to step S336.

Steps S336 to S340 correspond to processes for the error propagation counter-measure FEC block. The error propagation counter-measure FEC decoding unit 362, the propagation counter-measure unit 237, and the error propagation counter-measure FEC block determination unit 372 perform the processes in steps S336 to S340 for the error propagation counter-measure FEC block in the same manner as the processes in steps S203 to S207 in FIG. 23.

In other words, if the FEC decoding result is obtained before the synchronization time, the encoded data of the error propagation counter-measure FEC block is decoded, and is accumulated in the buffer 272, and if the FEC decoding result is obtained after the synchronization time, the encoded data of the error propagation counter-measure FEC block is supplied to the inverse wavelet transform unit 173 as data for reference in order to suppress errors from being propagated to subsequent blocks.

In step S341, the end determination unit 244 of the control unit 231 determines whether or not the redundant decoding process ends, and if it is determined that the redundant decoding process does not end, makes the flow go to step S331, and the processes therefrom are repeated. In addition, in step S341, if it is determined that the redundant decoding process ends, the end determination unit 244 finishes the redundant decoding process.

In this way, the reception device 102 can improve the recovery performance in the FEC process and suppress the error propagation.

[FEC Decoding Process Timing]

Figure 30:
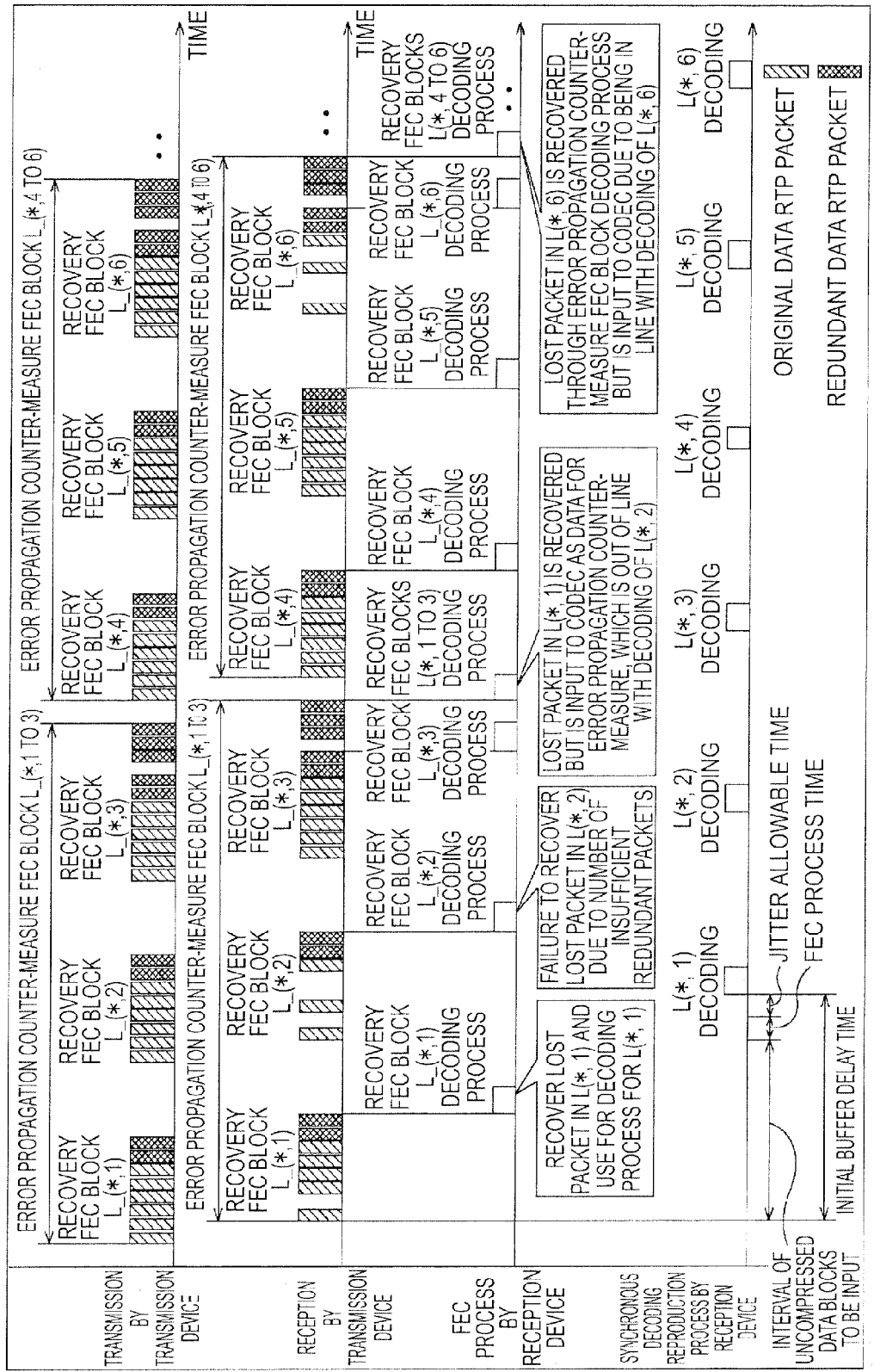
FIG. 30 is a diagram illustrating timing relationships for the entire network system.

FIG. 30 is a diagram illustrating an example of timings in the respective data transmission processes.

As shown in FIG. 30, for example, it is assumed that the FEC decoding process is performed for the recovery FEC block L(*, 1) to the recovery FEC block L(*, 3), respectively, and the FEC decoding process is performed for the error propagation counter-measure FEC blocks (*, 1 to 3)

In this case, even if there is a failure in recovery in lost packets because the number of redundant packets is insufficient in the recovery FEC block L(*, 2), the recovery in the lost packets is performed again in the error propagation counter-measure FEC blocks L(*, 1 to 3)

However, if the recovery in the packet of L(*, 2) through the FEC decoding process in the error propagation counter-measure FEC block is performed out of line with a time for the decompression decoding process, the encoded data is supplied to the inverse wavelet transform unit 173 as data for the error propagation counter-measure which is used in the decompression decoding process for subsequent blocks.

In addition, as shown in FIG. 30, it is assumed that after the FEC decoding process is performed for, for example, the recovery FEC block L(*, 4) to recovery FEC block L(*, 6), respectively, the FEC decoding process is performed for the error propagation counter-measure FEC blocks (*, 4 to 6)

In this case, even if there is a failure in recovery in lost packets because the number of redundant packets is insufficient in the recovery FEC block L(*, 6), the recovery in the lost packets is performed again in the error propagation counter-measure FEC blocks L(*, 4 to 6)

At this time, if the recovery in the packet of L(*, 6) through the FEC decoding process in the error propagation counter-measure FEC block is performed in line with a time for the decompression decoding process, the encoded data is supplied to the entropy decoding unit 171 as data which undergoes the decompression decoding in the block.

In this way, the network system 100 can transmit data so as to suppress increase in unnecessary delay and suppress errors from being propagated to subsequent data.

[Redundant Data]

In addition, the transmission device 101 may use the hierarchical encoding process in the compression encoding process, forms individual FEC blocks for each hierarchy, and may adjust redundancy according to importance.

A setting method of the redundancy is arbitrary, and may employ methods other than the method using the above-described equation (11). For example, the number of redundant packets may be adjusted according to a position of the "recovery FEC block original data" with respect to the "error propagation counter-measure FEC block original data".

Figure 31:
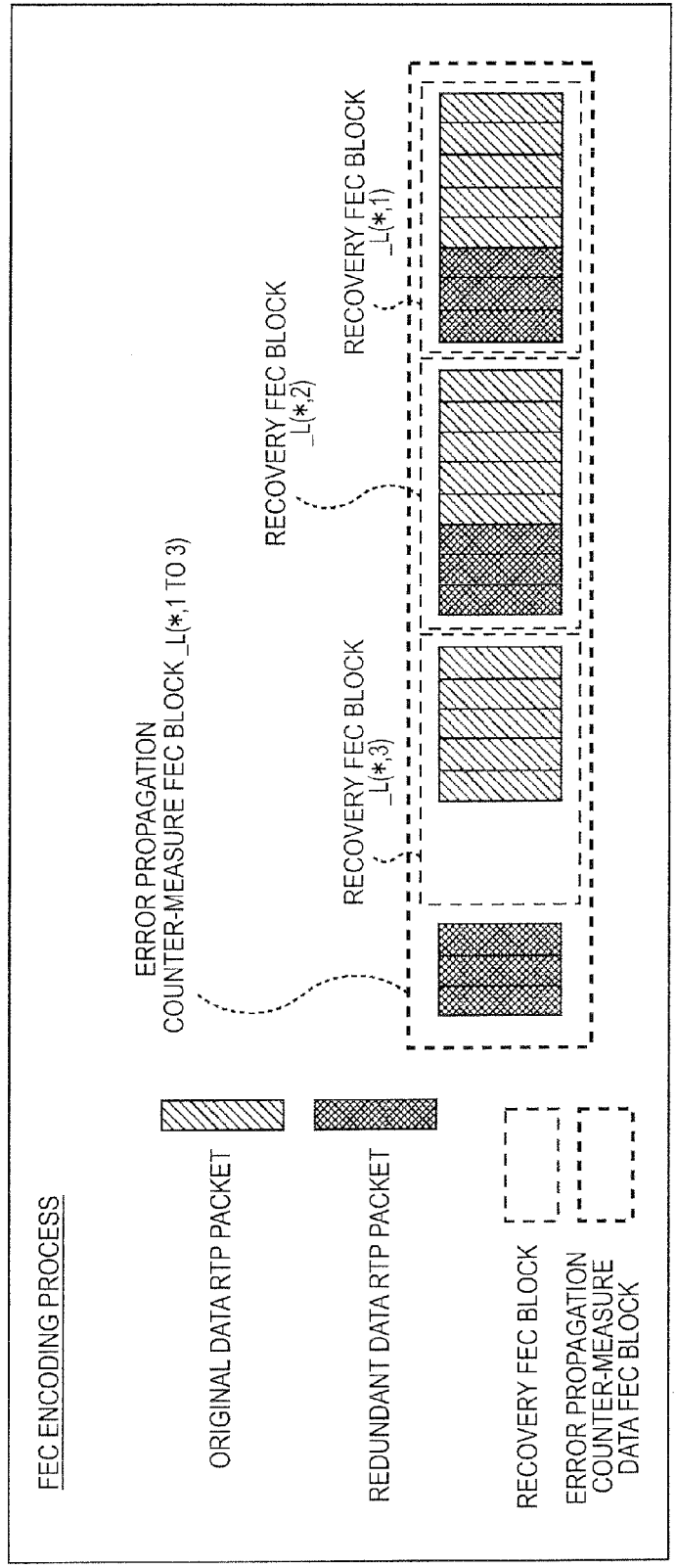
FIG. 31 is a diagram illustrating another configuration example of redundant data.

FIG. 31 is a diagram illustrating a configuration example of the FEC block. In the example shown in FIG. 31, the number of redundant packets for the "recovery FEC block" positioned at the end of the "error propagation counter-measure FEC block" is set to 0, and the number of redundant packets for the remainders is set to three.

This is because the compressed encoded data L(*, 3) can achieve packet loss recovery performance equivalent to L(*, 1) or L(*, 2) since the FEC decoding process is performed for the error propagation counter-measure FEC blocks (*, 1 to 3) before the decoding process is performed for the compressed encoded data L(*, 3) including the recovery FEC block L(*, 3) positioned at the end of the "error propagation counter-measure FEC block".

4. Fourth Embodiment

[Configuration of Network System]

Figure 32:
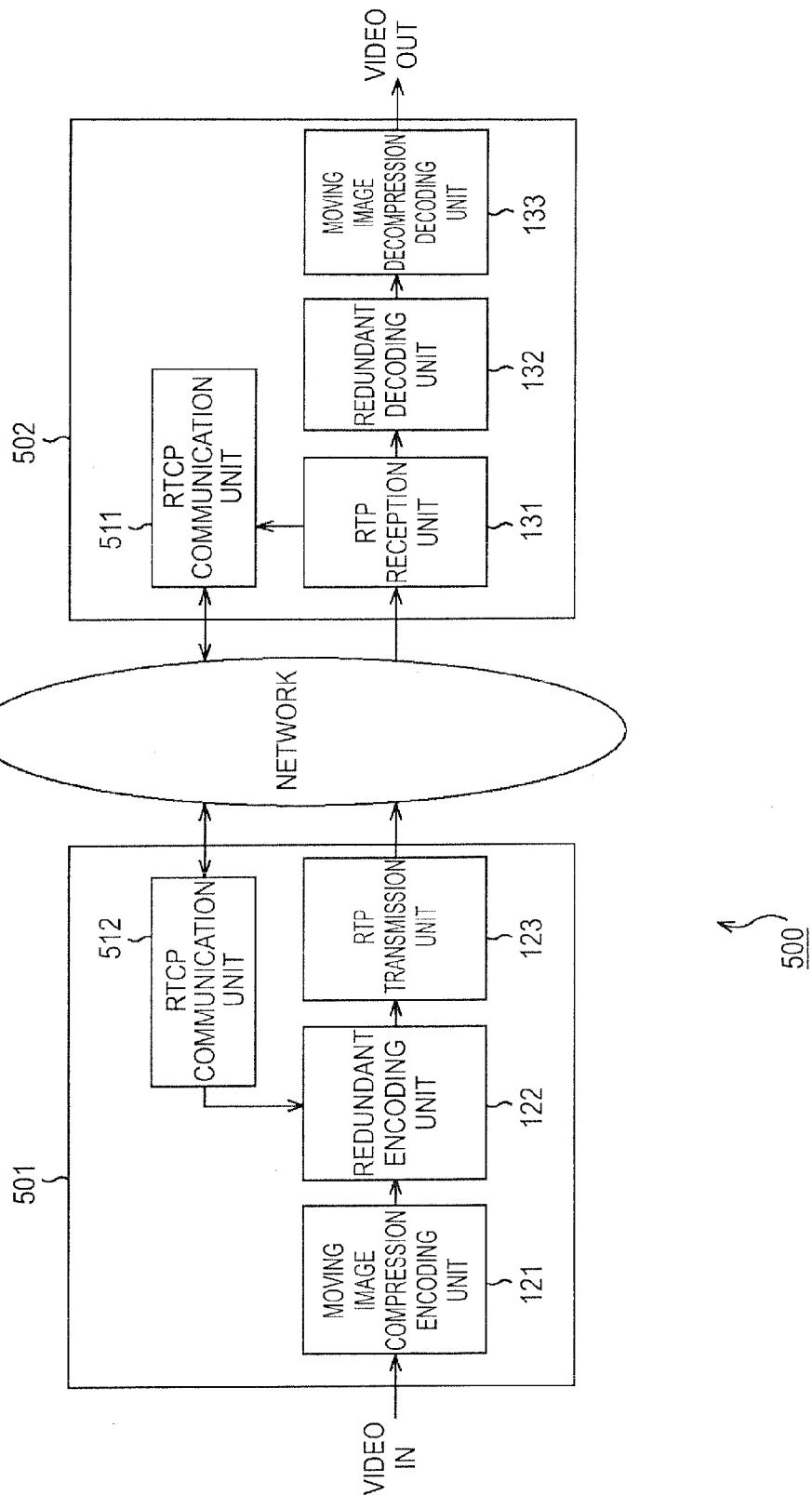
FIG. 32 is a block diagram illustrating another configuration example of the network system according to an embodiment of the present invention.

FIG. 32 is a block diagram illustrating a configuration example of a network system according to an embodiment of the present invention.

A network system 500 shown in FIG. 32 fundamentally has the same configuration as the network system 100 shown in FIG. 1, and performs the same process. However, in the case of the network system 500, a transmission device 501 and a reception device 502 respectively include RTCP communication units for exchanging network situation information between the transmission device and the reception devices.

In other words, the reception device 502 corresponding to the reception device 102 includes an RTCP communication unit 511 in addition to the configuration of the reception device 102. In addition, the transmission device 501 corresponding to the transmission device 101 includes an RTCP communication unit 512 in addition to the configuration of the transmission device 101.

The RTCP communication unit 511 and the RTCP communication unit 512 exchanges the network situation information which is information indicating circumstances regarding communication in the network 110 by transmitting and receiving, for example, an RTCP Sender Report (SR) packet or an RTCP Receiver Report (RR) packet described in IETF RFC 3550. The network situation information is formed by information regarding arbitrary parameters. For example, the network situation information may include information regarding parameters such as, for example, reciprocal transmission delay information, so-called RTT (Round Trip Time) information, transmission jitter information, transmission and reception data rate information, packet loss rate information, and the like.

In addition, the network situation information may include, for example, an expected value of a burst packet loss rate indicating an occurrence rate of losses in consecutive packets of predetermined number or more or indicating a frequency where the number of lost packets in a predetermined section is equal to or more than a predetermined number.

For example, the RTCP communication unit 511 obtains information regarding a reception situation from the RTP reception unit 131, and transmits the information to the RTCP communication unit 512 via the network 110.

The redundant encoding unit 122 performs a process with reference to the network situation information obtained by the RTCP communication unit 512.

[Configuration of Redundant Encoding Unit]

Figure 33:
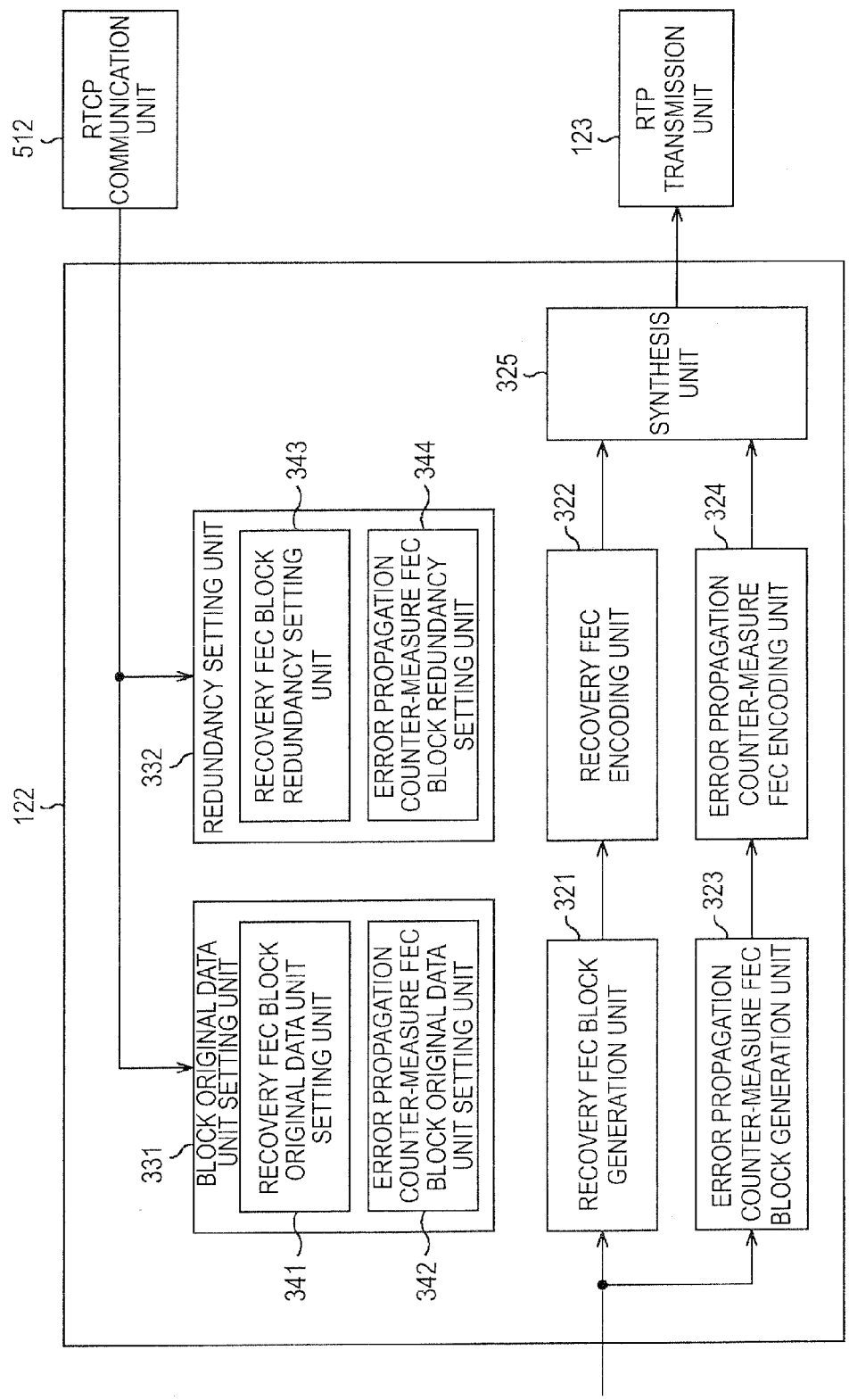
FIG. 33 is a block diagram illustrating still another configuration example of the redundant encoding unit.

FIG. 33 shows a main configuration example of the redundant encoding unit 122 in this case. As shown in FIG. 33, in this case as well, the redundant encoding unit 122 fundamentally has the same configuration as the case described with reference to FIG. 26. However, in this case, the block original data unit setting unit 331 obtains the network situation information from the RTCP communication unit 512 and sets the block original data unit based on the information.

In addition, the redundancy setting unit 332 obtains the network situation information from the RTCP communication unit 512 and sets the redundancy based on the information.

[Flow in FEC Block Original Data Unit Setting Process]

Figure 34:
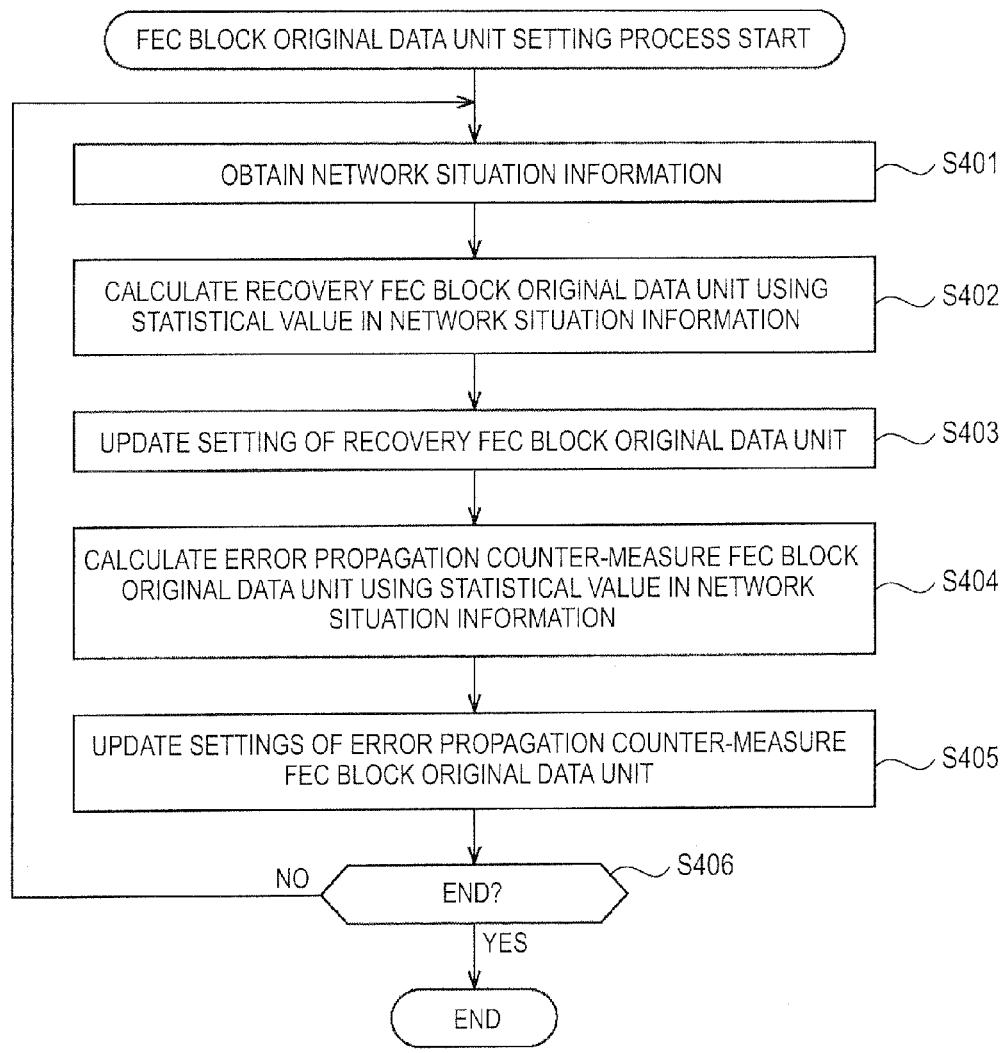
FIG. 34 is a flowchart illustrating an example of a flow in an FEC block original data unit setting process.

Next, an example of a flow in the FEC block original data unit setting process performed by the block original data unit setting unit 331 will be described with reference to the flowchart in FIG. 34.

The block original data unit setting unit 331 obtains network situation information from the RTCP communication unit 512 in step S401. In step S402, the recovery FEC block original data unit setting unit 341 calculates a recovery FEC block original data unit by using various kinds of statistical values in the network situation information.

For example, a reciprocal propagation delay time (statistical of measured RTT) in the network which is measured by the RTCP communication unit 512 or a measured network jitter value is referenced, and a maximal value thereof for a constant time or a statistical value such as an exponentially weighted moving average (EWMA) is used to calculate the block original data unit.

For example, the expected transmission maximal delay time or the jitter allowable time is calculated by the following equations (12) and (13)

$$\text{Expected transmission maximal delay time} = (\text{statistical value of measured RTT})/2 \quad (12)$$

$$\text{Jitter allowable time} = \text{statistical value of measured network jitter value} \quad (13)$$

The recovery FEC block original data unit is calculated by the above-described equation (9) or (10) using these values.

If the recovery FEC block original data unit is calculated, the recovery FEC block original data unit setting unit 341 updates setting of the recovery FEC block original data unit in step S403.

In step S404, the error propagation counter-measure FEC block original data unit setting unit 342 calculates the error propagation counter-measure FEC block original data unit using various kinds of statistical values in the network situation information in the same manner as the case of the recovery FEC block.

If the error propagation counter-measure FEC block original data unit is calculated, the error propagation counter-measure FEC block original data unit setting unit 342 updates setting of the error propagation counter-measure FEC block original data unit in step S405 in the same manner as the case of the recovery FEC block.

In step S406, the block original data unit setting unit 331 determines whether or not the FEC block original data unit setting process is finished, and if it is determined that the process is not finished, makes the flow return to step S401, and repeats the processes therefrom. In addition, in step S406, if it is determined that the FEC block original data unit setting process is finished, the block original data unit setting unit 331 finishes the FEC block original data unit setting process.

In addition, for example, if the burst packet loss rate is equal to or more than a certain value, the FEC block original data unit may be modified to be large.

By setting the FEC block original data unit as described above, the redundant encoding unit 122 can appropriately dynamically set the FEC block original data unit according to a current communication situation in the network 110.

[Flow in FEC Block Redundancy Setting Process]

Figure 35:
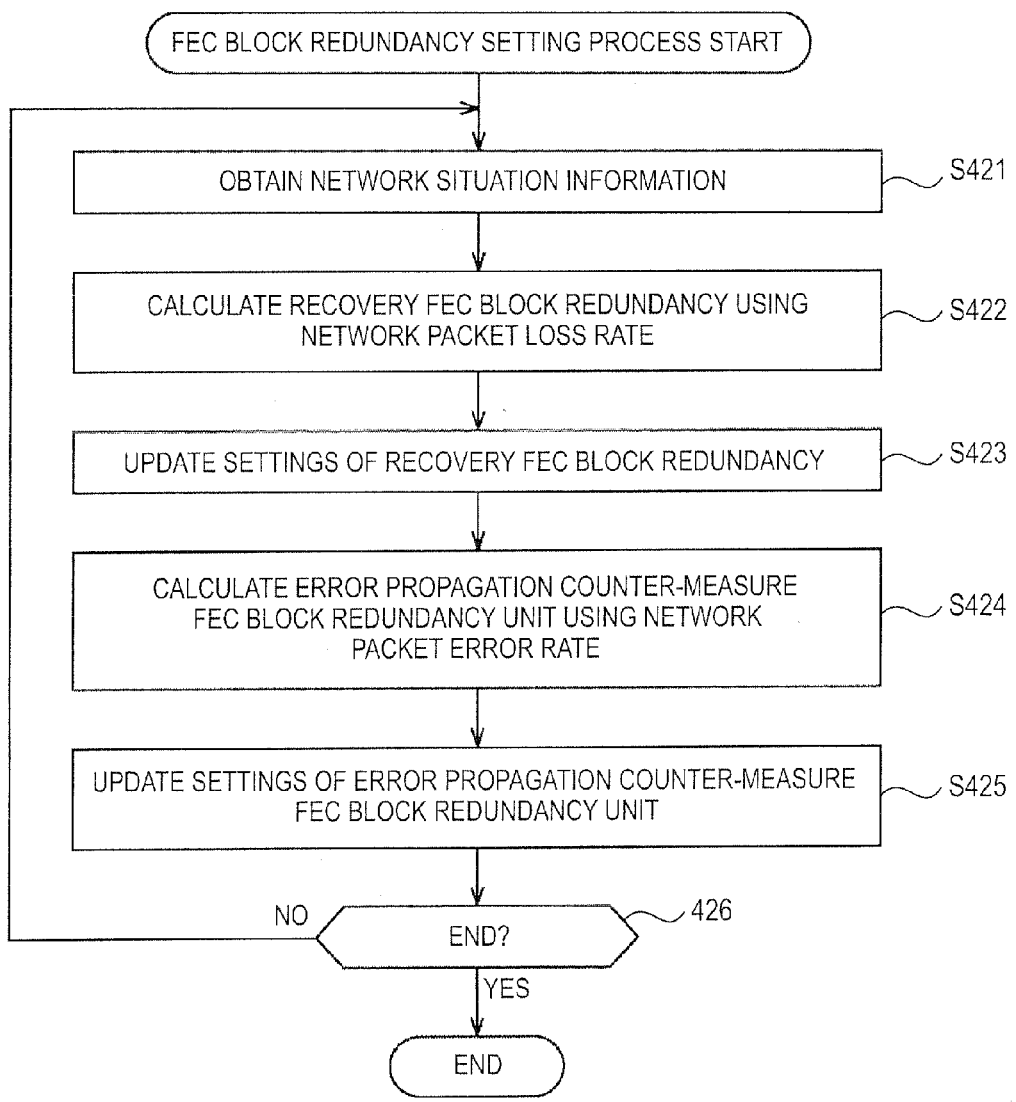
FIG. 35 is a flowchart illustrating an example of a flow in an FEC block redundancy setting process.

An example of a flow in the FEC block redundancy setting process in this case will be described with reference to the flowchart in FIG. 35.

The redundancy setting unit 332 obtains network situation information from the RTCP communication unit 512 in step S421. In step S422, the recovery FEC block redundancy setting unit 343 calculates recovery FEC block redundancy by using various kinds of statistical values in the network situation information.

For example, the network packet loss rate measured by the RTCP communication unit 512 is referenced. The redundancy is calculated by the above-described equation (11), but the packet loss rate p is not an expected value as described above but a measured value. The packet loss rate p in this case is dynamically adjusted according to network circumstances.

If the recovery FEC block redundancy is calculated, the recovery FEC block redundancy setting unit 343 updates settings of the recovery FEC block redundancy in step S423.

In step S424, the error propagation counter-measure FEC block redundancy setting unit 344 calculates error propagation counter-measure FEC block redundancy using various kinds of statistical values in the network situation information in the same manner as the case of the recovery FEC block.

If the error propagation counter-measure FEC block redundancy is calculated, the error propagation counter-measure FEC block redundancy setting unit 344 updates settings of the error propagation counter-measure FEC block redundancy in step S425 in the same manner as the case of the recovery FEC block.

In step S426, the redundancy setting unit 332 determines whether or not the FEC block redundancy setting process is finished, and if it is determined that the process is not finished, makes the flow return to step S421, and repeats the processes therefrom. In addition, in step S426, if it is determined that the FEC block redundancy setting process is finished, the redundancy setting unit 332 finishes the FEC block redundancy setting process.

In addition, for example, if the burst packet loss rate is equal to or more than a certain value, the redundancy may be modified to be large.

By setting the redundancy as described above, the redundant encoding unit 122 can appropriately dynamically set the redundancy according to a current communication situation in the network 110. In other words, the transmission device 101 can transmit data with necessary minimal redundancy in a current communication situation in the network 110.

Of course, both of the FEC block original data unit and the redundancy may be set based on the network situation information.

Through the above-described FEC process, the network system 100 and the network system 500 can realize redundant encoding transmission capable of suppressing increase in unnecessary delay, recovering burst packet losses, or suppressing error propagation to subsequent data in a case of performing multimedia streaming or real-time communication.

5. Fifth Embodiment

[Personal Computer]

The above-described series of processes may be performed by hardware or software. In this case, for example, as shown in FIG. 36, there may be a configuration of a personal computer.

Figure 36:
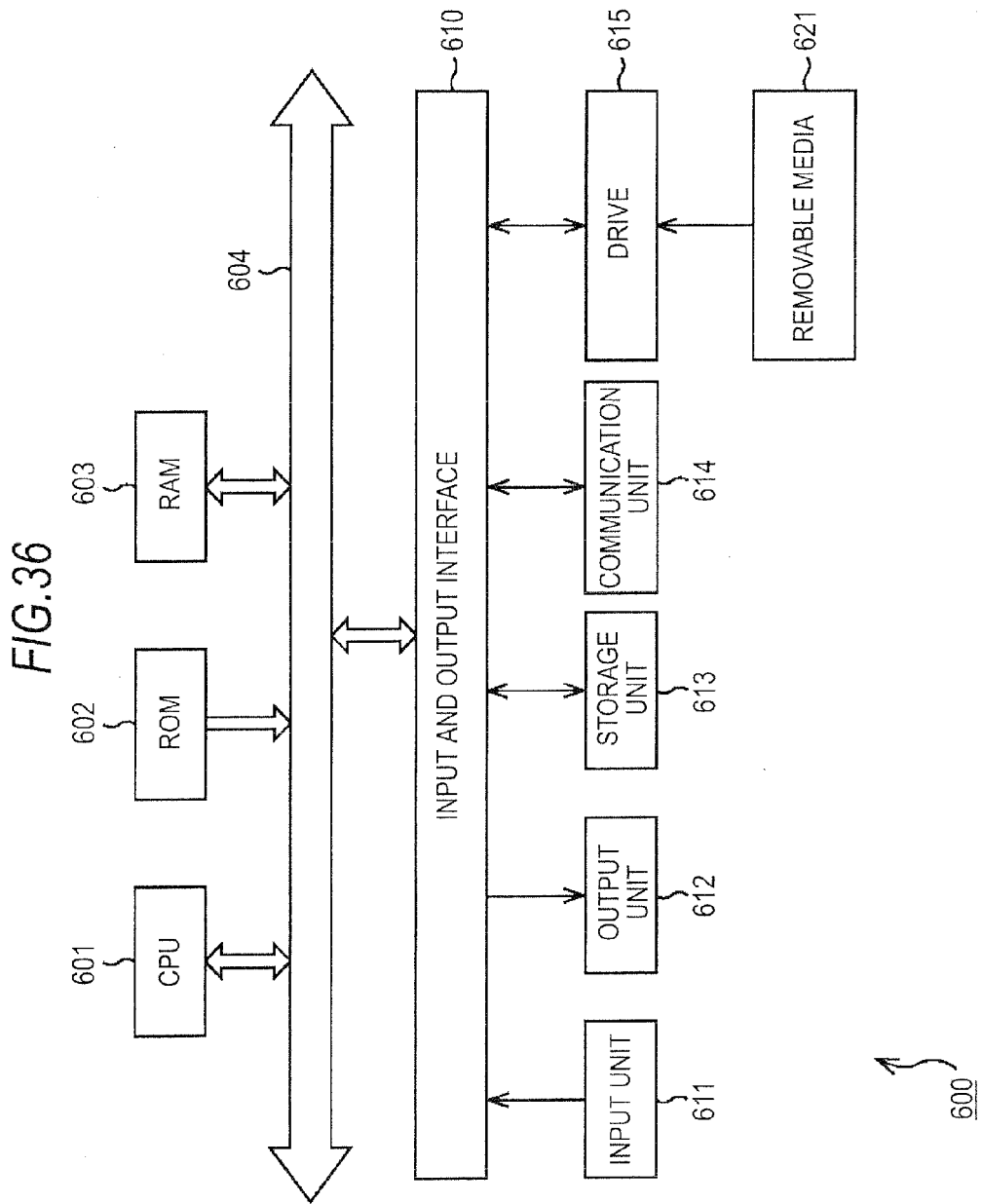
FIG. 36 is a block diagram illustrating a main configuration example of a personal computer according to an embodiment of the present invention.

In FIG. 36, a CPU 601 of the personal computer 600 performs various kinds of processes according to a program stored in an ROM (Read Only Memory) 602 or a program loaded from a storage unit 613 to an RAM (Random Access Memory) 603. The ROM 603 appropriately stores data or the like necessary for the CPU 601 to perform various kinds of processes.

The CPU 601, the ROM 602, and the RAM 603 are connected to each other via a bus 604. The bus 604 is also connected to an input and output interface 610.

The input and output interface 610 is connected to an input unit 611 constituted by a keyboard, a mouse, or the like, an output unit 612 constituted by a display constituted by a CRT (cathode Ray Tube), an LCD (Liquid Crystal Display) or the like, a speaker, and the like, the storage unit 613 constituted by a hard disk or the like, and a communication unit 614 constituted by a modem or the like. A communication unit 614 performs communication via a network including the Internet.

A drive 615 is optionally connected to the input and output interface 610 and is appropriately mounted with a removable medium 621 such as a magnetic disk, an optical disc, a magnetic optical disk, or a semiconductor memory, and programs or data read therefrom are installed in the storage unit 613 as necessary.

When the above-described series of processes is performed by the software, programs constituting the software are installed from a network or recording media.

The recording media include, as shown in FIG. 36, the removable medium 621 such as a magnetic disk (including a flexible disc), an optical disc (including a CD-ROM (compact disc-read only memory) and DVD (digital versatile disc)), a magnetic optical disk (including an MD (mini disc)), or a semiconductor memory, which stores programs and are distributed separately from the device main body, in order to deliver the programs to a user, and further includes the ROM 602 or a hard disk included in the storage unit 613, which stores programs delivered to a user, in a state of being embedded in the main body.

The program executed by the computer may be a program where processes are performed in a time series according to the order described in this specification, or may be a program executed in parallel therewith or a program where processes are performed at a necessary timing such as when accessed.

Also, in this specification, the steps for describing programs recorded in a recording medium include not only processes performed in a time series according to the described order, but also processes performed in parallel or separately even if not necessarily performed in the time series.

In this specification, the system indicates the entire device configured by a plurality of devices.

In the above description, a configuration described using one device (or processing unit) may be constituted by a plurality of devices (or processing units). On the contrary, configurations described using a plurality of devices (or processing units) may be integrally constituted by one device (or processing unit). Also, configurations other than the configurations described above may be added to the configuration of each device (or processing unit). Also, if a configuration or an operation as an entire system is substantially the same, a portion of a configuration of a certain device (or processing unit) may be included in a configuration of another device (or another processing unit) That is to say, the embodiments of the present invention are not limited to the above-described embodiments but may have various modifications without departing from the scope of the present invention.

The present application contains subject matter related to that disclosed in Japanese Priority Patent Application JP 2010-090715 filed in the Japan Patent Office on Apr. 9, 2010, the entire contents of which is hereby incorporated by reference.

What is claimed is:

1. An information processing device comprising:
   an obtaining means for obtaining encoded data obtained by encoding image data which is formed by blocks with predetermined data unit, for each block, and redundant data for the encoded data, which is obtained by encoding the encoded data using a forward error correction method;
   a decoding means for decoding each block using the encoded data and intermediate data generated during a decoding process for a block which has been decoded if the encoded data to be included in the block and obtained by the obtaining means is all collected, and decoding each block using dummy data used instead of lost encoded data, the encoded data, and intermediate data generated during a decoding process for a block which has been decoded if the encoded data to be included in the block and obtained by the obtaining means is not all collected;
a forward error correction method decoding means for decoding the encoded data and the redundant data obtained by the obtaining means using the forward error correction method and recovering the lost encoded data; and
a setting means for decoding the encoded data recovered by the forward error correction method decoding means and setting intermediate data obtained during the decoding to be used to decode a subsequent block as intermediate data during a decoding process for a block which has been decoded.

2. The information processing device according to claim 1, further comprising:
a synchronization means for enabling the decoding means to decode the encoded data at a predetermined timing in accordance with a predetermined synchronization signal; and
a synchronization determination means for determining whether or not recovery in the encoded data by the forward error correction method decoding means is earlier than a decoding start timing for a block of the encoded data in the decoding means, which is controlled by the synchronization means,
wherein if it is determined by the synchronization determination means that the recovery in the encoded data is earlier than the decoding start timing, the decoding means performs decoding using the encoded data recovered by the forward error correction method decoding means, the encoded data included in the block, and intermediate data during a decoding process for a block which has been decoded, and
if it is determined by the synchronization determination means that the recovery in the encoded data is not earlier than the decoding start timing, the encoded data recovered by the forward error correction method decoding means is decoded, and intermediate data obtained during the decoding is set to be used to decode a subsequent block as intermediate data during a decoding process for a block which has been decoded.

3. The information processing device according to claim 1, wherein the decoding means includes
a first entropy decoding means for performing entropy decoding for the encoded data,
a first inverse quantization means for performing inverse quantization for coefficient data obtained by decoding the encoded data in the first entropy decoding means, and
an inverse wavelet transform means for performing inverse wavelet transform for the coefficient data which is inversely quantized by the first inverse quantization means, and
the setting means includes
a second entropy decoding means for performing entropy decoding for the encoded data recovered by the forward error correction method decoding means,
a second inverse quantization means for performing inverse quantization for coefficient data obtained by decoding the encoded data in the second entropy decoding means, and an updating means for updating the intermediate data which is maintained by the inverse wavelet transform and which is used in the inverse wavelet transform, using the coefficient data which is inversely quantized by the second inverse quantization means.

4. An information processing method in an information processing device comprising the steps of:
causing an obtaining means of the information processing device to obtain encoded data obtained by encoding image data which is formed by blocks with predetermined data unit, for each block, and redundant data for the encoded data, which is obtained by encoding the encoded data using a forward error correction method;
causing a decoding means of the information processing device to decode each block using the encoded data and intermediate data generated during a decoding process for a block which has been decoded if the encoded data to be included in the block and obtained by the obtaining means is all collected, and to decode each block using dummy data used instead of the lost encoded data, the encoded data, and intermediate data generated during a decoding process for a block which has been decoded if the encoded data to be included in the block and obtained by the obtaining means is not all collected;
causing a forward error correction method decoding means of the information processing device to decode the encoded data and the redundant data which are obtained using the forward error correction method and recover the lost encoded data; and
causing a setting means of the information processing device to decode the recovered encoded data and set intermediate data obtained during the decoding to be used to decode a subsequent block as intermediate data during a decoding process for a block which has been decoded.

5. A non-transitory computer-readable storage medium storing a program that, when executed, enables a computer to function as:
an obtaining means for obtaining encoded data obtained by encoding image data which is formed by blocks with predetermined data unit, for each block, and redundant data for the encoded data, which is obtained by encoding the encoded data using a forward error correction method;
a decoding means for decoding each block using the encoded data and intermediate data generated during a decoding process for a block which has been decoded if the encoded data to be included in the block and obtained by the obtaining means is all collected, and decoding each block using dummy data used instead of the lost encoded data, the encoded data, and intermediate data generated during a decoding process for a block which has been decoded if the encoded data to be included in the block and obtained by the obtaining means is not all collected;
a forward error correction method decoding means for decoding the encoded data and the redundant data obtained by the obtaining means using the forward error correction method and recovering the lost encoded data; and
a setting means for decoding the encoded data recovered by the forward error correction method decoding means and setting intermediate data obtained during the decoding to be used to decode a subsequent block as intermediate data during a decoding process for a block which has been decoded.

6. An information processing device comprising:
- an encoding means for encoding image data which is formed by blocks with predetermined data unit, for each block;
- a first forward error correction method encoding means for recovering lost encoded data, and encoding encoded data which is obtained by encoding the image data in the encoding data, with first data unit, by a forward error correction method, in order to use the recovered encoded data to decode a corresponding block and to use intermediate data obtained during the decoding to decode encoded data of a subsequent block;
- a second forward error correction method encoding means for encoding encoded data which is obtained by encoding the image data in the encoding data, with second data unit larger than the first data unit, by the forward error correction method, in order to use intermediate data obtained during the decoding to decode encoded data of a subsequent block; and
- a transmission means for transmitting encoded data obtained by encoding the image data in the encoding means, first redundant data obtained by encoding the encoded data in the first forward error correction method encoding means, and second redundant data obtained by encoding the encoded data in the second forward error correction method encoding means.

7. The information processing device according to claim 6, further comprising:
- a first data unit setting means for setting a size of the first data unit; and
- a second data unit setting means for setting a size of the second data unit,
- wherein the first forward error correction method encoding means encodes the encoded data by the forward error correction method with the first data unit set by the first data unit setting means, and
- the second forward error correction method encoding means encodes the encoded data by the forward error correction method with the second data unit set by the second data unit setting means.

8. The information processing device according to claim 7, wherein the second data unit setting means sets the second data unit so as to be equal to or less than blocks obtained by combining the block, intermediate data generated during a decoding process for a corresponding block, and 0 or more subsequent block used for decoding.

9. The information processing device according to claim 7, wherein in a decoding process for the encoded data, when the encoded data of a predetermined size or a size corresponding to a predetermined reproduction time is stored in a buffer and then is decoded, the first data unit setting means sets a size of the first data unit to be equal to or smaller than a size of the buffer, and the second data means setting means sets a size of the second data unit to be equal to or larger than the size of the buffer.

10. The information processing device according to claim 7, further comprising a network situation information obtaining means for obtaining network situation information indicating a situation in a network via which the encoded data is transmitted,
- wherein the first data unit setting means sets the size of the first data unit using the network situation information obtained by the network situation information obtaining means, and
- the second data unit setting means sets the size of the second data unit using the network situation information obtained by the network situation information obtaining means.

11. The information processing device according to claim 6, further comprising:
- a first redundancy setting means for setting first redundancy which is redundancy for encoding using the forward error correction method in the first forward error correction method encoding means; and
- a second redundancy setting means for setting second redundancy which is redundancy for encoding using the forward error correction method in the second forward error correction method encoding means,
- wherein the first forward error correction method encoding means encodes the encoded data by the forward error correction method with the first redundancy set by the first redundancy setting means, and
- the second forward error correction method encoding means encodes the encoded data by the forward error correction method with the second redundancy set by the second redundancy setting means.

12. The information processing device according to claim 11, further comprising a network situation information obtaining means for obtaining network situation information indicating a situation in a network via which the encoded data is transmitted,
- wherein the first redundancy setting means sets the first redundancy using the network situation information obtained by the network situation information obtaining means, and
- the second redundancy setting means sets the second redundancy using the network situation information obtained by the network situation information obtaining means.

13. The information processing device according to claim 12, wherein the network situation information includes at least one of a packet loss rate information, transmission delay information, transmission and reception data rate information, and transmission jitter information.

14. The information processing device according to claim 13, wherein the network situation information further includes an expected value of a burst packet loss rate indicating an occurrence rate of losses in consecutive packets of a predetermined number or more or indicating a frequency where the number of lost packets in a predetermined section is equal to or more than a predetermined number.

15. The information processing device according to claim 11, wherein the first redundancy setting means decreases redundancy for a block which is temporally later inside the second data unit.

16. The information processing device according to claim 6, further comprising:
- a network situation information obtaining means for obtaining a burst packet loss rate indicating an occurrence rate of losses in consecutive packets of a predetermined number or more or indicating a frequency where the number of lost packets in a predetermined section is equal to or more than a predetermined number, as network situation information indicating a situation in a network via which the encoded data is transmitted;
- a first data unit setting means for setting a size of the first data unit;
- a second data unit setting means for setting a size of the second data unit;
- a first redundancy setting means for setting first redundancy which is redundancy for encoding using the forward error correction method in the first forward error correction method encoding means; and a second redundancy setting means for setting second redundancy which is redundancy for encoding using the forward error correction method in the second forward error correction method encoding means, wherein the first forward error correction method encoding means encodes the encoded data by the forward error correction method with the first redundancy set by the first redundancy setting means, with the first data unit set by the first data unit setting means, the second forward error correction method encoding means encodes the encoded data by the forward error correction method with the second redundancy set by the second redundancy setting means, with the second data unit set by the second data unit setting means, when the burst packet loss rate obtained by the network situation information obtaining means is equal to or more than a predetermined value, the first data unit setting means increases the first data unit and the second data unit setting means increases the second data unit, or the first redundancy setting means increases the first redundancy and the second redundancy setting means increases the second redundancy, or the first data unit setting means increases the first data unit, the second data unit setting means increases the second data unit, the first redundancy setting means increases the first redundancy and the second redundancy setting means increases the second redundancy.

17. An information processing method in an information processing device comprising the steps of:
causing an encoding means of the information processing device to encode image data which is formed by blocks with predetermined data unit, for each block;
causing a first forward error correction method encoding means of the information processing device to recover lost encoded data, and encode encoded data which is obtained by encoding the image data in the encoding data, with first data unit, by a forward error correction method, in order to use the recovered encoded data to decode a corresponding block and to use intermediate data obtained during the decoding to decode encoded data of a subsequent block;
causing a second forward error correction method encoding means of the information processing device to encode encoded data which is obtained by encoding the image data in the encoding data, with second data unit larger than the first data unit, by the forward error correction method, in order to use intermediate data obtained during the decoding to decode encoded data of a subsequent block; and
causing a transmission means of the information processing device to transmit encoded data obtained by encoding the image data, first redundant data obtained by encoding the encoded data using the first forward error correction method, and second redundant data obtained by encoding the encoded data using the second forward error correction method.

18. A non-transitory computer-readable storage medium storing a program that, when executed, enables a computer to function as:
an encoding means for encoding image data which is formed by blocks with predetermined data unit, for each block;
a first forward error correction method encoding means for recovering lost encoded data, and encoding encoded data which is obtained by encoding the image data in the encoding means, with first data unit, by a forward error correction method, in order to use the recovered encoded data to decode a corresponding block and to use intermediate data obtained during the decoding to decode encoded data of a subsequent block;
a second forward error correction method encoding means for encoding encoded data which is obtained by encoding the image data in the encoding means, with second data unit larger than the first data unit, by the forward error correction method, in order to use intermediate data obtained during the decoding to decode encoded data of a subsequent block; and
a transmission means for transmitting encoded data obtained by encoding the image data in the encoding means, first redundant data obtained by encoding the encoded data in the first forward error correction method encoding means, and second redundant data obtained by encoding the encoded data in the second forward error correction method encoding means.

19. An information processing device comprising:
an obtaining means for obtaining encoded data obtained by encoding image data which is formed by blocks with predetermined data unit, for each block, first redundant data for the encoded data, which is obtained by encoding the encoded data using a forward error correction method with first data unit, and second redundant data for the encoded data, which is obtained by encoding the encoded data using the forward error correction method with second data unit larger than the first data unit;
a decoding means for decoding each block using the encoded data and intermediate data generated during a decoding process for a block which has been decoded if the encoded data to be included in the block and obtained by the obtaining means is all collected, and decoding each block using the encoded data and intermediate data generated during a decoding process for a block which has been decoded if the encoded data to be included in the block and obtained by the obtaining means is not all collected;
a first forward error correction method decoding means for recovering lost encoded data, and decoding the encoded data and the first redundant data which are obtained by the obtaining means using the forward error correction method, in order to use the recovered encoded data to decode a corresponding block and to use intermediate data obtained during the decoding to decode encoded data of a subsequent block;
a second forward error correction method decoding means for decoding the encoded data and the second redundant data obtained by the obtaining means using the forward error correction method, in order to use intermediate data obtained during the decoding to decode encoded data of a subsequent block; and
a setting means for decoding the encoded data recovered by the second forward error correction method decoding means and setting intermediate data obtained during the decoding to be used to decode a subsequent block as intermediate data during a decoding process for a block which has been decoded.

20. The information processing device according to claim 19, further comprising:
a synchronization means for enabling the decoding means to decode the encoded data at a predetermined timing in accordance with a predetermined synchronization signal; and
a synchronization determination means for determining whether or not recovery in the encoded data by the second forward error correction method decoding means is earlier than a decoding start timing for a block of the encoded data in the decoding means, which is controlled by the synchronization means, wherein if it is determined by the synchronization determination means that the recovery in the encoded data is earlier than the decoding start timing, the decoding means performs decoding using the encoded data recovered by the second forward error correction method decoding means, the encoded data included in the block, and intermediate data during a decoding process for a block which has been decoded, and if it is determined by the synchronization determination means that the recovery in the encoded data is not earlier than the decoding start timing, the setting means decodes the encoded data recovered by the second forward error correction method decoding means, and setting intermediate data obtained during the decoding to be used to decode a subsequent block as intermediate data during a decoding process for a block which has been decoded.

21. The information processing device according to claim 19, wherein the decoding means includes
  a first entropy decoding means for performing entropy decoding for the encoded data,
  a first inverse quantization means for performing inverse quantization for coefficient data obtained by decoding the encoded data in the first entropy decoding means, and
  an inverse wavelet transform means for performing inverse wavelet transform for the coefficient data which is inversely quantized by the first inverse quantization means, and the setting means includes
  a second entropy decoding means for performing entropy decoding for the encoded data recovered by the second forward error correction method decoding means,
  a second inverse quantization means for performing inverse quantization for coefficient data obtained by decoding the encoded data in the second entropy decoding means, and
  an updating means for updating the intermediate data which is maintained by the inverse wavelet transform and which is used in the inverse wavelet transform, using the coefficient data which is inversely quantized by the second inverse quantization means.

22. An information processing method in an information processing device comprising the steps of:

causing an obtaining means of the information processing device to obtain encoded data obtained by encoding image data which is formed by blocks with predetermined data unit, for each block, first redundant data for the encoded data, which is obtained by encoding the encoded data using a forward error correction method with first data unit, and second redundant data for the encoded data, which is obtained by encoding the encoded data using the forward error correction method with second data unit larger than the first data unit;

causing a decoding means to decode each block using the encoded data and intermediate data generated during a decoding process for a block which has been decoded if the encoded data to be included in the block and obtained by the obtaining means is all collected, and to decode each block using the encoded data and intermediate data generated during a decoding process for a block which has been decoded if the encoded data to be included in the block and obtained by the obtaining means is not all collected;

causing a first forward error correction method decoding means of the information processing device to recover lost encoded data, and decodes the encoded data and the first redundant data which are obtained, using the forward error correction method, in order to use the recovered encoded data to decode a corresponding block and to use intermediate data obtained during the decoding to decode encoded data of a subsequent block;

causing a second forward error correction method decoding means of the information processing device to decode the encoded data and the second redundant data which are obtained, using the forward error correction method, in order to use intermediate data obtained during the decoding to decode encoded data of a subsequent block; and causing a setting means of the information processing device to decode the recovered encoded data and set intermediate data obtained during the decoding to be used to decode a subsequent block as intermediate data during a decoding process for a block which has been decoded.

23. A non-transitory computer-readable storage medium storing a program that, when executed, enables a computer to function as an obtaining means for obtaining encoded data obtained by encoding image data which is formed by blocks with predetermined data unit, for each block, first redundant data for the encoded data, which is obtained by encoding the encoded data using a forward error correction method with first data unit, and second redundant data for the encoded data, which is obtained by encoding the encoded data using the forward error correction method with second data unit larger than the first data unit;

a decoding means for decoding each block using the encoded data and intermediate data generated during a decoding process for a block which has been decoded if the encoded data to be included in the block and obtained by the obtaining means is all collected, and decoding each block using the encoded data and intermediate data generated during a decoding process for a block which has been decoded if the encoded data to be included in the block and obtained by the obtaining means is not all collected;

a first forward error correction method decoding means for recovering lost encoded data, and decoding the encoded data and the first redundant data which are obtained by the obtaining means using the forward error correction method, in order to use the recovered encoded data to decode a corresponding block and to use intermediate data obtained during the decoding to decode encoded data of a subsequent block;

a second forward error correction method decoding means for decoding the encoded data and the second redundant data obtained by the obtaining means using the forward error correction method, in order to use intermediate data obtained during the decoding to decode encoded data of a subsequent block; and a setting means for decoding the encoded data recovered by the second forward error correction method decoding means and setting intermediate data obtained during the decoding to be used to decode a subsequent block as intermediate data during a decoding process for a block which has been decoded.

24. An information processing device comprising:
- an obtaining unit configured to obtain encoded data obtained by encoding image data which is formed by blocks with predetermined data unit, for each block, and redundant data for the encoded data, which is obtained by encoding the encoded data using a forward error correction method;
- a decoding unit configured to decode each block using the encoded data and intermediate data generated during a decoding process for a block which has been decoded if the encoded data to be included in the block and obtained by the obtaining unit is all collected, and decode each block using dummy data used instead of the lost encoded data, the encoded data, and intermediate data generated during a decoding process for a block which has been decoded if the encoded data to be included in the block and obtained by the obtaining unit is not all collected;
- a forward error correction method decoding unit configured to decode the encoded data and the redundant data obtained by the obtaining unit using the forward error correction method and recover the lost encoded data; and
- a setting unit configured to decode the encoded data recovered by the forward error correction method decoding unit and setting intermediate data obtained during the decoding to be used to decode a subsequent block as intermediate data during a decoding process for a block which has been decoded.

25. An information processing device comprising:
- an encoding unit configured to encode image data which is formed by blocks with predetermined data unit, for each block;
- a first forward error correction method encoding unit configured to recover lost encoded data, and encode encoded data which is obtained by encoding the image data in the encoding data, with first data unit, by a forward error correction method, in order to use the recovered encoded data to decode a corresponding block and to use intermediate data obtained during the decoding to decode encoded data of a subsequent block;
- a second forward error correction method encoding unit configured to encode encoded data which is obtained by encoding the image data in the encoding data, with second data unit larger than the first data unit, by the forward error correction method, in order to use intermediate data obtained during the decoding to decode encoded data of a subsequent block; and
- a transmission unit configured to transmit encoded data obtained by encoding the image data in the encoding unit, first redundant data obtained by encoding the encoded data in the first forward error correction method encoding unit, and second redundant data obtained by encoding the encoded data in the second forward error correction method encoding unit.

26. An information processing device comprising:
- an obtaining unit configured to obtain encoded data obtained by encoding image data which is formed by blocks with predetermined data unit, for each block, first redundant data for the encoded data, which is obtained by encoding the encoded data using a forward error correction method with first data unit, and second redundant data for the encoded data, which is obtained by encoding the encoded data using the forward error correction method with second data unit larger than the first data unit;
- a decoding unit configured to decode each block using the encoded data and intermediate data generated during a decoding process for a block which has been decoded if the encoded data to be included in the block and obtained by the obtaining unit is all collected, and decode each block using the encoded data and intermediate data generated during a decoding process for a block which has been decoded if the encoded data to be included in the block and obtained by the obtaining unit is not all collected;
- a first forward error correction method decoding unit configured to recover lost encoded data, and decode the encoded data and the first redundant data which are obtained by the obtaining unit using the forward error correction method, in order to use the recovered encoded data to decode a corresponding block and to use intermediate data obtained during the decoding to decode encoded data of a subsequent block;
- a second forward error correction method decoding unit configured to decode the encoded data and the second redundant data obtained by the obtaining unit using the forward error correction method, in order to use intermediate data obtained during the decoding to decode encoded data of a subsequent block; and
- a setting unit configured to decode the encoded data recovered by the second forward error correction method decoding unit and set intermediate data obtained during the decoding to be used to decode a subsequent block as intermediate data during a decoding process for a block which has been decoded.

* * * * *